(12) United States Patent
Takashima et al.

(10) Patent No.: US 9,722,783 B2
(45) Date of Patent: Aug. 1, 2017

(54) CRYPTOGRAPHIC SYSTEM

(71) Applicants: Mitsubishi Electric Corporation, Tokyo (JP); NIPPON TELEGRAPH AND TELEPHONE CORPORATION, Tokyo (JP)

(72) Inventors: Katsuyuki Takashima, Tokyo (JP); Tatsuaki Okamoto, Tokyo (JP)

(73) Assignees: Mitsubishi Electric Corporation, Tokyo (JP); NIPPON TELEGRAPH AND TELEPHONE CORPORATION, Tokyo (JP)

( * ) Notice: Subject to any disclaimer, the term of this patent is extended or adjusted under 35 U.S.C. 154(b) by 150 days.

(21) Appl. No.: 14/421,282

(22) PCT Filed: Jul. 17, 2013

(86) PCT No.: PCT/JP2013/069364
§ 371 (c)(1),
(2) Date: Feb. 12, 2015

(87) PCT Pub. No.: WO2014/061324
PCT Pub. Date: Apr. 24, 2014

(65) Prior Publication Data
US 2015/0229472 A1 Aug. 13, 2015

(30) Foreign Application Priority Data
Oct. 19, 2012 (JP) .................................. 2012-231293

(51) Int. Cl.
*H04L 9/28* (2006.01)
*H04L 9/00* (2006.01)
(Continued)

(52) U.S. Cl.
CPC .............. *H04L 9/0838* (2013.01); *G09C 1/00* (2013.01); *H04L 9/007* (2013.01); *H04L 9/008* (2013.01);
(Continued)

(58) Field of Classification Search
CPC ............ H04L 9/00; H04L 9/32–9/3297; H04L 63/04–63/0492; H04L 63/08–63/0892;
(Continued)

(56) References Cited

U.S. PATENT DOCUMENTS 7,634,085 B1    12/2009  Sahai et al.
8,913,742 B2    12/2014  Takashima et al.
(Continued)

FOREIGN PATENT DOCUMENTS

EP    2 613 472 A1    7/2013
JP    2011 232475    11/2011
JP    2012 133214    7/2012

OTHER PUBLICATIONS

Extended European Search Report issued Aug. 8, 2016 in Patent Application No. 13846805.3.
(Continued)

*Primary Examiner* — Linglan Edwards
*Assistant Examiner* — Quazi Farooqui
(74) *Attorney, Agent, or Firm* — Oblon, McClelland, Maier & Neustadt, L.L.P.

(57) ABSTRACT

An inner-product predicate encryption scheme with improved flexibility without a restriction that the dimensions of an attribute vector $x^{\rightarrow}$ and a predicate vector $v^{\rightarrow}$ should be equivalent. A ciphertext having an element $c_0$ and an element $c_t$ for each index t included in a set $I_{x^{\rightarrow}}$ is decrypted with a decryption key having an element $k_0$ and an element $k_t$ for each index t included in a set $I_{v^{\rightarrow}}$ by computing a product of pairing operations between corresponding pairs (Continued)

of basis vectors on the element $c_0$ and the element $k_0^*$ and on the element $c_t$ and the element $k_t^*$.

12 Claims, 16 Drawing Sheets

(51) Int. Cl.
    *G06F 12/14*     (2006.01)
    *H04L 9/08*     (2006.01)
    *H04L 9/30*     (2006.01)
    *G09C 1/00*     (2006.01)

(52) U.S. Cl.
    CPC ............ *H04L 9/083* (2013.01); *H04L 9/0861* (2013.01); *H04L 9/0866* (2013.01); *H04L 9/3073* (2013.01); *H04L 2209/24* (2013.01)

(58) Field of Classification Search
    CPC ....... H04L 9/0838; H04L 9/083; H04L 9/008; H04L 9/0866; H04L 9/3073; H04L 9/28; G06F 12/14
    USPC .......................................... 380/28–30, 44–47
    See application file for complete search history.

(56) References Cited

U.S. PATENT DOCUMENTS

| | | | |
|---|---|---|---|
| 8,938,623 B2 | 1/2015 | Takashima et al. | |
| 2009/0080658 A1 | 3/2009 | Waters et al. | |
| 2012/0297201 A1* | 11/2012 | Matsuda ............. | G06F 21/6245 713/189 |
| 2013/0028415 A1* | 1/2013 | Takashima ............ | H04L 9/0847 380/44 |

OTHER PUBLICATIONS

International Search Report Issued Aug. 13, 2013 in PCT/JP13/069364 Filed Jul. 17, 2013.
Okamoto, T., et al., "Fully Secure Unbounded Inner-Product and Attribute-Based Encryption", URL: http://eprint.iacr.org/2012/671, Total 91 Pages, (Nov. 28, 2012).
Okamoto, T., et al., "A Design Methodology for Fully Secure Unbounded Functional Encryption", SCIS, Total 3 Pages, (Jan. 22-25, 2013) (with partial English translation).
Attrapadung, N., et al., "Functional Encryption for Inner Product: Achieving Contant-Size Ciphertexts with Adaptive Security or Support for Negation", PKC, LNCS, vol. 6056, pp. 384-402, (2010).
Beimel, A., "Secure Schemes for Secret Sharing and Key Distribution", Research Thesis, Israel Institute of Technology, pp. 1-115, (1996).
Bellare, M., et al., "Identity-Based Encryption Secure Against Selective Opening Attack", TCC, Total 33 Pages, (2011).
Bethencourt, J., et al., "Ciphertext-Policy Attribute-Based Encryption", IEEE Symposium on Security and Privacy, Total 15 Pages, (2007).
Boneh, D., et al., "Efficient Selective-ID Secure Identity Based Encryption Without Random Oracles", Eurocrypt, LNCS, vol. 3027, Total 20 Pages, (2004).
Boneh, D., et al., "Secure Identity Based Encryption Without Random Oracles", Crypto LNCS, vol. 3152, Total 24 Pages, (2004).
Boneh, D., et al., "Hierarchical Identity Based Encryption with Constant Size Ciphertext", Eurocrypt, LNCS, vol. 3494, Total 27 Pages, (2005).
Boneh, D., et al., "Short Group Signatures", Crypto, LNCS, vol. 3152, Total 19 Pages, (2004).
Boneh, D., et al., "Identity-Based Encryption from the Well Pairing", Crypto, LNCS, vol. 2139, Total 21 Pages, (2001).
Boneh, D., et al., "Generalized Identity Based and Broadcast Encryption Schemes", Asiacrypt, LNCS, vol. 5350, pp. 455-470, (2008).
Boneh, D., et al., "Improved Efficiency for CCA-Secure Cryptosystems Built Using Identity-Based Encryption", RSA-CT, LNCS, Total 16 Pages, (2005).
Boneh, D., et al., "Conjunctive, Subset, and Range Queries on Encrypted Data", TCC, LNCS, vol. 4392, Total 20 Pages, (2007).
Boneh, D., et al., "Anonymous Hierarchical Identity-Based Encryption (Without Random Oracles)", Crypto, LNCS, vol. 4117, Total 30 Pages, (2006).
Canetti, R., et al., "Chosen-Ciphertext Security from identity-Based Encryption", Eurocrypt, LNCS, pp. 1-15, (2004).
Chase, M., "Multi-Authority Attribute Based Encryption", TCC, LNCS, Total 20 Pages, (2007).
Chase, M., et al., "Improving Privacy and Security in Multi-Authority Attribute-Based Encryption", ACM Conference on Computer and Communications Security, pp. 121-130, (2009).
Cocks, C., "An Identity Based Encryption Scheme Based on Quadratic Residues", IMA Int. Conf., LNCS, vol. 2260, pp. 360-363, (2001).
Gentry, C., "Practical Identity-Based Encryption Without Random Oracles", Eurocrypt, LNCS, vol. 4004, pp. 445-464, (2006).
Gentry, C., et al., "Hierarchical Identity Based Encryption with Polynomially Many Levels", TCC, LNCS, vol. 5444, Total 29 Pages, (2009).
Gentry, C., et al., "Hierarchical ID-Based Cryptography", Asiacrypt, LNCS, vol. 2501, Total 21 Pages, (2002).
Goyal, V., et al., "Attribute-Based Encryption for Fine-Grained Access Control of Encrypted Data", ACM Conference on Computer and Communication Security, Total 28 Pages, (2006).
Katz, J., et al., "Predicate Encryption Supporting Disjunctions, Polynomial Equations, and Inner Products", Eurocrypt, LNCS, vol. 4965, Total 28 Pages, (2008).
Lewko, A., et al., "Fully Secure Fuctional Encryption: Attribute-Based Encryption and (Hierarchical) Inner Product Encryption", Eurocrypt, LNCS, Total 57 Pages, (2010).
Lewko, A., et al., "New Techniques for Dual System Encryption and Fully Secure HIBE with Short Ciphertexts", TCC, LNCS, vol. 5978, Total 22 Pages, (2010).
Lewko, A., et al., "Decentralizing Attribute-Based Encryption", Eurocrypt, LNCS, vol. 6632, Total 32 Pages, (2011).
Lewko, A., et al., "Unbounded HIBE and Attribute-Based Encryption", Eurocrypt, LNCS, vol. 6632, Total 20 Pages, (2011).
Lin, H., et al., "Secure threshold multi authority attribute based encryption without a central authority", Indocrypt, LNCS, vol. 5365, Total 17 Pages, (2008).
Mueller, S., et al., "On Multi-Authority Ciphertext-Policy Attribute-Based Encryption", Bull. Korean Math. Soc., vol. 46, pp. 803-819, (2009).
Okamoto, T., et al., "Homorphic Encryption and Signature from Vector Decomposition", Pairing, LNCS, vol. 5209, pp. 57-74, (2008).
Okamoto, T., et al., "Hierarchical Predicate Encryption for Inner-Products", Asiacrypt, LNCS, vol. 5912, pp. 214-231, (2009).
Okamoto, T., et al., "Fully Secure Functional Encryption with General Relations from the Decisional Linear Assumption", Crypto, LNCS, vol. 6223, Total 50 Pages, (2010).
Okamoto, T., et al., "Efficient Attribute-Based Signatures for Non-Monotone Predicates in the Standard Model", PKC, LNCS, vol. 6571, Total 41 Pages, (2011).
Okamoto, T., et al., "Achieving Short Ciphertexts or Short Secret-Keys for Adaptively Secure General Inner-Product Encryption", CANS, LNCS, vol. 7092, pp. 138-159, (2011).
Okamoto, T., et al., "Adaptively Attribute-Hiding (Hierarchical) Inner Product Encryption", Eurocrypt, LNCS, vol. 7237, Total 39 Pages, (2012).
Ostrovsky, R., et al., "Attribute-Based Encryption with Non-Monotonic Access Structures", ACM Conference on Computer and Communication Security, pp. 195-203, (2007).
Pirretti, M., et al., "Secure Attribute-Based Systems", ACM Conference on Computer and Communication Security, Total 14 Pages, (2006).

(56) References Cited

OTHER PUBLICATIONS

Sahai, A., et al., "Fuzzy Identity-Based Encryption", Eurocrypt, LNCS, vol. 3494, Total 15 Pages, (2005).
Shi, E., et al., "Delegating Capabilities in Predicate Encryption Systems", ICALP, LNCS, vol. 5126, Total 35 Pages, (2008).
Waters, B., "Efficient Identity-Based Encryption Without Random Oracles", Eurocrypt, LNCS, vol. 3152, Total 13 Pages, (2005).
Waters, B., "Ciphertext-Policy Attribute-Based Encryption: An Expressive, Efficient, and Provably Secure Realization", PKC, LNCS, vol. 6571, Total 30 Pages, (2011).
Waters, B., "Dual System Encryption: Realizing Fully Secure IBE and HIBE under Simple Assumptions", Crypto, LNCS, vol. 5677, Total 38 Pages, (2009).
Office Action issued on Mar. 3, 2016 in Korean Patent Application No. 10-2015-7013141 with partial English translation.

* cited by examiner

CRYPTOGRAPHIC SYSTEM

TECHNICAL FIELD

The present invention relates to a generalized inner-product predicate encryption scheme, and a functional encryption scheme and an attribute-based signature scheme each having a generalized inner-product predicate encryption scheme as a lower structure.

BACKGROUND ART

Non-Patent Literatures 30 and 31 discuss inner-product predicate encryption schemes.

Non-Patent Literature 31 discusses a functional encryption scheme.

Non-Patent Literature 32 discusses an attribute-based signature scheme.

CITATION LIST

Non-Patent Literature

Non-Patent Literature 1: Attrapadung, N. and Libert, B., Functional Encryption for Inner Product: Achieving Constant-Size Ciphertexts with Adaptive Security or Support for Negation, PKC 2010, pp. 384-402. Springer Heidelberg (2010)

Non-Patent Literature 2: Beimel, A., Secure schemes for secret sharing and key distribution. PhD Thesis, Israel Institute of Technology, Technion, Haifa, Israel, 1996.

Non-Patent Literature 3: Bellare, M., Waters, B., Yilek, S.: Identity-based encryption secure against selective opening attack. In: Ishai, Y.(ed.) TCC 2011. pp. 235-252. Springer Heidelberg (2011)

Non-Patent Literature 4: Bethencourt, J., Sahai, A., Waters, B.: Ciphertext-policy attribute-based encryption. In: 2007 IEEE Symposium on Security and Privacy, pp. 321-334. IEEE Press (2007)

Non-Patent Literature 5: Boneh, D., Boyen, X.: Efficient selective-ID secure identity based encryption without random oracles. In: Cachin, C., Camenisch, J. (eds.) EUROCRYPT 2004. LNCS, vol. 3027, pp. 223-238. Springer Heidelberg (2004)

Non-Patent Literature 6: Boneh, D., Boyen, X.: Secure identity based encryption without random oracles. In: Franklin, M. K. (ed.) CRYPTO2004. LNCS, vol. 3152, pp. 443-459. Springer Heidelberg (2004)

Non-Patent Literature 7: Boneh, D., Boyen, X., Goh, E.: Hierarchical identity based encryption with constant size ciphertext. In: Cramer, R. (ed.) EUROCRYPT 2005. LNCS, vol. 3494, pp. 440-456. Springer Heidelberg (2005)

Non-Patent Literature 8: Boneh, D., Boyen, X., Shacham, H.: Short group signatures. In: Franklin, M. (ed.) CRYPTO 2004. LNCS, vol. 3152, pp. 41-55. Springer, Heidelberg (2004)

Non-Patent Literature 9: Boneh, D., Franklin, M.: Identity-based encryption from the Weil pairing. In: Kilian, J. (ed.) CRYPTO 2001.LNCS, vol. 2139, pp. 213-229. Springer Heidelberg (2001)

Non-Patent Literature 10: Boneh, D., Hamburg, M.: Generalized identity based and broadcast encryption scheme. In: Pieprzyk, J. (ed.) ASIACRYPT 2008. LNCS, vol. 5350, pp. 455-470. Springer Heidelberg (2008)

Non-Patent Literature 11: Boneh, D., Katz, J., Improved efficiency for CCA-secure cryptosystems built using identity based encryption. RSA-CT 2005, LNCS, Springer Verlag (2005)

Non-Patent Literature 12: Boneh, D., Waters, B.: Conjunctive, subset, and range queries on encrypted data. In: Vadhan, S. P. (ed.) TCC2007. LNCS, vol. 4392, pp. 535-554. Springer Heidelberg (2007)

Non-Patent Literature 13: Boyen, X., Waters, B.: Anonymous hierarchical identity-based encryption (without random oracles). In: Dwork, C. (ed.) CRYPTO 2006. LNCS, vol. 4117, pp. 290-307. Springer Heidelberg (2006)

Non-Patent Literature 14: Canetti, R., Halevi S., Katz J.: Chosen-ciphertext security from identity-based encryption. EUROCRYPT 2004, LNCS, Springer Heidelberg (2004)

Non-Patent Literature 15: Chase, M.: Multi-authority attribute based encryption. TCC, LNCS, pp. 515-534, Springer Heidelberg (2007).

Non-Patent Literature 16: Chase, M. and Chow, S.: Improving privacy and security in multi-authority attribute-based encryption, ACM Conference on Computer and Communications Security, pp. 121-130, ACM (2009).

Non-Patent Literature 17: Cocks, C.: An identity based encryption scheme based on quadratic residues. In: Honary, B. (ed.) IMA Int. Conf. LNCS, vol. 2260, pp. 360-363. Springer Heidelberg (2001)

Non-Patent Literature 18: Gentry, C.: Practical identity-based encryption without random oracles. In: Vaudenay, S. (ed.) EUROCRYPT2006. LNCS, vol. 4004, pp. 445-464. Springer Heidelberg (2006)

Non-Patent Literature 19: Gentry, C., Halevi, S.: Hierarchical identity-based encryption with polynomially many levels. In: Reingold, O. (ed.) TCC 2009. LNCS, vol. 5444, pp. 437-456. Springer Heidelberg (2009)

Non-Patent Literature 20: Gentry, C., Silverberg, A.: Hierarchical ID-based cryptography. In: Zheng, Y. (ed.) ASIACRYPT 2002. LNCS, vol. 2501, pp. 548-566. Springer Heidelberg (2002)

Non-Patent Literature 21: Goyal, V., Pandey, O., Sahai, A., Waters, B.: Attribute-based encryption for fine-grained access control of encrypted data. In: ACM Conference on Computer and Communication Security 2006, pp. 89-98, ACM (2006)

Non-Patent Literature 22: Katz, J., Sahai, A., Waters, B.: Predicate encryption supporting disjunctions, polynomial equations, and inner products. In: Smart, N. P. (ed.) EUROCRYPT 2008. LNCS, vol. 4965, pp. 146-162. Springer Heidelberg (2008)

Non-Patent Literature 23: Lewko, A., Okamoto, T., Sahai, A., Takashima, K., Waters, B.: Fully secure functional encryption: Attribute-based encryption and (hierarchical) inner product encryption, EUROCRYPT 2010. LNCS, Springer Heidelberg (2010) Full version is available at iacr.org.

Non-Patent Literature 24: Lewko, A. B., Waters, B.: New techniques for dual system encryption and fully secure HIBE with short ciphertexts. In: Micciancio, D. (ed.) TCC 2010. LNCS, vol. 5978, pp. 455-479. Springer Heidelberg (2010)

Non-Patent Literature 25: Lewko, A. B., Waters, B.: Decentralizing Attribute-Based Encryption, EUROCRYPT 2011. LNCS, vol. 6632, pp. 568-588. Springer Heidelberg (2011)

Non-Patent Literature 26: Lewko, A. B., Waters, B.: Unbounded HIBE and attribute-based encryption, EUROCRYPT 2011. LNCS, vol. 6632, pp. 547-567. Springer Heidelberg (2011)

Non-Patent Literature 27: H. Lin, Z. Cao, X. Liang, and J. Shao.: Secure threshold multi authority attribute based encryption without a central authority, INDOCRYPT, LNCS, vol. 5365, pp. 426-436, Springer Heidelberg (2008).

Non-Patent Literature 28: S. Mueller, S. Katzenbeisser, and C. Eckert.; On multi-authority ciphertext-policy attribute-based encryption, Bull. Korean Math Soc. 46, No. 4, pp. 803-819 (2009).

Non-Patent Literature 29: Okamoto, T., Takashima, K.: Homomorphic encryption and signatures from vector decomposition. In: Galbraith, S. D., Paterson, K. G. (eds.) Pairing 2008. LNCS, vol. 5209, pp. 57-74, Springer Heidelberg (2008)

Non-Patent Literature 30: Okamoto, T., Takashima, K.: Hierarchical predicate encryption for inner-products, In: ASIACRYPT 2009, Springer Heidelberg (2009)

Non-Patent Literature 31: Okamoto, T., Takashima, K.: Fully secure functional encryption with general relations from the decisional linear assumption. In: Rabin, T. (ed.) CRYPTO 2010. LNCS, vol. 6223, pp. 191-208. Springer Heidelberg (2010). Full version is available at iacr.org.

Non-Patent Literature 32: Okamoto, T., Takashima, K.: Efficient attribute-based signatures for non-monotone predicates in the standard model, In: PKC 2011, Springer Heidelberg (2011)

Non-Patent Literature 33: Okamoto, T., Takashima, K.: Achieving Short Ciphertexts or Short Secret-Keys for Adaptively Secure General Inner-Product Encryption. CANS 2011, LNCS, vol. 7092, pp. 138-159 Springer Heidelberg (2011).

Non-Patent Literature 34: Okamoto, T., Takashima, K.: Adaptively Attribute-Hiding (Hierarchical) Inner Product Encryption. EUROCRYPT 2012, LNCS, vol. 7237, pp. 591-608, Springer Heidelberg (2012)

Non-Patent Literature 35: Ostrovsky, R., Sahai, A., Waters, B.: Attribute-based encryption with non-monotonic access structures. In: ACM Conference on Computer and Communication Security 2007, pp. 195-203, ACM (2007)

Non-Patent Literature 36: Pirretti, M., Traynor, P., McDaniel, P., Waters, B.: Secure attribute-based systems. In: ACM Conference on Computer and Communication Security 2006, pp. 99-112, ACM, (2006)

Non-Patent Literature 37: Sahai, A., Waters, B.: Fuzzy identity-based encryption. In: Cramer, R. (ed.) EUROCRYPT 2005. LNCS, vol. 3494, pp. 457-473. Springer Heidelberg (2005)

Non-Patent Literature 38: Shi, E., Waters, B.: Delegating capability in predicate encryption systems. In: Aceto, L., Damgaard, I., Goldberg, L. A., Halldoersson, M. M., Ingoelfsdoettir, A., Walukiewicz, I. (eds.) ICALP (2) 2008. LNCS, vol. 5126, pp. 560-578. Springer Heidelberg (2008)

Non-Patent Literature 39: Waters, B.: Efficient identity based encryption without random oracles. Eurocrypt 2005, LNCS, vol. 3152, pp. 443-459. Springer Verlag, (2005)

Non-Patent Literature 40: Waters, B.: Ciphertext-policy attribute-based encryption: an expressive, efficient, and provably secure realization. PKC 2011, LNCS, vol. 6571, pp. 53-70. Springer Heidelberg (2011 Full version is available at iacr.org.

Non-Patent Literature 41: Waters, B.: Dual system encryption: realizing fully secure IBE and MBE under simple assumptions. In: Halevi, S. (ed.) CRYPTO 2009. LNCS, vol. 5677, pp. 619-636. Springer Heidelberg (2009)

SUMMARY OF INVENTION

Technical Problem

In the inner-product predicate encryption schemes discussed in Non-Patent Literatures 30 and 31, there is a restriction that the dimensions of an attribute vector $\vec{x}$ (parameter used for encryption) and a predicate vector $\vec{v}$ (parameter used for a secret key) should be equivalent.

It is an object of the present invention to realize an inner-product predicate encryption scheme with improved flexibility Solution to Problem A cryptographic system according to the present invention is a cryptographic system including an encryption device and a decryption device, wherein the encryption device includes a ciphertext generation unit that generates a ciphertext having an element $c_0$ in which a value $\omega^\sim$ is set as a coefficient of a basis vector $b_{0,r}$, and an element $c_t$ in which attribute information $x_t$ is set as a coefficient of a basis vector $b_p$ and the value $\omega^\sim$ is set as a coefficient of a basis vector $b_q$, for each index t included in a set $I_{\vec{x}}$, and wherein the decryption device includes a decryption key storage unit that stores a decryption key having an element $k_0$ and an element $k_t$ which are generated using a value $s_t$ and a value $s_0$ which is a sum of the value $s_t$ for each index t included in a set $I_{\vec{v}}$, the element $k_0$ being an element in which a value $-s_0$ is set as a coefficient of a basis vector $b^*_{0,r}$ corresponding to the basis vector $b_{0,r}$, the element $k_t$ being an element in which predicate information $v_t$ is set as a coefficient of a basis vector $b^*_p$ corresponding to the basis vector $b_p$ and the value $s_t$ is set as a coefficient of a basis vector $b^*_q$ corresponding to the basis vector $b_q$, for each index t included in the set $I_{\vec{v}}$; and a decryption unit that decrypts the ciphertext generated by the ciphertext generation unit with the decryption key stored by the decryption key storage unit, the decryption unit decrypting the ciphertext by computing a product of pairing operations between corresponding pairs of the basis vectors on the element $c_0$ and the element $k_0$ and on the element $c_t$ and the element $k_t$ for each index t included in the set $I_{\vec{v}}$.

Advantageous Effects of Invention

In a cryptographic system according to the present invention, a pairing operation is performed on only an index t included in a set $I_{\vec{v}}$, and the dimensions of an attribute vector $\vec{x}$ and a predicate vector $\vec{v}$ are not required to be equivalent. Thus, the cryptographic system according to the present invention can realize an inner-product predicate encryption scheme with improved flexibility.

DESCRIPTION OF EMBODIMENTS

Figure 1:
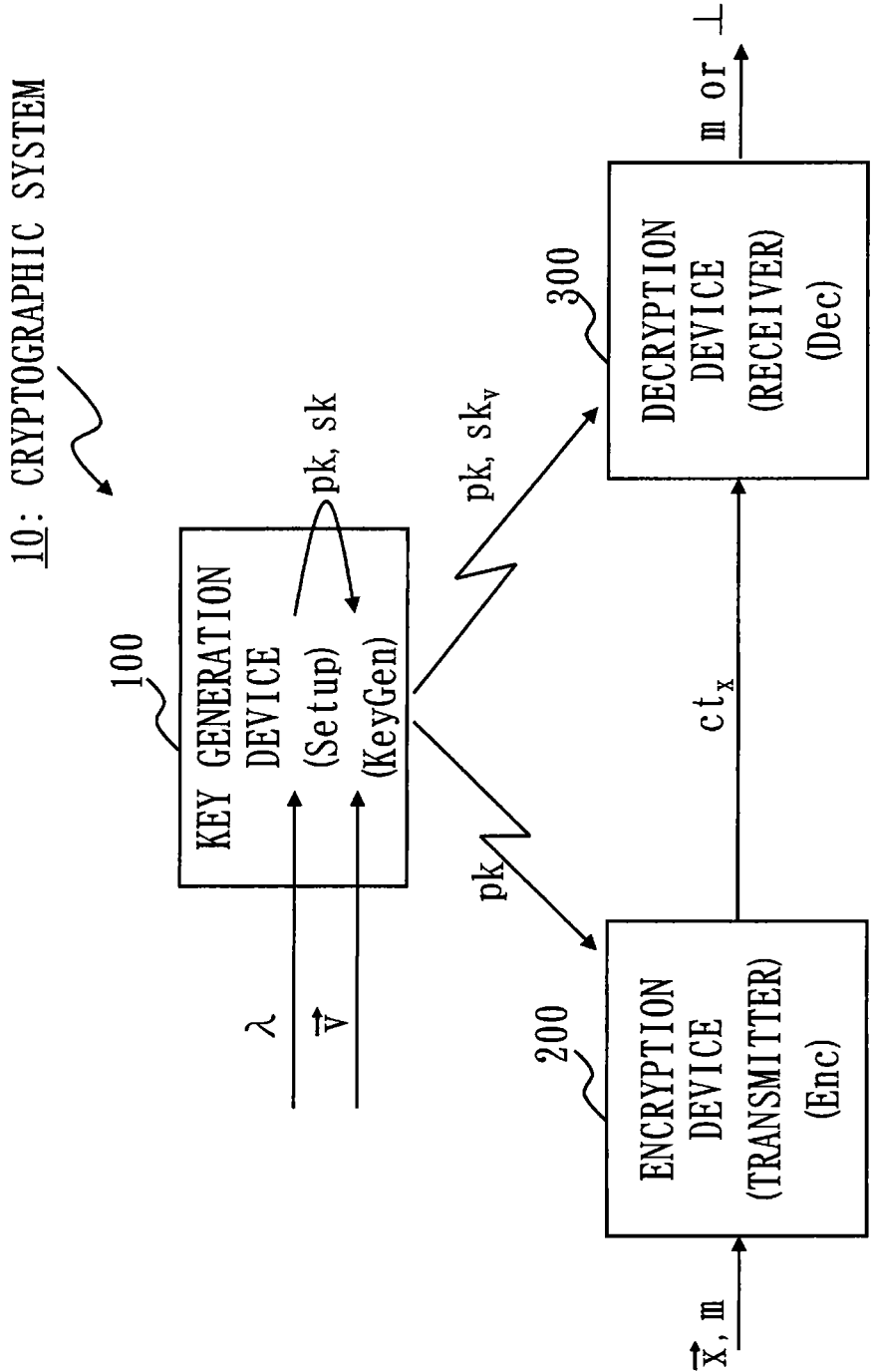
FIG. 1 is a configuration diagram of a cryptographic processing system 10 according to Embodiment 1.

Embodiments of the present invention will be described hereinafter with reference to the accompanying drawings.

In the following description, a processing device is a CPU 911 or the like to be described later. A storage device is a ROM 913, a RAM 914, a magnetic disk 920 or the like to be described later. A communication device is a communication board 915 or the like to be described later. An input device is a keyboard 902, the communication board 915 or the like to be described later. An output device is the RAM 914, the magnetic disk 920, the communication board 915, an LCD 901 or the like to be described later. That is, the processing device, the storage device, the communication device, the input device, and the output device are hardware.

Notations to be used in the following description will be described.

When A is a random variable or distribution, Formula 101 denotes that y is randomly selected from A according to the distribution of A. That is, y is a random number in Formula 101.

$$y \xleftarrow{R} A \quad \text{[Formula 101]}$$

When A is a set, Formula 102 denotes that y is uniformly selected from A. That is, y is a uniform random number in Formula 102.

$$y \xleftarrow{U} A \quad \text{[Formula 102]}$$

Formula 103 denotes that y is a set defined or substituted by z.

$$y := z \quad \text{[Formula 103]}$$

When a is a fixed value, Formula 104 denotes that a machine (algorithm) A outputs a on input x.

$$A(x) \to a \quad \text{[Formula 104]}$$

For example, $$A(x) \to 1$$

Formula 105, namely $F_q$, denotes a finite field of order q.

$$\mathbb{F}_q \quad \text{[Formula 105]}$$

A vector symbol denotes a vector representation over the finite field $F_q$, as indicated in Formula 106.

$$\vec{x} \text{ denotes } (x_1, \ldots, x_n) \in \mathbb{F}_q^n. \quad \text{[Formula 106]}$$

Formula 107 denotes the inner-product, indicated in Formula 109, of two vectors $\vec{x}$ and $\vec{v}$ indicated in Formula 108.

$$\vec{x} \cdot \vec{v} \quad \text{[Formula 107]}$$

$$\vec{x} = (x_1, \ldots, x_n),$$

$$\vec{v} = (v_1, \ldots, v_n) \quad \text{[Formula 108]}$$

$$\Sigma_{i=1}^n x_i v_i \quad \text{[Formula 109]}$$

Note that $X^T$ denotes the transpose of a matrix X.

For a basis B and a basis B* indicated in Formula 110, Formula 111 is established.

$$\mathbb{B} := (b_1, \ldots, b_N),$$

$$\mathbb{B}^* := (b^*_1, \ldots, b^*_N) \quad \text{[Formula 110]}$$

$$(x_1, \ldots, x_N)_\mathbb{B} := \Sigma_{i=1}^N x_i b_i,$$

$$(y_1, \ldots, y_N)_{\mathbb{B}^*} := \Sigma_{i=1}^N y_i b_i^* \quad \text{[Formula 111]}$$

In the following description, when "δi,j" is represented as a superscript, this δi,j denotes $\delta_{i,j}$.

When "→" representing a vector is attached to a subscript or superscript, it is meant that this "→" is attached as a superscript to the subscript or superscript.

In the following description, processes of cryptographic primitives include not only a narrowly-defined cryptographic process for keeping information secure from a third party, but also include a signature process. The processes of the cryptographic primitives include a key generation process, an encryption process, a decryption process, a signature process, and a verification process.

Embodiment 1

In Embodiment 1, basic concepts on which an inner-product predicate encryption scheme is based will be described, and then an embodiment of the inner-product predicate encryption scheme will be described.

First, the dimensions of an attribute vector $\vec{x}$ and a predicate vector $\vec{v}$ will be described.

Second, addition of an attribute category will be described.

Third, a space having a rich mathematical structure called "dual pairing vector spaces (DPVS)" which is a space for implementing the inner-product predicate encryption scheme will be described.

Fourth, an inner-product predicate encryption scheme (Type 1) according to Embodiment 1 will be described.

<1. Dimensions of Attribute Vector $\vec{x}$ and $\vec{v}$ >

In the inner-product predicate encryption schemes discussed in Non-Patent Literatures 30 and 31, there is a restriction that the dimensions of the attribute vector $\vec{x}$ and the predicate vector $\vec{v}$ should be equivalent. This restriction is considered to be inevitable for the inner-product relation on $\vec{x} \cdot \vec{v}$. However, this restriction is required to be relaxed to improve efficiency in various applications.

As an example, genetic data of an individual will be considered. Genetic data of an individual should be treated cautiously, and should be encrypted for data processing and retrievals. Although genetic data may include a vast amount of information, characteristically only a part of the genetic data is used in many applications.

For example, to examine whether Alice's genetic data has a certain characteristic, it is determined for a few (for example, three) target genetic properties out of many (for example, 100) genetic properties whether Alice's genetic data satisfies the condition. It is not necessary to determine for the rest (97 pieces) of the genetic properties whether the condition is satisfied.

For example, let $X_1, \ldots, X_{100}$ be 100 genetic properties and $x_1, \ldots, x_{100}$ be Alice's values of the 100 genetic properties. To evaluate if $f(x_1, \ldots, x_{100})=0$ for an examination (multivariate) polynomial f with degree 3, or to evaluate the truth value of a corresponding predicate $\phi_f(x_1, \ldots, x_{100})$, Alice's attribute vector $\vec{x}$ is converted into a monomial vector of Alice's values with degree 3, $\vec{x}:=(1, x_1, \ldots, x_{100}, x_1^2, x_1x_2, \ldots, x_{100}^2, x_1^3, x_1^2x_2, \ldots, x_{100}^3)$. The dimension of this attribute vector $\vec{x}$ is about $10^6$.

Let an examination expression (predicate) used for examination be $((X_5=a) \vee (X_{16}=b)) \wedge (X_{57}=c)$, which focuses on only three genetic properties $X_5$, $X_{16}$, and $X_{57}$. This is represented by a polynomial $r_1(X_5-a)(X_{16}-b)+r_2(X_{57}-c)=0$ (where $r_1$ and $r_2$ are uniform random numbers). This polynomial can be converted into $(r_1ab-r_2c)-r_1bX_5-r_1aX_{16}+r_2X_{57}+r_1X_5X_{16}=0$. In order that $r_1(X_5-a)(X_{16}-b)+r_2(X_{57}-c)=0$ if and only if $\vec{x} \cdot \vec{v}=0$, the predicate vector $\vec{v}$ is converted into $((r_1ab-r_2c), 0, \ldots, 0, -r_1b, 0, \ldots, 0, -r_1a, 0, \ldots, 0, r_2, 0, \ldots, 0, r_1, 0, \ldots, 0)$. The dimension of this predicate vector $\vec{v}$ is equivalent to that of the attribute vector $\vec{x}$, i.e., about $10^6$, although the effective dimension (dimension having elements other than 0) is only 5.

In this way, the dimension of the predicate vector $\vec{v}$ is required to be about $10^6$, although the actual effective dimension is 5. This is due to the restriction that the dimensions of the attribute vector $\vec{x}$ and the predicate vector $\vec{v}$ should be equivalent. Removing this restriction allows the predicate vector $\vec{v}$ to be constructed with only the effective dimension (5 in this case).

It has been described herein that the predicate vector $\vec{v}$ is constructed with only the effective dimension. Similarly, the attribute vector $\vec{x}$ can be constructed with only the effective dimension.

<2. Addition of Attribute Category>

An attribute category is a classification of an attribute of each user, such as belonging organization, belonging department, position in company, age, and gender.

The inner-product predicate encryption schemes to be described in the following embodiments realize access control based on the user's attribute. For example, with a narrowly-defined cryptographic process for securing information from a third party, whether or not the user can decrypt a ciphertext is controlled based on the user's attribute.

Generally, attribute categories used for access control are determined in advance at the design stage of a system. However, there may be a case where the operational rules of the system are changed at a later stage, necessitating addition of an attribute category used for access control.

For example, suppose that a cryptographic system is constructed on the assumption that the system is to be used only within Company A. In this case, it is assumed that the attribute categories to be used are, for example, belonging department, position in company, and individual ID. However, suppose that the operational rules are changed at a later stage so that the cryptographic system is used not only in Company A but also in associated companies of Company A. In this case, belonging company needs to be newly set as an attribute category to be used.

If the attribute categories used for access control are specified by a public parameter, adding an attribute category at a later stage requires that the public parameter be reissued and redistributed to each user. For this reason, an attribute category cannot be easily added at a later stage, and an operational mode that was not taken into consideration at the design stage of the system cannot be flexibly adopted.

Therefore, it is important to allow for addition of an attribute category without reissuing the public parameter.

To allow for addition of an attribute category without reissuing the public parameter, an indexing technique is applied to dual system encryption in dual pairing vector spaces.

In the dual system encryption in dual pairing vector spaces, a basis B and a basis B* which are dual bases are randomly generated. Then, a part (basis B̂) of the basis B is used as a public parameter.

In the inner-product predicate encryption scheme discussed in Non-Patent Literature 31, a basis $\hat{B}_1, \ldots$, and a basis $\hat{B}_d$ are generated as a public parameter. Then, one attribute category is assigned to a basis $\hat{B}_t$ for each integer $t=1, d$. That is, d pieces of attribute categories can be handled.

Note here that the basis $\hat{B}_1, \ldots$, and the basis $\hat{B}_d$ are used as the public parameter. As it is evident from this, the public parameter is required to be reissued to add a basis $\hat{B}$, i.e., to increase the value of d at a later stage. That is, the value of d is bounded by the public parameter.

In the inner-product predicate encryption scheme to be described hereinafter, a basis $\hat{B}$ is generated as a public parameter. Then, two-dimensional index vectors, $\sigma_i(1, t)$ and $\mu_i(t, -1)$, are set in a ciphertext c and a secret key k*, respectively, for each integer $t=1, \ldots, d$, and one attribute category is assigned to each integer t. That is, d pieces of attribute categories can be handled.

Note here that the public parameter includes the basis $\hat{B}$, but does not include the index vectors. Thus, the public parameter is not required to be reissued to add an index vector to increase the value of d at a later stage. That is, the value of d is not bounded by the public parameter.

<3. Dual Pairing Vector Spaces>

The inner-product predicate encryption scheme to be described hereinafter is realized in dual pairing vector spaces.

First, symmetric bilinear pairing groups will be described.

Symmetric bilinear pairing groups (q, G, $G^T$, g, e) are a tuple of a prime q, a cyclic additive group G of order q, a cyclic multiplicative group $G^T$ of order q, $g \neq 0 \in G$, and a polynomial-time computable nondegenerate bilinear pairing e: $G \times G \to G_T$. The nondegenerate bilinear pairing signifies $e(sg, tg)=e(g, g)^{st}$, and $e(g, g) \neq 1$.

In the following description, let $G_{bpg}$ be an algorithm that takes as input $1^\lambda$ and outputs values of a parameter $param_G:=(q, G, G_T, g, e)$ of bilinear pairing groups with a security parameter $\lambda$.

Dual pairing vector spaces will now be described.

Dual pairing vector spaces (q, V, $G_T$, A, e) can be constructed by a direct product of the symmetric bilinear pairing groups ($param_G:=(q, G, G_T, g, e)$). The dual pairing vector spaces (q, V, $G_T$, A, e) are a tuple of a prime q, an N-dimensional vector space V over $F_q$ indicated in Formula 112, a cyclic group $G_T$ of order q, and a canonical basis $A:=(a_1, \ldots, a_N)$ of the space V, and have the following operations (1) and (2), where $a_i$ is as indicated in Formula 113.

$$\mathbb{V} := \overbrace{\mathbb{G} \times \ldots \times \mathbb{G}}^{N}$$ [Formula 112]

$$a_i := (\overbrace{0, \ldots, 0}^{i-1}, g, \overbrace{0, \ldots, 0}^{N-i})$$ [Formula 113]

Operation (1): Nondegenerate Bilinear Pairing
A pairing in the space V is defined by Formula 114.

$$e(x,y) := \Pi_{i=1}^{N} e(G_i, H_i) \in \mathbb{G}_T$$ [Formula 114]

where
$(G_1, \ldots, G_N) := x \in \mathbb{V}$,
$(H_1, \ldots, H_N) := y \in \mathbb{V}$.

This is nondegenerate bilinear, that is, $e(sx, ty) = e(x, y)^{st}$ and if $e(x, y) = 1$ for all $y \in V$, then $x = 0$. For all i and j, $e(a_i, a_j) = e(g, g)^{\delta_{i,j}}$, where $\delta_{i,j} = 1$ if $i = j$, and $\delta_{i,j} = 0$ if $i \neq j$, and $e(g, g) \neq 1 \in G_T$.

Operation (2): Distortion Maps
Linear transformations on the space V indicated in Formula 115 can achieve Formula 116.

If $\phi_{i,j}(a_j) = a_i$ and
$k \neq j$, then $\phi_{i,j}(a_k) = 0$. [Formula 115]

$$\phi_{i,j}(x) := (\overbrace{0, \ldots, 0}^{i-1}, g_j, \overbrace{0, \ldots, 0}^{N-i}) \text{ where}$$ [Formula 116]
$(g_1, \ldots g_N) := x$ The linear transformations $\phi_{i,j}$ will be called distortion maps.

In the following description, let $G_{dpvs}$ be an algorithm that takes as input $1^\lambda$ ($\lambda \in$ natural number), N $\in$ natural number, and values of a parameter $param_G := (q, G, G_T, g, e)$ of bilinear pairing groups, and outputs values of a parameter $param_v := (q, V, G_T, A, e)$ of dual pairing vector spaces with a security parameter $\lambda$ and an N-dimensional space V.

Description will be directed herein to a case where the dual pairing vector spaces are constructed using the above-described symmetric bilinear pairing groups. The dual pairing vector spaces can also be constructed using asymmetric bilinear pairing groups. The following description can easily be adapted to a case where the dual pairing vector spaces are constructed using asymmetric bilinear pairing groups.

<4. Inner-Product Predicate Encryption Scheme>

The inner-product predicate encryption scheme has four probabilistic polynomial time algorithms: Setup, KeyGen, Enc, and Dec.

(Setup)
A Setup algorithm takes as input a security parameter $1^\lambda$, and outputs a master public key pk and a master secret key sk.

(KeyGen)
A KeyGen algorithm takes as input the master public key pk, the master secret key $sk_v$ and a predicate vector $v^\rightarrow$, and outputs a secret key $sk_v$.

(Enc)
An Enc algorithm takes as input the master public key pk, an attribute vector $x^\rightarrow$, and a message m, and outputs a ciphertext $ct_x$.

(Dec)
A Dec algorithm takes as input the master public key pk, the secret key $sk_v$, and the ciphertext $ct_x$, and outputs the message m or a distinguished symbol $\perp$. The distinguished symbol $\perp$ is information indicating a decryption failure.

A cryptographic processing system 10 that executes the algorithms of the inner-product predicate encryption scheme will be described.

FIG. 1 is a configuration diagram of the cryptographic processing system 10 according to Embodiment 1.

The cryptographic processing system 10 has a key generation device 100, an encryption device 200 (transmitter), and a decryption device 300 (receiver).

The key generation device 100 executes the Setup algorithm taking as input a security parameter $\lambda$, and thus generates a master public key pk and a master secret key sk. Then, the key generation device 100 publishes the generated master public key pk. The key generation device 100 also executes the KeyGen algorithm taking as input the master public key pk, the master secret key $sk_v$ and a predicate vector $v^\rightarrow$, and thus generates a secret key $sk_v$, and distributes the secret key $sk_v$ to the decryption device 300 in secrecy.

The encryption device 200 executes the Enc algorithm taking as input the master public key pk, an attribute vector $x^\rightarrow$, and a message m, and thus generates a ciphertext $ct_x$. The encryption device 200 transmits the generated ciphertext $ct_x$ to the decryption device 300.

The decryption device 300 executes the Dec algorithm taking as input the master public key pk, the secret key $sk_v$, and the ciphertext $ct_x$, and outputs the message m or the distinguished symbol $\perp$.

Figure 2:
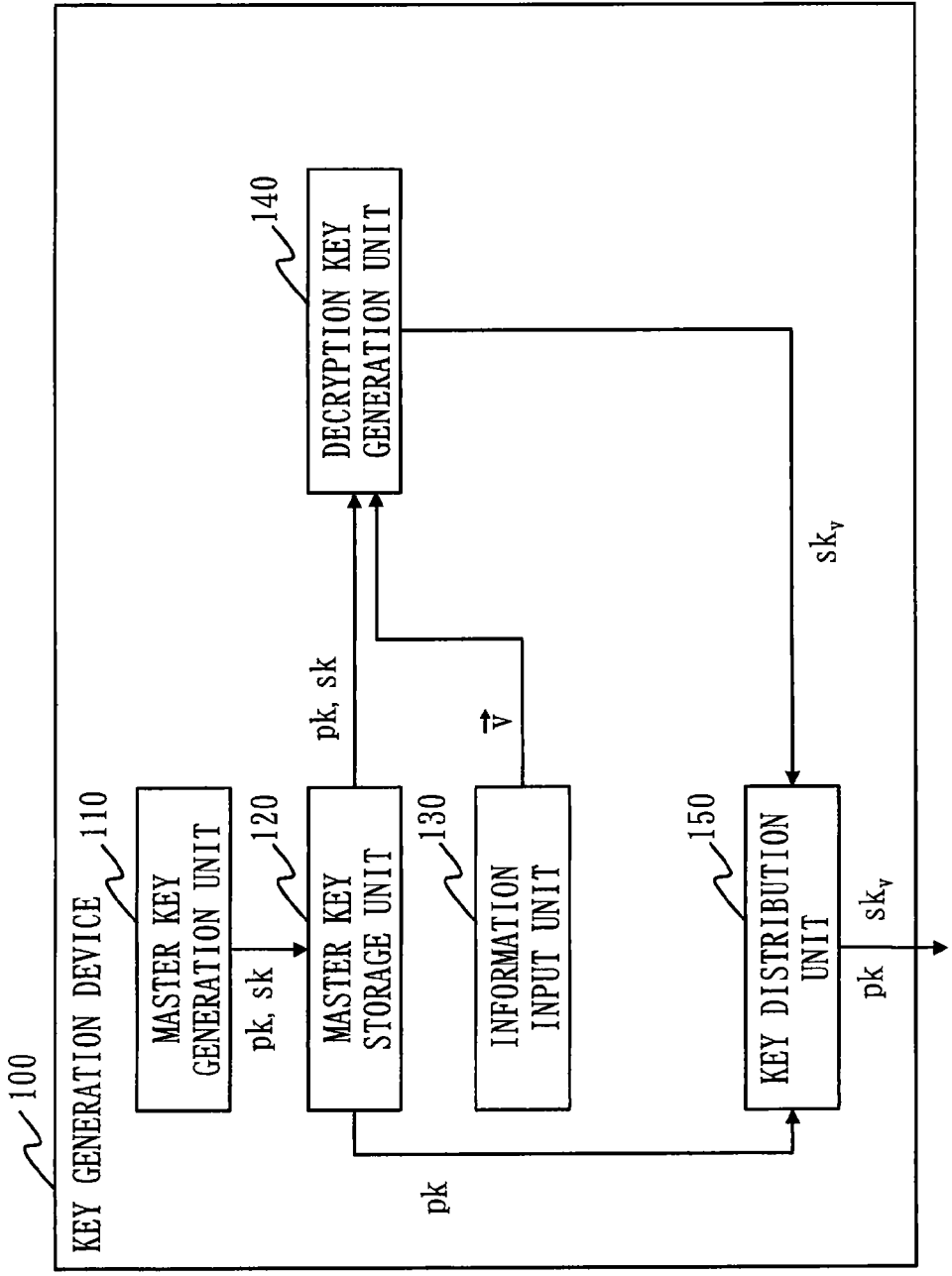
FIG. 2 is a functional block diagram illustrating the function of a key generation device 100 according to Embodiment 1.
Figure 3:
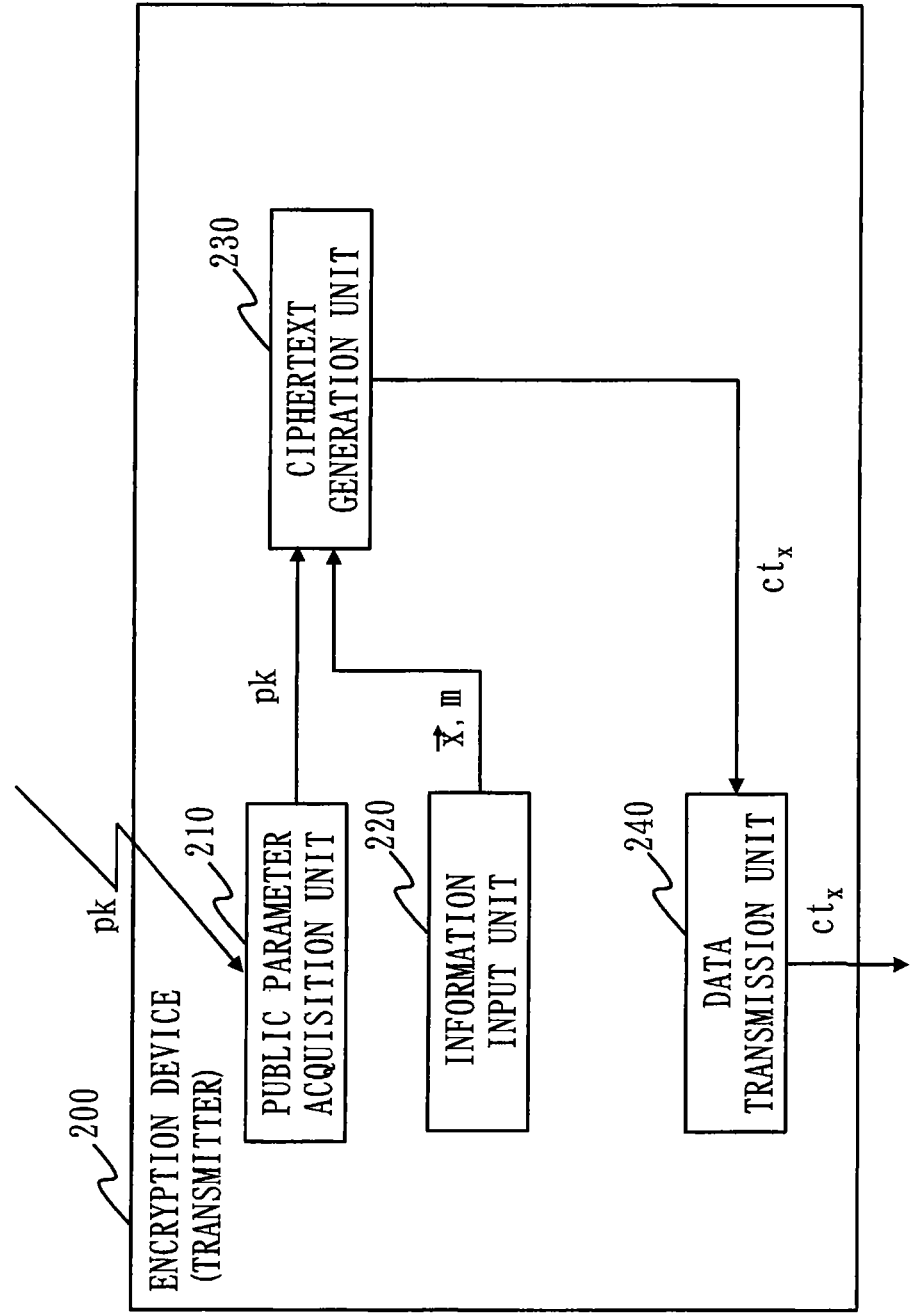
FIG. 3 is a functional block diagram illustrating the function of an encryption device 200 according to Embodiment 1.
Figure 4:
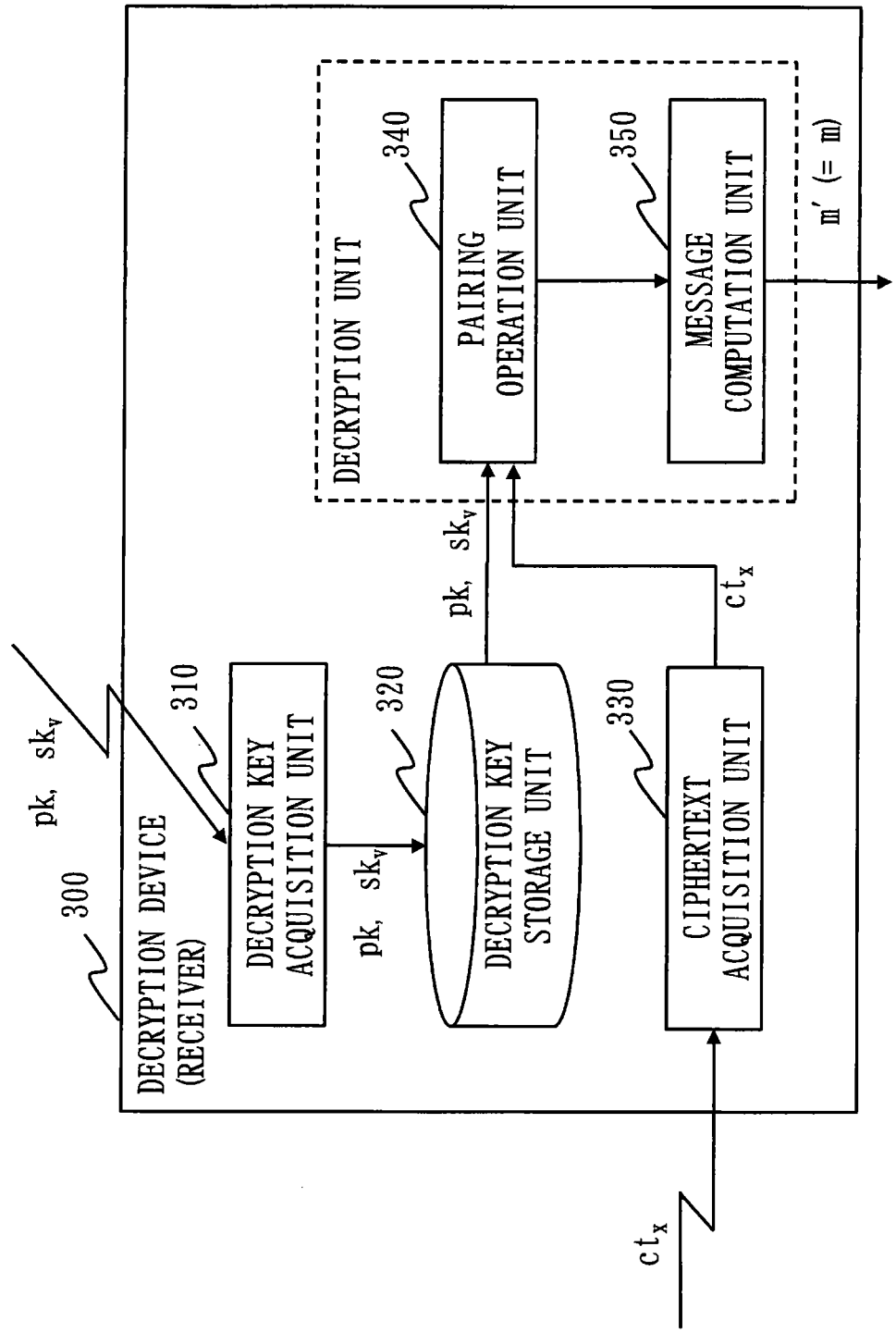
FIG. 4 is a functional block diagram illustrating the function of a decryption device 300 according to Embodiment 1.

FIG. 2 is a functional block diagram illustrating the function of the key generation device 100 according to Embodiment 1. FIG. 3 is a functional block diagram illustrating the function of the encryption device 200 according to Embodiment 1. FIG. 4 is a functional block diagram illustrating the function of the decryption device 300 according to Embodiment 1.

Figure 5:
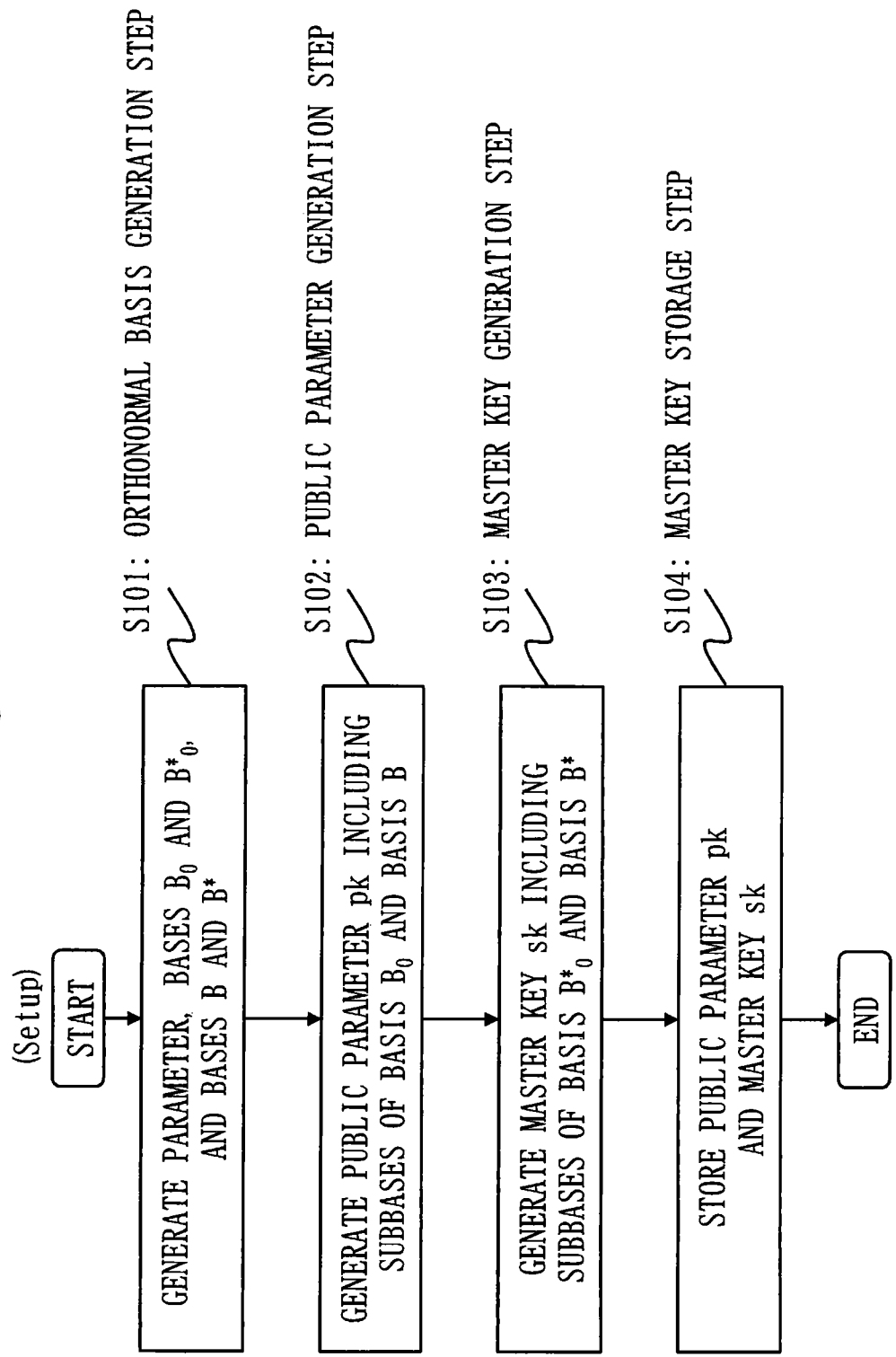
FIG. 5 is a flowchart illustrating the process of a Setup algorithm according to Embodiment 1.
Figure 6:
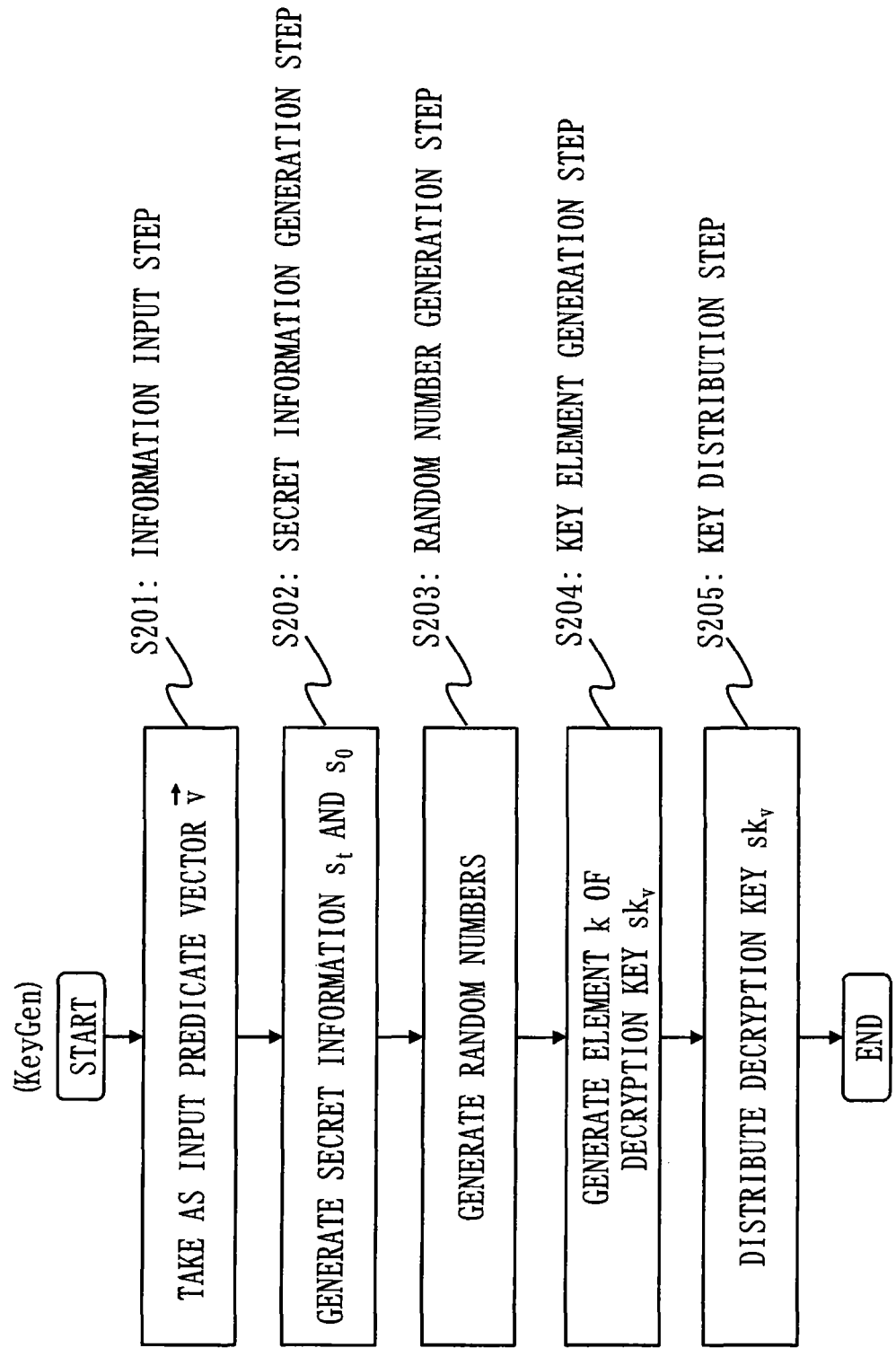
FIG. 6 is a flowchart illustrating the process of a KeyGen algorithm according to Embodiment 1.
Figure 7:
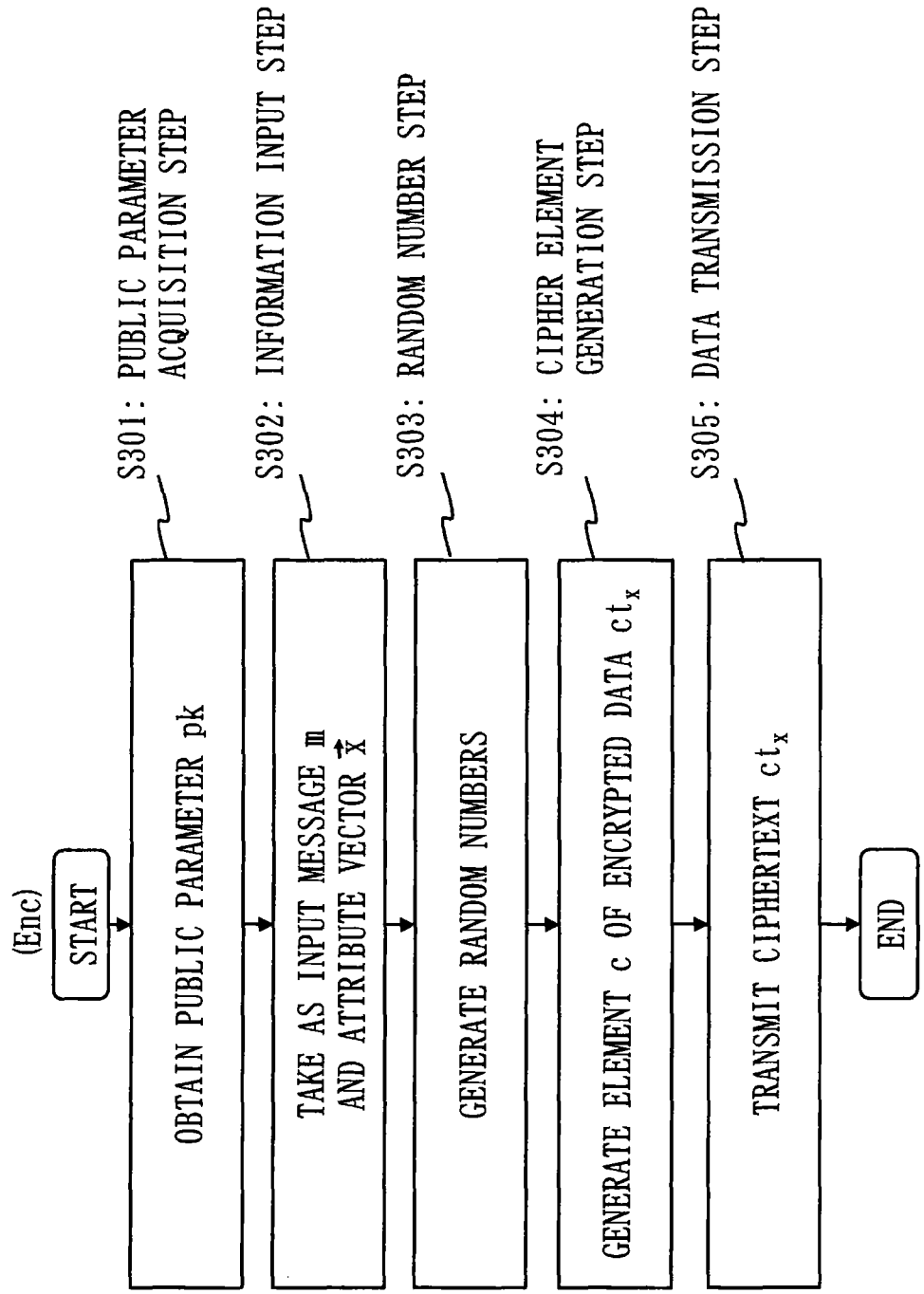
FIG. 7 is a flowchart illustrating the process of an Enc algorithm according to Embodiment 1.
Figure 8:
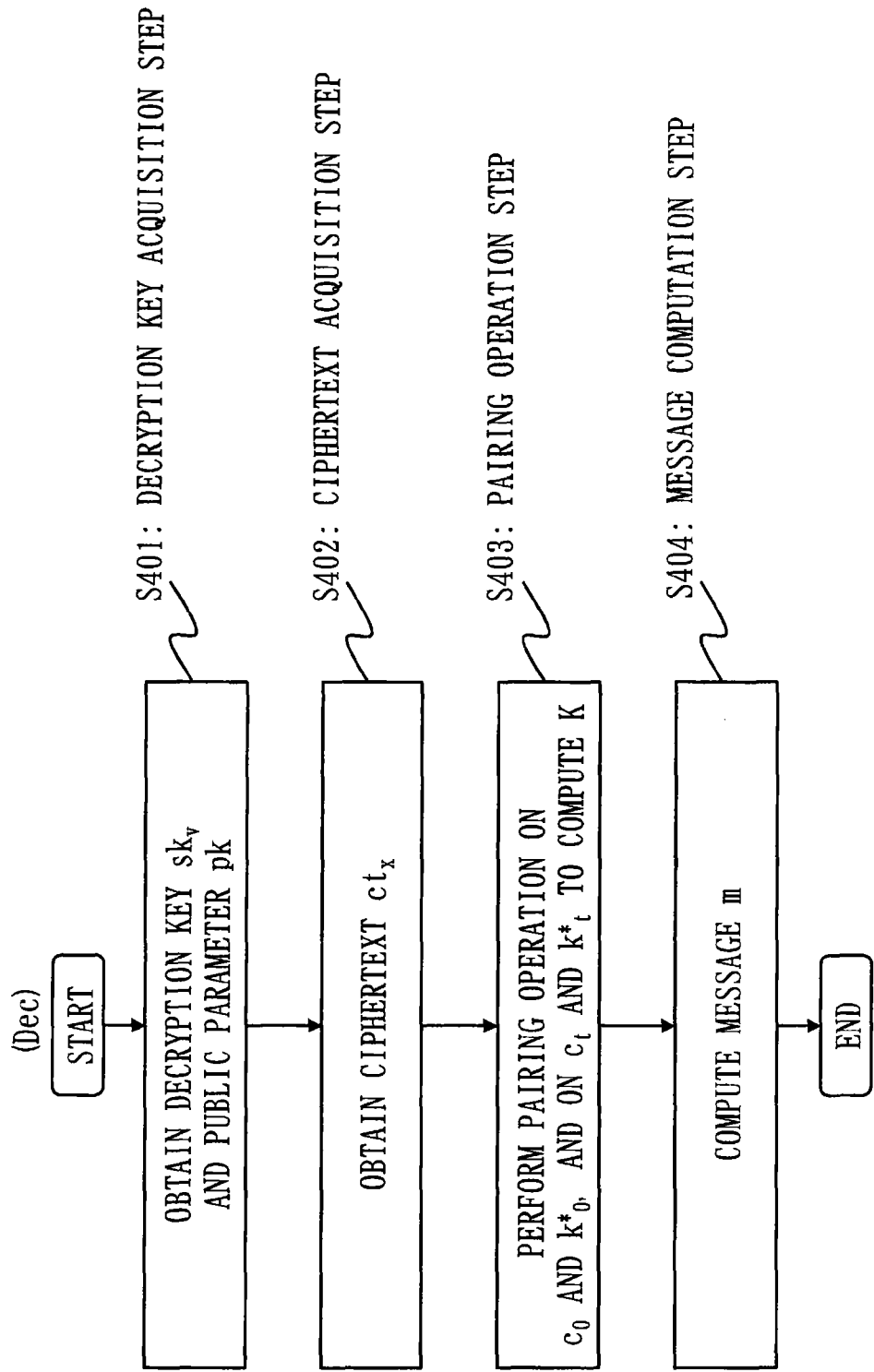
FIG. 8 is a flowchart illustrating the process of a Dec algorithm according to Embodiment 1.

FIGS. 5 and 6 are flowcharts illustrating the operation of the key generation device 100 according to Embodiment 1. FIG. 5 is a flowchart illustrating the process of the Setup algorithm according to Embodiment 1, and FIG. 6 is a flowchart illustrating the process of the KeyGen algorithm according to Embodiment 1. FIG. 7 is a flowchart illustrating the operation of the encryption device 200 according to Embodiment 1 and illustrating the process of the Enc algorithm according to Embodiment 1. FIG. 8 is a flowchart illustrating the operation of the decryption device 300 according to Embodiment 1 and illustrating the process of the Dec algorithm according to Embodiment 1.

The function and operation of the key generation device 100 will be described.

As illustrated in FIG. 2, the key generation device 100 has a master key generation unit 110, a master key storage unit 120, an information input unit 130, a decryption key generation unit 140, and a key distribution unit 150.

First, with reference to FIG. 5, the process of the Setup algorithm will be described.

(S101: Orthonormal Basis Generation Step) Using the processing device, the master key generation unit 110 computes Formula 117, and thus generates a parameter param, a basis $B_0$ and a basis $B^*_0$, and a basis $B_1$ (basis B) and a basis $B^*_1$ (basis B*).

(1) input $1^\lambda$ [Formula 117]

(2) $param_G :=$ $$(q, \mathbb{G}, \mathbb{G}_T, g, e) \xleftarrow{R} \mathcal{G}_{bpg}(1^\lambda)$$

-continued (3) $\psi \xleftarrow{U} \mathbb{F}_q^\times$, $N_0 := 1 + u_0 + 1 + w_0 + z_0$, $N_1 := 4 + u + w + z$ The process (4) through (8) is executed for each $t = 0, 1$.

(4) $\text{param}_{\mathbb{V}_t} :=$ $(q, \mathbb{V}_t, \mathbb{G}_T, \mathbb{A}_t, e) := \mathcal{G}_{dpvs}(1^\lambda, N_t, \text{param}_\mathbb{G})$ (5) $X_t := (\chi_{t,i,j})_{i,j=1,\ldots,N_t} \xleftarrow{U} GL(N_t, \mathbb{F}_q)$ (6) $X_t^* := (\vartheta_{t,i,j})_{i,j=1,\ldots,N_t} := \psi \cdot (X_t^T)^{-1}$ (7) $b_{t,i} := (\vec{\chi}_{t,i}) \mathbb{A}_t = \sum_{j=1}^{N_t} \chi_{t,i,j} a_{t,j}$ for $i = 1, \ldots, N_t$, $\mathbb{B}_t := (b_{t,1}, \ldots, b_{t,N_t})$ (8) $b_{t,i}^* := (\vec{\vartheta}_{t,i}) \mathbb{A}_t = \sum_{j=1}^{N_t} \vartheta_{t,i,j} a_{t,j}$ for $i = 1, \ldots, N_t$, $\mathbb{B}_t^* := (b_{t,1}^*, \ldots, b_{t,N_t}^*)$ (9) $g_T := e(g, g)^\psi$, $\text{param} := (\{\text{param}_{\mathbb{V}_t}\}_{t=0,1}, g_T)$ That is, the master key generation unit 110 executes the following process.

(1) Using the input device, the master key generation unit 110 takes as input a security parameter $\lambda(1^\lambda)$.

(2) Using the processing device, the master key generation unit 110 executes the algorithm $G_{bpg}$ taking as input the security parameter $\lambda(1^\lambda)$ inputted in (1), and thus generates values of a parameter $\text{param}_G := (q, G, G_T, g, e)$ of bilinear pairing groups.

(3) Using the processing device, the master key generation unit 110 generates a random number $\psi$, sets $1+u_0+1+w_0+z_0$ in $N_0$, and sets $4+u+w+z$ in $N_1$, where $u_0$, $w_0$, $z_0$, $u$, $w$, and $z$ are each an integer of 0 or more.

Then, the master key generation unit 110 executes the following process (4) through (8) for each $t=0, 1$.

(4) Using the processing device, the master key generation unit 110 executes the algorithm $G_{dpvs}$ taking as input the security parameter $\lambda(1^\lambda)$ inputted in (1), $N_t$ set in (3), and the values of $\text{param}_G := (q, G, G_T, g, e)$ generated in (2), and thus generates values of a parameter $\text{param}_{Vt} := (q, V_t, G_T, A_t, e)$ of dual pairing vector spaces.

(5) Using the processing device, the master key generation unit 110 takes as input $N_t$ set in (3) and $\mathbb{F}_q$, and randomly generates a linear transformation $X_t := (\chi_{t,i,j})_{i,j}$. Note that GL stands for general linear. In other words, GL is a general linear group, a set of square matrices with nonzero determinants, and a group under multiplication. Note that $(\chi_{t,i,j})_{i,j}$ denotes a matrix concerning the suffixes i and j of the matrix $\chi_{t,i,j}$, where $i, j=1, \ldots, N_t$.

(6) Using the processing device and based on the random number $\psi$ and the linear transformation $X_t$, the master key generation unit 110 generates $(v_{t,i,j})_{i,j} := \psi \cdot (X_t^T)^{-1}$. Like $(\chi_{t,i,j})_{i,j}$, $(v_{t,i,j})$ denotes a matrix concerning the suffixes i and j of the matrix $v_{t,i,j}$, where $i, j=1, \ldots, N_t$.

(7) Using the processing device and based on the linear transformation $X_t$ generated in (5), the master key generation unit 110 generates a basis $B_t$ from the orthonormal basis $A_t$ generated in (4). Note that $\vec{x}_{t,i}$ indicates the i-th row of the linear transformation $X_t$.

(8) Using the processing device and based on $(v_{t,i,j})_{i,j}$ generated in (6), the master key generation unit 110 generates a basis $B_t^*$ from the orthonormal basis $A_t$ generated in (4). Note that $\vec{v}_{t,i}$ indicates the i-th row of the linear transformation $X_t^*$.

(9) Using the processing device, the master key generation unit 110 sets $e(g, g)^\psi$ in $g_T$. The master key generation unit 110 also sets $\{\text{param}_{Vt}\}_{t=0,1}$ generated in (4) and $g_T$ in param.

In brief, in S101, the master key generation unit 110 generates param, the basis $B_0$ and the basis $B^*_0$, and the basis $B_1$ (basis B) and the basis $B^*_1$ (basis B*) by executing the algorithm $G_{ob}$ indicated in Formula 118.

$\mathcal{G}_{ob}(1^\lambda):$ [Formula 118]

$\text{param}_\mathbb{G} := (q, \mathbb{G}, \mathbb{G}_T, g, e) \xleftarrow{R} \mathcal{G}_{bpg}(1^\lambda)$, $\psi \xleftarrow{U} \mathbb{F}_q^\times$, $N_0 := 1 + u_0 + 1 + w_0 + z_0$, $N_1 := 4 + u + w + z$, for $t = 0, 1$ $\text{param}_{\mathbb{V}_t} :=$ $(q, \mathbb{V}_t, \mathbb{G}_T, \mathbb{A}_t, e) := \mathcal{G}_{dpvs}(1^\lambda, N_t, \text{param}_\mathbb{G})$, $X_t := (\chi_{t,i,j})_{i,j=1,\ldots,N_t} \xleftarrow{U} GL(N_t, \mathbb{F}_q)$, $X_t^* := (\vartheta_{t,i,j})_{i,j=1,\ldots,N_t} := \psi \cdot (X_t^T)^{-1}$, hereafter, $\vec{\chi}_{t,i}$ and $\vec{\vartheta}_{t,i}$ denote the i-th rows of $X_t$ and $X_t^*$ for $i = 1$, $\ldots, N_t$, respectively, $b_{t,i} := (\vec{\chi}_{t,i})_{\mathbb{A}_t} = \sum_{j=1}^{N_t} \chi_{t,i,j} a_{t,j}$ for $i = 1, \ldots, N_t$, $\mathbb{B}_t := (b_{t,1}, \ldots, b_{t,N_t})$, $b_{t,i}^* := (\vec{\vartheta}_{t,i})_{\mathbb{A}_t} = \sum_{j=1}^{N_t} \vartheta_{t,i,j} a_{t,j}$ for $i = 1, \ldots, N_t$, $\mathbb{B}_t^* := (b_{t,1}^*, \ldots, b_{t,N_t}^*)$, $g_T := e(g, g)^\psi$, $\text{param} := (\{\text{param}_{\mathbb{V}_t}\}_{t=0,1}, g_T)$, return $(\text{param}, \mathbb{B}_t, \mathbb{B}_t^*)$.

In the following description, for simplicity, the basis $B_1$ and the basis $B^*_1$ will be described as the basis B and the basis B*.

(S102: Public Parameter Generation Step)

Using the processing device, the master key generation unit 110 generates a subbasis $\hat{B}_0$ of the basis $B_0$ and a subbasis $\hat{B}$ of the basis B, as indicated in Formula 119, the bases $B_0$ and B having been generated in S101.

$\hat{\mathbb{B}}_0 := (b_{0,1}, b_{0,1+u_0+1}, b_{0,1+u_0+1+w_0+1}, \ldots,$
$b_{0,1+u_0+1+w_0+z_0})$, $\hat{\mathbb{B}} := (b_1, \ldots, b_4, b_{4+u+w+1}, \ldots, b_{4+u+w+z})$ [Formula 119]

The master key generation unit 110 generates a public parameter pk by putting together the generated subbasis $\hat{B}_0$ and subbasis $\hat{B}$, the security parameter $\lambda(1^\lambda)$ inputted in S101, and param generated in S101.

(S103: Master Key Generation Step)

Using the processing device, the master key generation unit 110 generates a subbasis $\hat{B}^*_0$ of the basis $B^*_0$ and a subbasis $\hat{B}^*$ of the basis $B^*$, as indicated in Formula 120, the bases $B^*_0$ and $B^*$ having been generated in S101.

$$\hat{\mathbb{F}}^*_0 := (b^*_{0,1}, b^*_{0,1+u_0+1}, b^*_{0,1+u_0+1+1}, \ldots$$
$$b^*_{0,1+u_0+1+w_0}),$$
$$\hat{\mathbb{F}}^* := (b^*_1, \ldots, b^*_4, b^*_{4+u+1}, \ldots, b^*_{4+u+w}) \quad \text{[Formula 120]}$$

The master key generation unit 110 generates a master key sk which is constituted by the generated subbasis $\hat{B}^*_0$ and subbasis $\hat{B}^*$.

(S104: Master Key Storage Step)

The master key storage unit 120 stores the public parameter pk generated in S102 in the storage device. The master key storage unit 120 also stores the master key sk generated in S103 in the storage device.

In brief, in S101 through S103, the key generation device 100 generates the public parameter pk and the master key sk by executing the Setup algorithm indicated in Formula 121. In S104, the key generation device 100 stores the generated public parameter pk and master key sk in the storage device.

The public parameter is published via the network, for example, and is made available for the encryption device 200 and the decryption device 300.

$$\text{Setup}(1^\lambda): \quad \text{[Formula 121]}$$

$$(param, (\mathbb{B}_0, \mathbb{B}^*_0), (\mathbb{B}, \mathbb{B}^*)) \xleftarrow{R} \mathcal{G}_{ob}(1^\lambda),$$

$$\hat{\mathbb{B}}_0 :=$$
$$(b_{0,1}, b_{0,1+u_0+1}, b_{0,1+u_0+1+w_0+1}, \ldots, b_{0,1+u_0+1+w_0+z_0}),$$

$$\hat{\mathbb{B}} := (b_1, \ldots, b_4, b_{4+u+w+1}, \ldots, b_{4+u+w+z}),$$

$$\hat{\mathbb{B}}^*_0 := (b^*_{0,1}, b_{0,1+u_0+1}, b^*_{0,1+u_0+1+1}, \ldots, b^*_{0,1+u_0+1+w_0}),$$

$$\hat{\mathbb{B}}^* := (b^*_1, \ldots, b^*_4, b^*_{4+u+1}, \ldots, b^*_{4+u+w}),$$

$$\text{return } pk := (1^\lambda, param, \hat{\mathbb{B}}_0, \hat{\mathbb{B}}), sk := (\hat{\mathbb{B}}^*_0, \hat{\mathbb{B}}^*).$$

With reference to FIG. 6, the process of the KeyGen algorithm will be described.

(S201: Information Input Step)

Using the input device, the information input unit 130 takes as input a predicate vector $\vec{v} := \{(t, v_t) | t \in I_{\vec{v}}\}$. That is, the predicate vector $\vec{v}$ is a vector having, as elements, an index t and predicate information $v_t$ for the index t included in a set $I_{\vec{v}}$. As the predicate information $v_t$, attribute information of a user of a decryption key $sk_v$ is set, for example.

(S202: Secret Information Generation Step)

Using the processing device, the decryption key generation unit 140 generates secret information $s_t$ and $s_0$, as indicated in Formula 122.

$$s_t \xleftarrow{U} \mathbb{F}_q \text{ for } (t, v_t) \in \vec{v}, \quad \text{[Formula 122]}$$
$$s_0 := \sum_{(t,v_t) \in \vec{v}} s_t$$

(S203: Random Number Generation Step)

Using the processing device, the decryption key generation unit 140 generates random numbers, as indicated in Formula 123.

$$\vec{\eta}_0 := (\eta_{0,1}, \ldots, \eta_{0,w_0}) \xleftarrow{U} \mathbb{F}_q^{w_0}, \quad \text{[Formula 123]}$$

$$\delta \xleftarrow{U} \mathbb{F}_q,$$
$$\mu_t \xleftarrow{U} \mathbb{F}_q \text{ for } (t, v_t) \in \vec{v},$$
$$\vec{\eta}_t := (\eta_{t,1}, \ldots, \eta_{t,w}) \xleftarrow{U} \mathbb{F}_q^w \text{ for } (t, v_t) \in \vec{v}$$

(S204: Key Element Generation Step)

Using the processing device, the decryption key generation unit 140 generates an element $k^*_0$ of the decryption key $sk_v$, as indicated in Formula 124.

$$k^*_0 := \left(-s_0, \overbrace{0^{u_0}}^{u_0}, 1, \overbrace{\vec{\eta}_0}^{w_0}, \overbrace{0^{z_0}}^{z_0}\right)_{\mathbb{B}^*_0} \quad \text{[Formula 124]}$$

As described above, for the basis B and the basis $B^*$ indicated in Formula 110, Formula 111 is established. Thus, Formula 124 means that $-s_0$ is set as the coefficient of a basis vector $b^*_{0,1}$ of the basis $B^*_0$, that 0 is set as the coefficient of basis vectors $b^*_{0,1+1}, \ldots, b^*_{0,1+u0}$, that 1 is set as the coefficient of a basis vector $b^*_{0,1+u0+1}$, that $\eta_{0,1}, \ldots, \eta_{0,w0}$ are respectively set as the coefficient of basis vectors $b^*_{0,1+u0+1+1}, \ldots, b^*_{0,1+u0+1+w0}$, and that 0 is set as the coefficient of basis vectors $b^*_{0,1+u0+1+w0+1}, \ldots, b^*_{0,1+u0+1+w0+z0}$, where u0, w0, and z0 respectively denote $u_0$, $w_0$, and $z_0$.

Using the processing device, the decryption key generation unit 140 also generates an element $k^*_t$ of the decryption key $sk_v$ for the index t included in the set $I_{\vec{v}}$, as indicated in Formula 125.

$$k^*_t := \left(\overbrace{\mu_t(t, -1,), \delta v_t, s_t}^{4}, \overbrace{0^u}^{u}, \overbrace{\vec{\eta}_t}^{w}, \overbrace{0^z}^{z}\right)_{\mathbb{B}^*} \quad \text{[Formula 125]}$$

That is, like Formula 124, Formula 125 means that $\mu_t t$ is set as the coefficient of a basis vector $b^*_1$ of the basis $B^*$, that $-\mu_t$ is set as the coefficient of a basis vector $b^*_2$, that $\delta v_t$ is set as the coefficient of a basis vector $b^*_3$, that $s_t$ is set as the coefficient of a basis vector $b^*_4$, that 0 is set as the coefficient of basis vectors $b^*_{4+1}, \ldots, b^*_{4+u}$, that $\eta_{t,1}, \ldots, \eta_{t,w}$ are respectively set as the coefficient of basis vectors $b^*_{4+u+1}, \ldots, b^*_{4+u+w}$, and that 0 is set as the coefficient of basis vectors $b^*_{4+u+w+1}, \ldots b^*_{4+u+w+z}$.

(S205: Key Distribution Step)

Using the communication device and via the network, for example, the key distribution unit 150 distributes the decryption key $sk_v$ having, as elements, $k^*_0$ and $k^*_t$ generated in S204 to the decryption device 300 in secrecy. As a matter of course, the decryption key $sk_v$ may be distributed to the decryption device 300 by another method.

In brief, in S201 through S204, the key generation device 100 generates the decryption key $sk_v$ by executing the KeyGen algorithm indicated in Formula 126. In S205, the key generation device 100 distributes the generated decryption key $sk_v$ to the decryption device 300.

$$\text{KeyGen}(pk, sk, \vec{v} := \{(t, v_t) | t \in I_{\vec{v}}\}): \quad \text{[Formula 126]}$$

$$\delta, s_t \xleftarrow{U} \mathbb{F}_q \text{ for } (t, v_t) \in \vec{v},$$
$$\vec{\eta}_0 := (\eta_{0,1}, \ldots, \eta_{0, w_0}) \xleftarrow{U} \mathbb{F}_q^{w_0},$$

-continued $$s_0 := \sum_{(t,v_t)\in \vec{v}} s_t,$$

$$k_0^* := \left(-s_0, \frac{u_0}{0^{u_0}}, 1, \frac{w_0}{\vec{\eta}_0}, \frac{z_0}{0^{z_0}},\right)\mathbb{B}_0^*,$$

for $(t, v_t) \in \vec{v}$, $$\mu_t \xleftarrow{U} \mathbb{F}_q,$$

$$\vec{\eta}_t := (\eta_{t,1}, \ldots , \eta_{t,w}) \xleftarrow{U} \mathbb{F}_q^w,$$

$$k_t^* := \left(\frac{4}{\mu_t(t,-1,),\delta v_t, s_t}, \frac{u}{0^u}, \frac{w}{\vec{\eta}_t}, \frac{z}{0^z}\right)\mathbb{B}^*,$$

return $sk_v := (k_0^*, \{k_t^*\}_{(t,v_t)\in\vec{v}})$.

The function and operation of the encryption device 200 will be described.

The encryption device 200 has a public parameter acquisition unit 210, an information input unit 220, a ciphertext generation unit 230, and a data transmission unit 240.

With reference to FIG. 7, the process of the Enc algorithm will be described.

(S301: Public Parameter Acquisition Step)

Using the communication device and via the network, for example, the public parameter acquisition unit 210 obtains the public parameter pk generated by the key generation device 100.

(S302: Information Input Step) Using the input device, the information input unit 220 takes as input a message m to be transmitted to the decryption device 300. Using the input device, the information input unit 220 also takes as input an attribute vector $x^{\rightarrow}:=\{(t, x_t)|t\in I_{x\rightarrow}\}$. That is, the attribute vector $x^{\rightarrow}$ is a vector having, as elements, an index t and attribute information $x_t$ for the index t included in a set $I_{x\rightarrow}$. In the attribute vector $x^{\rightarrow}$, attribute information of a user capable of decryption is set, for example.

(S303: Random Number Generation Step)

Using the processing device, the ciphertext generation unit 230 generates random numbers, as indicated in Formula 127.

$$\omega, \tilde{\omega}, \zeta \xleftarrow{U} \mathbb{F}_q,$$ [Formula 127]

$$\vec{\varphi}_0 := (\varphi_{0,1}, \ldots , \varphi_{0,z_0}) \xleftarrow{U} \mathbb{F}_q^{z_0},$$

$$\sigma_t \xleftarrow{U} \mathbb{F}_q \text{ for } (t, x_t) \in \vec{x},$$

$$\vec{\varphi}_t := (\varphi_{t,1}, \ldots , \varphi_{t,z}) \xleftarrow{U} \mathbb{F}_q^z \text{ for } (t, x_t) \in \vec{x}$$

(S304: Cipher Element Generation Step)

Using the processing device, the ciphertext generation unit 230 generates an element $c_0$ of a ciphertext $ct_x$, as indicated in Formula 128.

$$c_0 := \left(\tilde{\omega}, \frac{u_0}{0^{u_0}}, \zeta, \frac{w_0}{0^{w_0}}, \frac{z_0}{\vec{\varphi}_0}\right)\mathbb{B}_0$$ [Formula 128]

Using the processing device, the ciphertext generation unit 230 also generates an element $c_t$ of the ciphertext $ct_x$ for the index t included in the set $I_{x\rightarrow}$, as indicated in Formula 129.

$$c_t = \left(\frac{4}{\sigma_t(1,t), \omega x_t, \tilde{\omega}}, \frac{u}{0^u}, \frac{w}{0^w}, \frac{z}{\vec{\varphi}_t}\right)\mathbb{B}$$ [Formula 129]

Using the processing device, the ciphertext generation unit 230 also generates an element $c_T$ of the ciphertext $ct_x$, as indicated in Formula 130.

$$c_T := g_T^\zeta m$$ [Formula 130]

(S305: Data Transmission Step)

Using the communication device and via the network, for example, the data transmission unit 240 transmits the ciphertext $ct_x$ having, as elements, $c_0$, $c_t$, and $c_T$ generated in S304 to the decryption device 300. As a matter of course, the ciphertext $ct_x$ may be transmitted to the decryption device 300 by another method.

In brief, in S301 through S304, the encryption device 200 generates the ciphertext $ct_x$ by executing the Enc algorithm indicated in Formula 131. In S305, the encryption device 200 transmits the generated ciphertext $ct_x$ to the decryption device 300.

$$Enc(pk, m, \vec{x} := \{(t, x_t) | t \in I_{\vec{x}}\}):$$ [Formula 131]

$$\omega, \tilde{\omega}, \zeta \xleftarrow{U} \mathbb{F}_q, \vec{\varphi}_0 := (\varphi_{0,1}, \ldots , \varphi_{0,z_0}) \xleftarrow{U} \mathbb{F}_q^{z_0},$$

$$c_0 := \left(\tilde{\omega}, \frac{u_0}{0^{u_0}}, \zeta, \frac{w_0}{0^{w_0}}, \frac{z_0}{\vec{\varphi}_0}\right)\mathbb{B}_0,$$

for $(t, x_t) \in \vec{x}$, $$\sigma_t \xleftarrow{U} \mathbb{F}_q, \vec{\varphi}_t := (\varphi_{t,1}, \ldots , \varphi_{t,z}) \xleftarrow{U} \mathbb{F}_q^z,$$

$$c_t = \left(\frac{4}{\sigma_t(1,t), \omega x_t, \tilde{\omega}}, \frac{u}{0^u}, \frac{w}{0^w}, \frac{z}{\vec{\varphi}_t}\right)\mathbb{B},$$

$$c_T := g_T^\zeta m$$

return $ct_x := (c_0, \{c_t\}_{(t,x_t)\in\vec{x}}, c_T)$.

The function and operation of the decryption device 300 will be described.

The decryption device 300 has a decryption key acquisition unit 310, a decryption key storage unit 320, a ciphertext acquisition unit 330, a pairing operation unit 340, and a message computation unit 350. The pairing operation unit 340 and the message computation unit 350 will be referred to collectively as a decryption unit.

With reference to FIG. 8, the process of the Dec algorithm will be described.

(S401: Decryption Key Acquisition Step)

Using the communication device and via the network, for example, the decryption key acquisition unit 310 obtains the decryption key $sk_v$ distributed by the key generation device 100. The decryption key acquisition unit 310 also obtains the public parameter pk generated by the key generation device 100.

The decryption key acquisition unit 310 stores the obtained decryption key sk, and public parameter pk in the decryption key storage unit 320.

(S402: Ciphertext Acquisition Step)

Using the communication device and via the network, for example, the ciphertext acquisition unit 330 receives the ciphertext $ct_x$ transmitted by the encryption device 200.

(S403: Pairing Operation Step)

Using the processing device, the pairing operation unit 340 computes Formula 132, and thus generates a session key $K = g_T^\zeta$.

$$K := e(c_0, k_0^*) \prod_{t \in L_{\vec{v}}} e(c_t, k_t^*) \qquad \text{[Formula 132]}$$

If Formula 133 holds, the key $K = g_T^\zeta$ can be obtained by computing Formula 132, as indicated in Formula 134.

$$I_{\vec{v}} \subset I_{\vec{x}} \text{ and} \qquad \text{[Formula 133]}$$
$$\sum_{t \in L_{\vec{v}}} v_t \cdot x_t = 0$$

$$K := e(c_0, k_0^*) \prod_{t \in L_{\vec{v}}} e(c_t, k_t^*) \qquad \text{[Formula 134]}$$
$$= g_T^{-\tilde{\omega} s_0 + \zeta} \cdot \prod_{t \in L_{\vec{v}}} g_T^{\delta \omega v_t x_t + \tilde{\omega} s_t}$$
$$= g_T^{-\tilde{\omega} s_0 + \zeta} \cdot g_T^{\delta\omega\left(\sum_{(t,v_t) \in L_{\vec{v}}} v_t x_t\right) + \tilde{\omega}\left(\sum_{(t,v_t) \in L_{\vec{v}}} s_t\right)}$$
$$= g_T^{-\tilde{\omega} s_0 + \zeta + \tilde{\omega} s_0}$$
$$= g_T^\zeta$$

That is, if the set $I_{\vec{v}}$ is a subset of the set $I_{\vec{x}}$ and if the sum of $v_t x_t$ is 0 for the index t included in the set $I_{\vec{v}}$, the key $K = g_T^\zeta$ can be obtained by computing Formula 132.

(S404: Message Computation Step)

Using the processing device, the message computation unit 350 computes $m' = c_T/K$, and thus generates a message m' (=m). Note that $c_T$ is $g_T^\zeta m$ as indicated in Formula 130 and K is $g_T^\zeta$. Thus, the message m can be obtained by computing $m' = c_T/K$.

In brief, in S401 through S404, the decryption device 300 generates the message m' (=m) by executing the Dec algorithm indicated in Formula 135.

$$Dec(pk, sk_v := (k_0^*, \{k_t^*\}_{(t,v_t) \in \vec{v}}), ct_x := (c_0, \{c_t\}_{(t,x_t) \in \vec{x}}, c_T)): \qquad \text{[Formula 135]}$$

if $I_{\vec{v}} \subset I_{\vec{x}}$ and $\sum_{t \in L_{\vec{v}}} v_t x_t = 0$, $$K := e(c_0, k_0^*) \prod_{t \in L_{\vec{v}}} e(c_t, k_t^*),$$

return $m' := c_T/K$.

As described above, in the inner-product predicate encryption scheme according to Embodiment 1, even if the dimensions of the attribute vector $\vec{x}$ and the predicate vector $\vec{v}$ are not equivalent, the ciphertext $ct_x$ can be decrypted with the decryption key $sk_v$ if the set $I_{\vec{v}}$ is a subset of the set $I_{\vec{x}}$ and if the sum of $v_t x_t$ is 0 for the index t included in the set $I_{\vec{v}}$.

In the inner-product predicate encryption scheme according to Embodiment 1, $\mu_t t$ and $-\mu_t$ are respectively set as the coefficient of the basis vectors $b^*_1$ and $b^*_2$ (basis vectors $b^*_{index}$) for the element $k^*_t$ of the decryption key $sk_v$. In the cryptographic system 10, $\sigma_t$ and $\sigma_t t$ are respectively set as the coefficient of the basis vectors $b_1$ and $b_2$ (basis vectors $b_{index}$) for the element $c_t$ of the ciphertext $ct_x$.

Because of these arrangements, when a pairing operation is performed on the element $k^*_t$ and the element $c_t$ for the corresponding index t, the inner-product becomes 0 for portions constituted by the basis vectors $b^*_1$ and $b^*_2$ and the basis vectors $b_1$ and $b_2$, which are thus cancelled out. That is, when a pairing operation is performed on the element $k^*_t$ and the element $c_t$ for the corresponding index t, the index parts that are set as the coefficients of the basis vectors (portions constituted by the basis vectors $b^*_1$ and $b^*_2$ and the basis vectors $b_1$ and $b_2$) are cancelled out, and a result of the pairing operation for the remaining portions is obtained.

In the inner-product predicate encryption scheme according to Embodiment 1, the index parts are provided so that the bases which are used for each attribute category can be constructed as the common bases (basis B and basis B*). As a result, only the basis B and the basis B* need to be included in a public parameter, eliminating the need for reissuing the public parameter when an attribute category is to be added at a later stage.

It is required for the index parts that 0 be obtained as a result of an inner-product operation. Therefore, although the two-dimensional index parts, namely the basis vectors $b^*_1$ and $b^*_2$ and the basis vectors $b_1$ and $b_2$, are employed in the above description, the index parts are not limited to two-dimensional and may be three-dimensional or higher-dimensional. The values assigned to the index parts are not limited to those described above, and a different assignment arrangement may be employed.

In the above description, the index parts are provided so that the bases which are used for each attribute category are constructed as the common bases (basis B and basis B*). However, in a case where reissuing of the public parameter to add an attribute category at a later stage is permitted, there is no need to provide the index parts if it is arranged that the bases which are used for each attribute category are respectively different.

In this case, the $G_{ob}$ algorithm, the Setup algorithm, the KeyGen algorithm, and the Enc algorithm of the inner-product predicate encryption scheme described above are as indicated in Formula 136 through Formula 139. The Dec algorithm is as indicated in Formula 135, with no change.

$$\mathcal{G}_{ob}(1^\lambda): \qquad \text{[Formula 136]}$$
$$param_\mathbb{G} := (q, \mathbb{G}, \mathbb{G}_T, g, e) \xleftarrow{R} \mathcal{G}_{bpg}(1^\lambda),$$
$$\psi \xleftarrow{U} \mathbb{F}_q^x,$$
$$N_0 := 1 + u_0 + 1 + w_0 + z_0, N_1 := 2 + u_t + w_t + z_t$$
for $t = 1, \ldots, d$, for $t = 0, \ldots, d$,
$$param_{\mathbb{V}_t} := (q, \mathbb{V}_t, \mathbb{G}_T, \mathbb{A}_t, e) := \mathcal{G}_{dpvs}(1^\lambda, N_t, param_\mathbb{G}),$$
$$X_t := (\chi_{t,i,j})i, j = 1, \ldots, N_t \xleftarrow{U} GL(N_t, \mathbb{F}_q),$$
$$X_t^* := (\vartheta_{t,i,j})_{i,j=1,\ldots,N_t} := \psi \cdot (X_t^T)^{-1}, \text{ hereafter, } \vec{\chi}_{t,i}$$
and $\vartheta_{t,i}$ denote the $i$-th rows of $X_t$ and $X_t^*$ for $i = 1$,
$$\ldots, N_t, \text{ respectively,}$$
$$b_{t,i} := (\vec{\chi}_{t,i})_{\mathbb{A}_t} = \sum_{j=1}^{N_t} \chi_{t,i,j} a_{t,j} \text{ for } i = 1, \ldots, N_t,$$
$$\mathbb{B}_t := (b_{t,1}, \ldots, b_{t,N_t}),$$
$$b_{t,i}^* := (\vec{\vartheta}_{t,i})_{\mathbb{A}_t} = \sum_{j=1}^{N_t} \vartheta_{t,i,j} a_{t,j} \text{ for } i = 1, \ldots, N_t,$$
$$\mathbb{B}_t^* := (b_{t,1}^*, \ldots, b_{t,N_t}^*),$$
$$g_T := e(g, g)^\psi, param := (\{param_{\mathbb{V}_t}\}_{t=0,\ldots,d}, g_T),$$
return $(param, \{\mathbb{B}_t, \mathbb{B}_t^*\}_{t=0,\ldots,d})$.

-continued

Setup($1^\lambda$): [Formula 137]

$(param, \{\mathbb{B}_t, \mathbb{B}_t^*\}_{t=0,\ldots,d})) \xleftarrow{R} \mathcal{G}_{ob}(1^\lambda),$ $\hat{\mathbb{B}}_0 := (b_{0,1}, b_{0,1+u_0+1}, b_{0,1+u_0+1+w_0+1}, \ldots, b_{0,1+u_0+1+w_0+z_0}),$ $\hat{\mathbb{B}}_t := (b_{t,1}, \ldots, b_{t,2}, b_{t,2+w_t+1}, \ldots, b_{t,2+u_t+w_t+z_t})$ for $t = 0, \ldots, d,$ $\hat{\mathbb{B}}_0^* := (b_{0,1}^*, b_{0,1+u_0+1}^*, b_{0,1+u_0+1+1}^*, \ldots, b_{0,1+u_0+1+w_0}^*),$ $\hat{\mathbb{B}}_t^* := (b_{t,1}^*, \ldots, b_{t,2}^*, b_{t,2+u_t+1}^*, \ldots, b_{t,2+u_t+w_t}^*)$ for $t = 0, \ldots, d,$ return $pk := (1^\lambda, param, \hat{\mathbb{B}}_0, \{\hat{\mathbb{B}}_t\}_{t=1,\ldots,d}),$ $sk := (\hat{\mathbb{B}}_0^*, \{\hat{\mathbb{B}}_t^*\}_{t=1,\ldots,d}).$ KeyGen($pk, sk, \vec{v} := \{(t, v_t) \mid t \in I_{\vec{v}}\}$): [Formula 138]

$\delta, s_t \xleftarrow{U} \mathbb{F}_q$ for $(t, v_t) \in \vec{v},$ $\vec{\eta}_0 := (\eta_{0,1}, \ldots, \eta_{0}, w_0) \xleftarrow{U} \mathbb{F}_q^{w_0},$ $s_0 := \sum_{(t,v_t)\in v} s_t,$ $k_0^* := \left(-s_0, \overbrace{0^{u_0}}^{u_0}, 1, \overbrace{\vec{\eta}_0}^{w_0}, \overbrace{0^{z_0}}^{z_0}\right)_{\mathbb{B}_0^*},$ for $(t, v_t) \in \vec{v},$ $\mu_t \xleftarrow{U} \mathbb{F}_q,$ $\vec{\eta}_t := (\eta_{t,1}, \ldots, \eta_{t,w_t}) \xleftarrow{U} \mathbb{F}_q^w,$ $k_t^* := \left(\overbrace{\delta v_t, s_t}^{2}, \overbrace{0^{u_t}}^{u_t}, \overbrace{\vec{\eta}_t}^{w_t}, \overbrace{0^{z_t}}^{z_t}\right)_{\mathbb{B}_t^*},$ return $sk_v := \left(k_0^*, \{k_t^*\}_{(t,v_t)\in \vec{v}}\right).$ Enc($pk, m, \vec{x} := \{(t, x_t) \mid t \in I_{\vec{x}}\}$): [Formula 139]

$\omega, \tilde{\omega}, \zeta \xleftarrow{U} \mathbb{F}_q,$ $\vec{\varphi}_0 := (\varphi_{0,1}, \ldots, \varphi_{0,z_0}) \xleftarrow{U} \mathbb{F}_q^{z_0},$ $c_0 := \left(\tilde{\omega}, \overbrace{0^{u_0}}^{u_0}, \zeta, \overbrace{0^{w_0}}^{w_0}, \overbrace{\vec{\varphi}_0}^{z_0}\right)_{\mathbb{B}_0},$ for $(t, x_t) \in \vec{x},$ $\sigma_t \xleftarrow{U} \mathbb{F}_q, \vec{\varphi}_t := (\varphi_{t,1}, \ldots, \varphi_{t,z_t}) \xleftarrow{U} \mathbb{F}_q^{z_t},$ $c_t = \left(\overbrace{\omega x_t, \tilde{\omega}}^{2}, \overbrace{0^{u_t}}^{u_t}, \overbrace{0^{w_t}}^{w_t}, \overbrace{\vec{\varphi}_t}^{z_t}\right)_{\mathbb{B}_t},$ $c_T := g_T^\zeta m$ return $ct_x := \left(c_0, \{c_t\}_{(t,x_t)\in \vec{x}}, c_T\right).$ That is, a different basis $B_t$ and a different basis $B_t^*$ are used for each index t. In the above description, it is specified that $u_0$, $w_0$, $z_0$, u, w, and z are each an integer of 0 or more. For example, it may be specified that $u_0=1$, $w_0=1$, $z_0=1$, u=9, w=2, and z=2.

Embodiment 2

In Embodiment 1, the inner-product predicate encryption scheme (Type 1) has been described in which the ciphertext $ct_x$ can be decrypted with the decryption key $sk_v$ if the set $I_{\vec{v}\to}$ is a subset of the set $I_{\vec{x}\to}$ and if the sum of $v_t x_t$ is 0 for the index t included in the set $I_{\vec{v}\to}$.

In Embodiment 2, an inner-product predicate encryption scheme (Type 2) will be described in which the ciphertext $ct_x$ can be decrypted with the decryption key $sk_v$ if the set $I_{\vec{x}\to}$ is a subset of the set $I_{\vec{v}\to}$ and if the sum of $v_t x_t$ is 0 for the index t included in the set $I_{\vec{x}\to}$.

In Embodiment 2, differences from Embodiment 1 will be mainly described.

The configuration of the cryptographic processing system 10 according to Embodiment 2 is the same as the configuration of the cryptographic processing system 10 according to Embodiment 1 illustrated in FIG. 1. The configurations of the key generation device 100, the encryption device 200, and the decryption device 300 according to Embodiment 2 are respectively the same as the configurations of the key generation device 100, the encryption device 200, and the decryption device 300 according to Embodiment 1 illustrated in FIG. 2 through FIG. 4.

Figure 9:
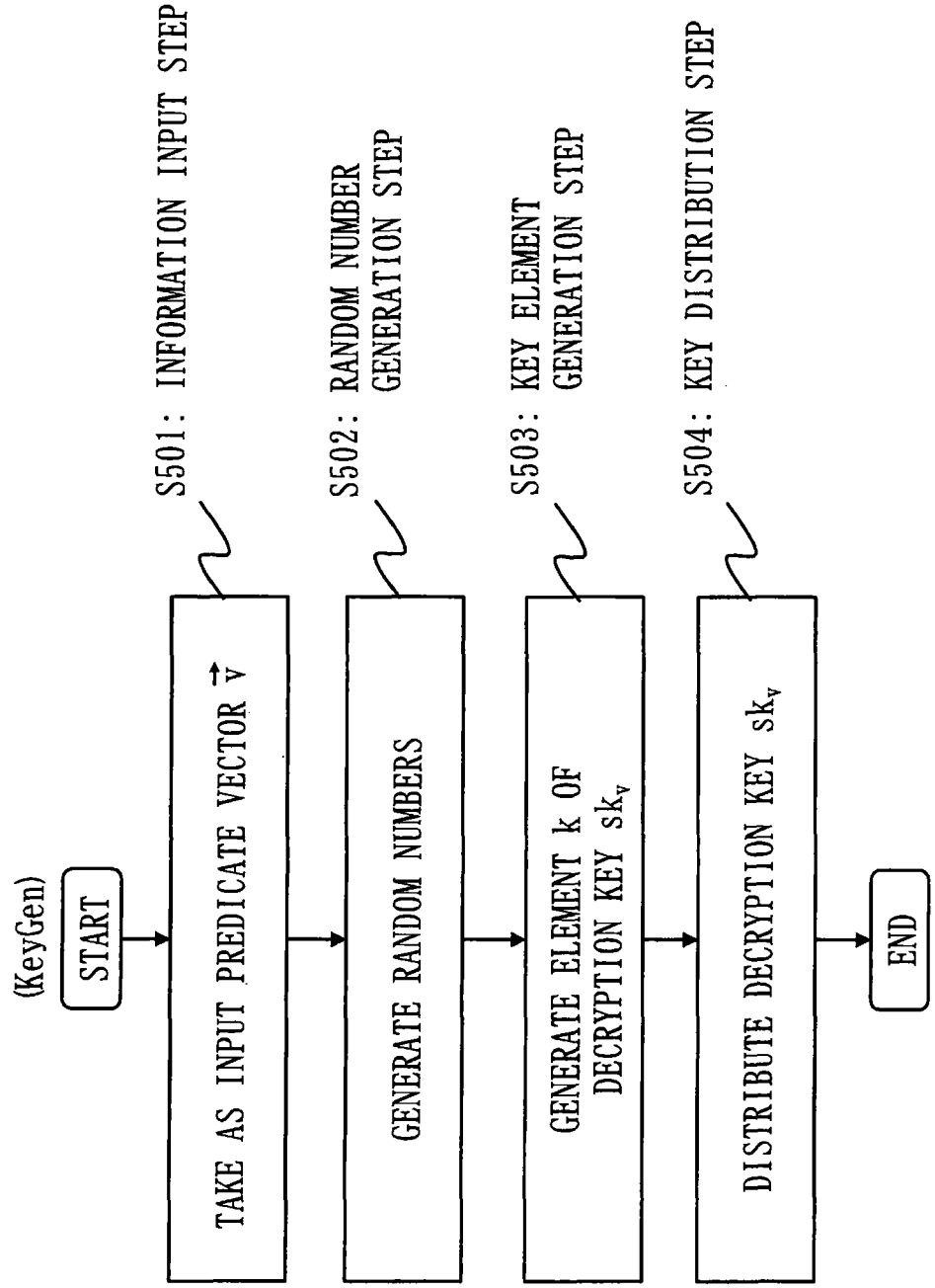
FIG. 9 is a flowchart illustrating the process of a KeyGen algorithm according to Embodiment 2.
Figure 10:
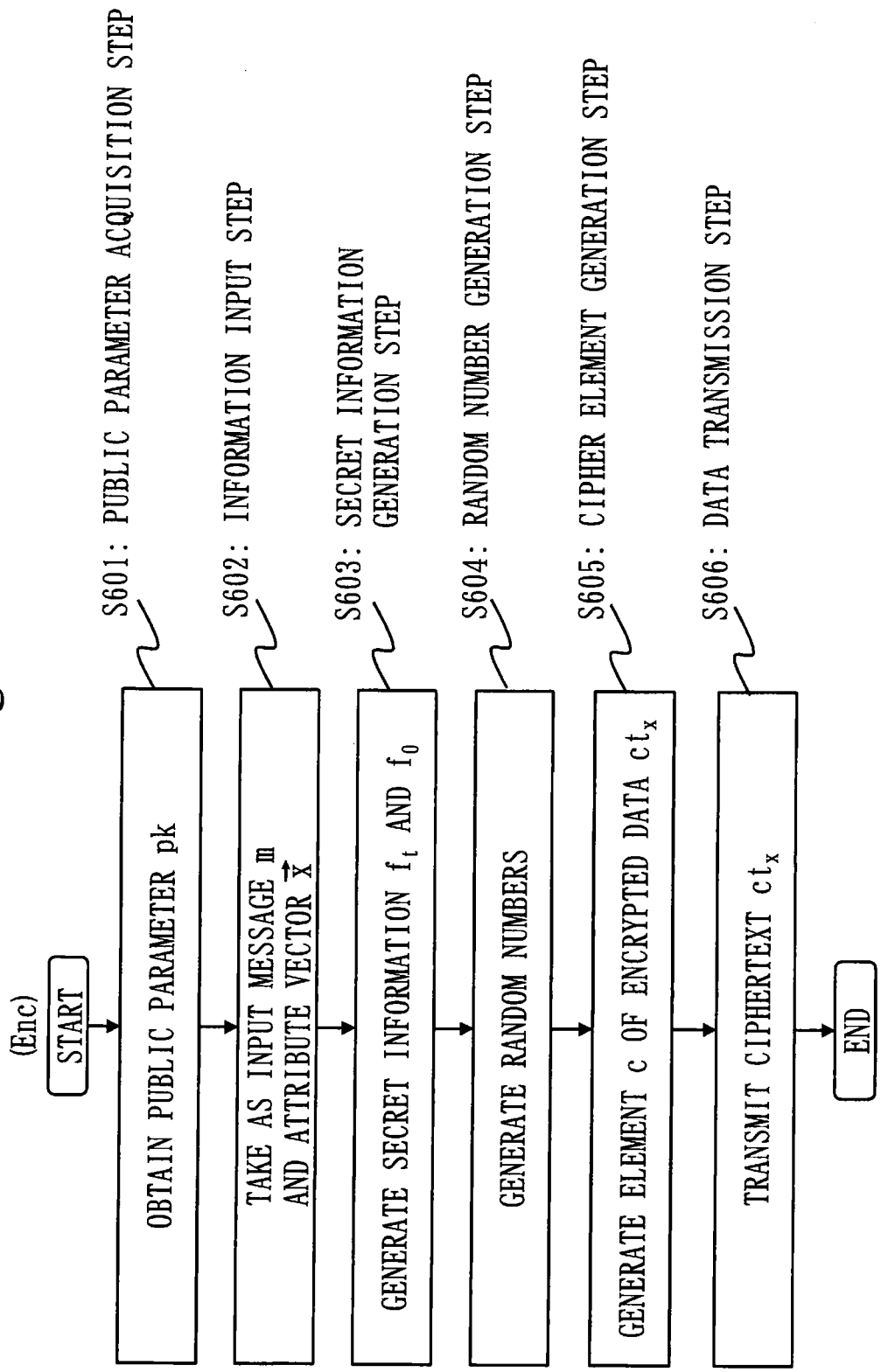
FIG. 10 is a flowchart illustrating the process of an Enc algorithm according to Embodiment 2.
Figure 11:
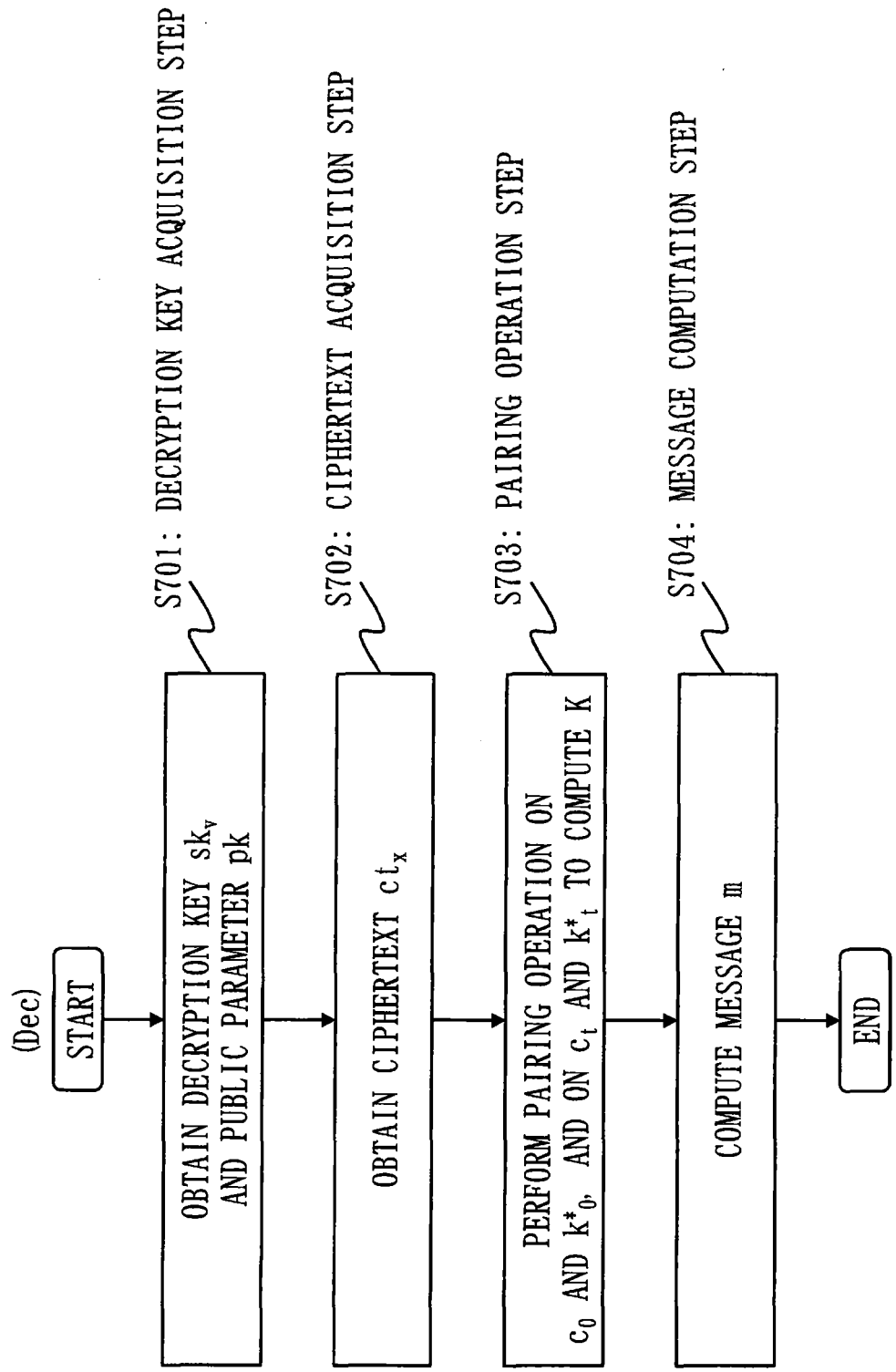
FIG. 11 is a flowchart illustrating the process of a Dec algorithm according to Embodiment 2.

FIG. 9 is a flowchart illustrating the process of a KeyGen algorithm according to Embodiment 2. FIG. 10 is a flowchart illustrating the process of an Enc algorithm according to Embodiment 2. FIG. 11 is a flowchart illustrating the process of a Dec algorithm according to Embodiment 2.

A Setup algorithm according to Embodiment 2 is the same as the Setup algorithm according to Embodiment 1.

With reference to FIG. 9, the process of the KeyGen algorithm will be described.

The process in S501 is the same as the process in S201 illustrated in FIG. 6.

(S502: Random Number Generation Step)

Using the processing device, the decryption key generation unit 140 generates random numbers, as indicated in Formula 140.

$\vec{\eta}_0 := (\eta_{0,1}, \ldots, \eta_{0,w_0}) \xleftarrow{U} \mathbb{F}_q^{w_0},$ [Formula 140]

$\delta, \tilde{\delta} \xleftarrow{U} \mathbb{F}_q,$ $\mu_t \xleftarrow{U} \mathbb{F}_q$ for $(t, v_t) \in \vec{v},$ $\vec{\eta}_t := (\eta_{t,1}, \ldots, \eta_{t,w}) \xleftarrow{U} \mathbb{F}_q^w$ for $(t, v_t) \in \vec{v}$ (S503: Key Element Generation Step)

Using the processing device, the decryption key generation unit 140 generates an element $k_0^*$ of a decryption key $sk_v$, as indicated in Formula 141.

$k_0^* := \left(\delta, \overbrace{0^{u_0}}^{u_0}, 1, \overbrace{\vec{\eta}_0}^{w_0}, \overbrace{0^{z_0}}^{z_0}\right)_{\mathbb{B}_0^*}$ [Formula 141]

Using the processing device, the decryption key generation unit 140 also generates an element $k_t^*$ of the decryption key $sk_v$ for the index t included in the set $I_{\vec{v}\to}$, as indicated in Formula 142.

$k_t^* := \left(\overbrace{\mu_t(t, -1,), \delta v_t, \tilde{\delta}}^{4}, \overbrace{0^u}^{u}, \overbrace{\vec{\eta}_t}^{w}, \overbrace{0^z}^{z}\right)_{\mathbb{B}^*}$ [Formula 142]

(S504: Key Distribution Step)

Using the communication device and via the network, for example, the key distribution unit 150 distributes the decryption key $sk_v$ having, as elements, $k_0^*$ and $k_t^*$ generated in S503 to the decryption device 300 in secrecy. As a matter of course, the decryption key $sk_v$ may be distributed to the decryption device 300 by another method.

In brief, in S501 through 5503, the key generation device 100 generates the decryption key $sk_v$ by executing the KeyGen algorithm indicated in Formula 143. In S504, the key generation device 100 distributes the generated decryption key $sk_v$ to the decryption device 300.

$KeyGen(pk, sk, \vec{v} := \{(t, v_t) \mid t \in I_{\vec{v}}\})$: [Formula 143]

$\delta, \tilde{\delta} \xleftarrow{U} \mathbb{F}_q,$ $\vec{\eta}_0 := (\eta_{0,1}, \ldots, \eta_{0, w_0}) \xleftarrow{U} \mathbb{F}_q^{w_0},$ $k_0^* := \left( \delta, \frac{u_0}{0^{u_0}}, 1, \frac{w_0}{\vec{\eta}_0}, \frac{z_0}{0^{z_0}} \right) \mathbb{B}_0^*,$ for $(t, v_t) \in \vec{v},$ $\mu_t \xleftarrow{U} \mathbb{F}_q,$ $\vec{\eta}_t := (\eta_{t,1}, \ldots, \eta_{t,w}) \xleftarrow{U} \mathbb{F}_q^w,$ $k_t^* := \left( \overline{\mu_t(t, -1,), \delta v_t, \tilde{\delta}}^{4} \frac{u}{0^u}, \frac{w}{\vec{\eta}_t}, \frac{z}{0^z} \right) \mathbb{B}^*,$ return $sk_v := (k_0^*, \{k_t^*\}_{(t,v_t) \in \vec{v}}).$ With reference to FIG. 10, the process of the Enc algorithm will be described.

The process in S601 and S602 is the same as the process in S301 and S302 illustrated in FIG. 7.

(S603: Secret Information Generation Step)

Using the processing device, the ciphertext generation unit 230 generates secret information $f_t$ and $f_0$, as indicated in Formula 144.

$f_t \xleftarrow{U} \mathbb{F}_q$ for $(t, x_t) \in \vec{x},$ [Formula 144]

$f_0 := \sum_{(t, v_t) \in \vec{x}} f_t$ (S604: Random Number Generation Step)

Using the processing device, the ciphertext generation unit 230 generates random numbers, as indicated in Formula 145.

$\omega, \zeta \xleftarrow{U} \mathbb{F}_q,$ [Formula 145]

$\vec{\varphi}_0 := (\varphi_{0,1}, \ldots, \varphi_{0,z_0}) \xleftarrow{U} \mathbb{F}_q^{z_0},$ $\sigma_t \xleftarrow{U} \mathbb{F}_q$ for $(t, x_t) \in \vec{x},$ $\vec{\varphi}_t := (\varphi_{t,1}, \ldots, \varphi_{t,z}) \xleftarrow{U} \mathbb{F}_q^z$ for $(t, x_t) \in \vec{x}$ (S605: Cipher Element Generation Step)

Using the processing device, the ciphertext generation unit 230 generates an element $c_0$ of a ciphertext $ct_x$, as indicated in Formula 146.

$c_0 := \left( -f_0, \frac{u_0}{0^{u_0}}, \zeta, \frac{w_0}{0^{w_0}}, \frac{z_0}{\vec{\varphi}_0} \right) \mathbb{B}_0$ [Formula 146]

Using the processing device, the ciphertext generation unit 230 also generates an element $c_t$ of the ciphertext $ct_x$ for the index t included in the set $I_{x \rightarrow}$, as indicated in Formula 147.

$c_t = \left( \overline{\sigma_t(1, t), \omega x_t, f_t}^{4} \frac{u}{0^u}, \frac{w}{0^w}, \frac{z}{\vec{\varphi}_t} \right) \mathbb{B}$ [Formula 147]

Using the processing device, the ciphertext generation unit 230 also generates an element $c_T$ of the ciphertext $ct_x$, as indicated in Formula 148.

$c_T := g_T^\zeta m$ [Formula 148]

(S606: Data Transmission Step)

Using the communication device and via the network, for example, the data transmission unit 240 transmits the ciphertext $ct_x$ having, as elements, $c_0$, $c_t$, and $c_T$ generated in S605 to the decryption device 300. As a matter of course, the ciphertext $ct_x$ may be transmitted to the decryption device 300 by another method.

In brief, in S601 through S605, the encryption device 200 generates the ciphertext $ct_x$ by executing the Enc algorithm indicated in Formula 149. In S606, the encryption device 200 transmits the generated ciphertext $ct_x$ to the decryption device 300.

$Enc(pk, m, \vec{x} := \{(t, x_t) \mid t \in I_{\vec{x}}\})$: [Formula 149]

$f_t, \omega, \zeta \xleftarrow{U} \mathbb{F}_q,$ for $(t, x_t) \in \vec{x},$ $\vec{\varphi}_0 := (\varphi_{0,1}, \ldots, \varphi_{0,z_0}) \xleftarrow{U} \mathbb{F}_q^{z_0},$ $f_0 := \sum_{(t, v_t) \in \vec{x}} f_t,$ $c_0 := \left( -f_0, \frac{u_0}{0^{u_0}}, \zeta, \frac{w_0}{0^{w_0}}, \frac{z_0}{\vec{\varphi}_0} \right) \mathbb{B}_0,$ for $(t, x_t) \in \vec{x},$ $\sigma_t \xleftarrow{U} \mathbb{F}_q, \vec{\varphi}_t := (\varphi_{t,1}, \ldots, \varphi_{t,z}) \xleftarrow{U} \mathbb{F}_q^z,$ $c_t = \left( \overline{\sigma_t(1, t), \omega x_t, f_t}^{4} \frac{u}{0^u}, \frac{w}{0^w}, \frac{z}{\vec{\varphi}_t} \right) \mathbb{B},$ $c_T := g_T^\zeta m$ return $ct_x := (c_0, \{c_t\}_{(t,x_t) \in \vec{x}}, c_T).$ With reference to FIG. 11, the process of the Dec algorithm will be described.

The process in S701 and S702 is the same as the process in S401 and S402 illustrated in FIG. 8. The process in S704 is the same as the process in S404 illustrated in FIG. 8.

(S703: Pairing Operation Step)

Using the processing device, the pairing operation unit 340 computes Formula 150, and thus generates a session key $K = g_T^\zeta$.

$K := e(c_0, k_0^*) \prod_{t \in I_{\vec{x}}} e(c_t, k_t^*)$ [Formula 150]

If Formula 151 holds, the key $K = g_T^\zeta$ can be obtained by computing Formula 150, as indicated in Formula 152.

$I_{\vec{x}} \subset I_{\vec{v}}$ and [Formula 151]

$\sum_{t \in I_{\vec{x}}} v_t \cdot x_t = 0$

-continued $$K := e(c_0, k_0^*) \prod_{t \in L_{\vec{x}}} e(c_t, k_t^*)$$ [Formula 152]

$$= g_T^{-\delta f_0 + \varsigma} \cdot \prod_{t \in L_{\vec{x}}} g_T^{\omega \delta v_t x_t + \tilde{\delta} f_t}$$

$$= g_T^{-\delta f_0 + \varsigma} \cdot g_T^{\omega \delta \left( \sum_{(t,x_t) \in L_{\vec{x}}} v_t x_t \right) + \tilde{\delta} \left( \sum_{(t,x_t) \in L_{\vec{x}}} f_t \right)}$$

$$= g_T^{-\delta f_0 + \varsigma + \tilde{\delta} f_0}$$

$$= g_T^{\varsigma}$$

That is, if the set $I_{\vec{x}}$ is a subset of the set $I_{\vec{v}}$ and if the sum of $v_t x_t$ is 0 for the index t included in the set $I_{\vec{x}}$, the key $K = g_T^{\varsigma}$ can be obtained by computing Formula 150.

In brief, in S701 through S704, the decryption device 300 generates the message m'(=m) by executing the Dec algorithm indicated in Formula 153.

$$Dec(pk, sk_v := (k_0^*, \{k_t^*\}_{(t,v_t) \in \vec{v}}), ct_x := (c_0, \{c_t\}_{(t,x_t) \in \vec{x}}, c_T)):$$ [Formula 153]

$$\text{if } I_{\vec{x}} \subseteq I_{\vec{v}} \text{ and } \sum_{t \in L_{\vec{x}}} v_t x_t = 0,$$

$$K := e(c_0, k_0^*) \prod_{t \in L_{\vec{x}}} e(c_t, k_t^*),$$

return $m' := c_T / K$.

As described above, in the inner-product predicate encryption scheme according to Embodiment 2, even if the dimensions of the attribute vector $x^{\rightarrow}$ and the predicate vector $v^{\rightarrow}$ are not equivalent, the ciphertext $ct_x$ can be decrypted with the decryption key $sk_v$ if the set $I_{\vec{x}}$ is a subset of the set $I_{\vec{v}}$ and if the sum of $v_t x_t$ is 0 for the index t included in the set $I_{\vec{x}}$.

In the above description, the index parts are provided so that the bases which are used for each attribute category are constructed as the common bases (basis B and basis B*). However, in a case where reissuing of the public parameter to add an attribute category at a later stage is permitted, there is no need to provide the index parts if it is arranged that the bases which are used for each attribute category are respectively different.

In this case, the KeyGen algorithm and the Enc algorithm of the inner-product predicate encryption scheme described above are as indicated in Formula 154 and Formula 155. The $G_{ob}$ algorithm is the same as indicated in Formula 136, the Setup algorithm is the same as indicated in Formula 137, and the Dec algorithm is as indicated in Formula 153, with no change.

$$KeyGen(pk, sk, \vec{v} := \{(t, v_t) \mid t \in I_{\vec{v}}\}):$$ [Formula 154]

$$\delta, \tilde{\delta} \xleftarrow{U} \mathbb{F}_q,$$

$$\vec{\eta}_0 := (\eta_{0,1}, \ldots, \eta_{0, w_0}) \xleftarrow{U} \mathbb{F}_q^{w_0},$$

$$k_0^* := \left( \tilde{\delta}, \frac{u_0}{0^{u_0}}, 1, \frac{w_0}{\vec{\eta}_0}, \frac{z_0}{0^{z_0}} \right) \mathbb{B}_0^*,$$

for $(t, v_t) \in \vec{v}$, $$\mu_t \xleftarrow{U} \mathbb{F}_q,$$

$$\vec{\eta}_t := (\eta_{t,1}, \ldots, \eta_{t,w_t}) \xleftarrow{U} \mathbb{F}_q^{w_t},$$

$$k_t^* := \left( \delta v_t, \delta \frac{u_t}{0^{u_t}}, \vec{\eta}_t, \frac{z_t}{0^{z_t}} \right) \mathbb{B}_t^*,$$

return $sk_v := (k_0^*, \{k_t^*\}_{(t,v_t) \in \vec{v}})$.

$$Enc(pk, m, \vec{x} := \{(t, x_t) \mid t \in I_{\vec{x}}\}):$$ [Formula 155]

$$f_t, \omega, \zeta \xleftarrow{U} \mathbb{F}_q, \text{ for } (t, x_t) \in \vec{x},$$

$$\vec{\varphi}_0 := (\varphi_{0,1}, \ldots, \varphi_{0,z_0}) \xleftarrow{U} \mathbb{F}_q^{z_0},$$

$$f_0 := \sum_{(t,v_t) \in \vec{x}} f_t,$$

$$c_0 := \left( -f_0, \frac{u_0}{0^{u_0}}, \zeta, \frac{w_0}{0^{w_0}}, \frac{z_0}{\vec{\varphi}_0} \right) \mathbb{B}_0,$$

for $(t, x_t) \in \vec{x}$, $$\sigma_t \xleftarrow{U} \mathbb{F}_q, \vec{\varphi}_t := (\varphi_{t,1}, \ldots, \varphi_{t,z_t}) \xleftarrow{U} \mathbb{F}_q^{z_t},$$

$$c_t = \left( \omega x_t, f_t, \frac{u_t}{0^{u_t}}, \frac{w_t}{0^{w_t}}, \frac{z_t}{\vec{\varphi}_t} \right) \mathbb{B}_t,$$

$$c_T := g_T^{\zeta} m$$

return $ct_x := (c_0, \{c_t\}_{(t,x_t) \in \vec{x}}, c_T)$.

That is, a different basis $\mathbb{B}_t$ and a different basis $\mathbb{B}_t^*$ are used for each index t.

Embodiment 3

In Embodiment 1, the inner-product predicate encryption scheme (Type 1) has been described in which the ciphertext $ct_x$ can be decrypted with the decryption key $sk_v$ if the set $I_{\vec{v}}$ is a subset of the set $I_{\vec{x}}$ and if the sum of $v_t x_t$ is 0 for the index t included in the set $I_{\vec{v}}$.

In Embodiment 2, the inner-product predicate encryption scheme (Type 2) has been described in which the ciphertext $ct_x$ can be decrypted with the decryption key $sk_v$ if the set $I_{\vec{x}}$ is a subset of the set $I_{\vec{v}}$ and if the sum of $v_t x_t$ is 0 for the index t included in the set $I_{\vec{x}}$.

In Embodiment 3, an inner-product predicate encryption scheme (Type 0) will be described in which the ciphertext $ct_x$ can be decrypted with the decryption key $sk_v$ if the set $I_{\vec{v}}$ is equal to the set $I_{\vec{x}}$ and if the sum of $v_t x_t$ is 0 for the index t included in the set $I_{\vec{v}}$ (or the set $I_{\vec{x}}$).

Note that "the set $I_{\vec{v}}$ is equal to the set $I_{\vec{x}}$" means that the set $I_{\vec{v}}$ is a subset of the set $I_{\vec{x}}$ and that the set $I_{\vec{x}}$ is a subset of the set $I_{\vec{v}}$. Thus, the inner-product predicate encryption scheme (Type 0) can be regarded as a combination of the inner-product predicate encryption scheme (Type1) described in Embodiment 1 and the inner-product predicate encryption scheme (Type 2) described in Embodiment 2.

In Embodiment 3, differences from Embodiments 1 and 2 will be mainly described.

The configuration of the cryptographic processing system 10 according to Embodiment 3 is the same as the configuration of the cryptographic processing system 10 according to Embodiment 1 illustrated in FIG. 1. The configurations of the key generation device 100, the encryption device 200, and the decryption device 300 according to Embodiment 3 are respectively the same as the configurations of the key generation device 100, the encryption device 200, and the decryption device 300 according to Embodiment 1 illustrated in FIG. 2 through FIG. 4.

Figure 12:
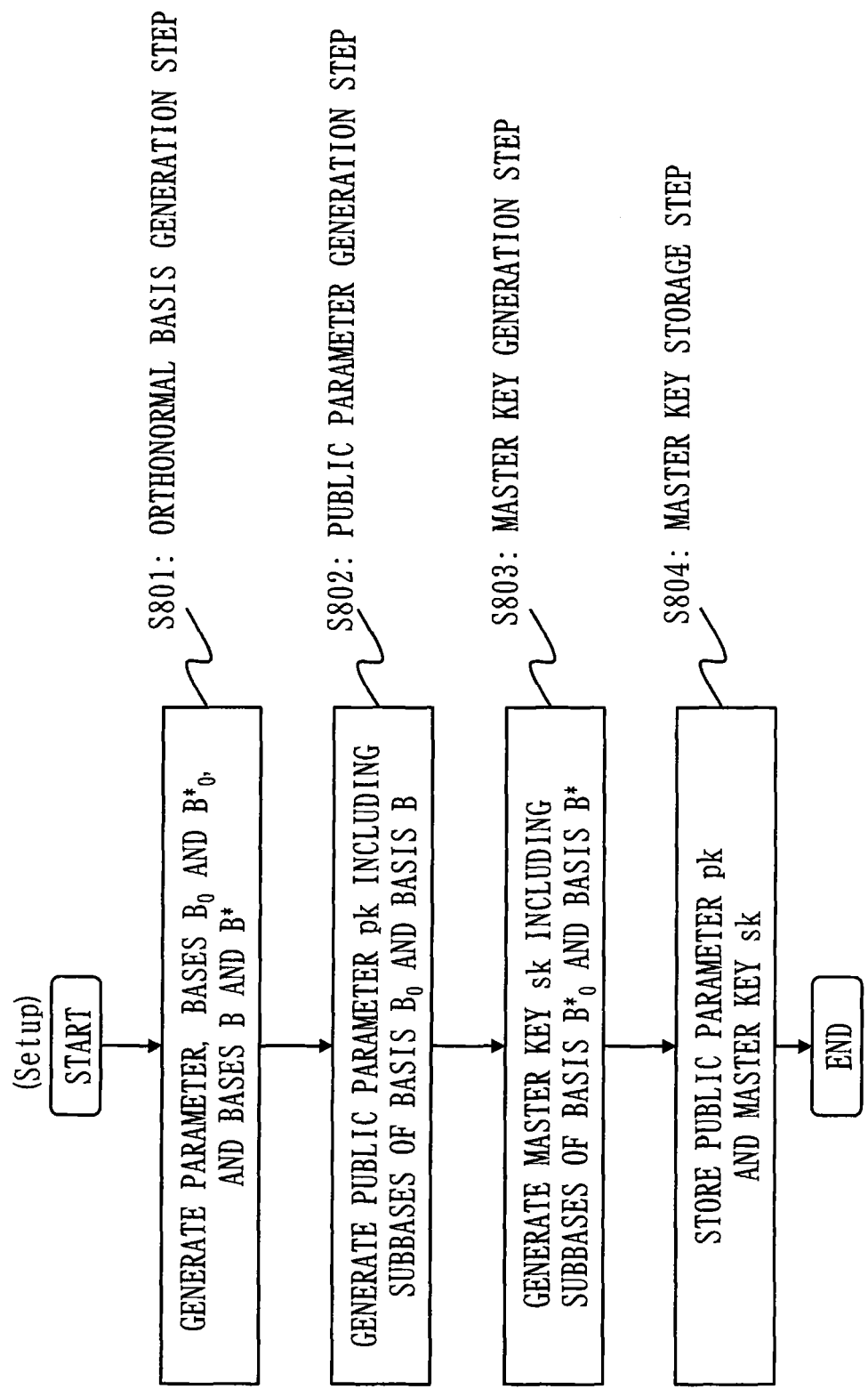
FIG. 12 is a flowchart illustrating the process of a Setup algorithm according to Embodiment 3.
Figure 13:
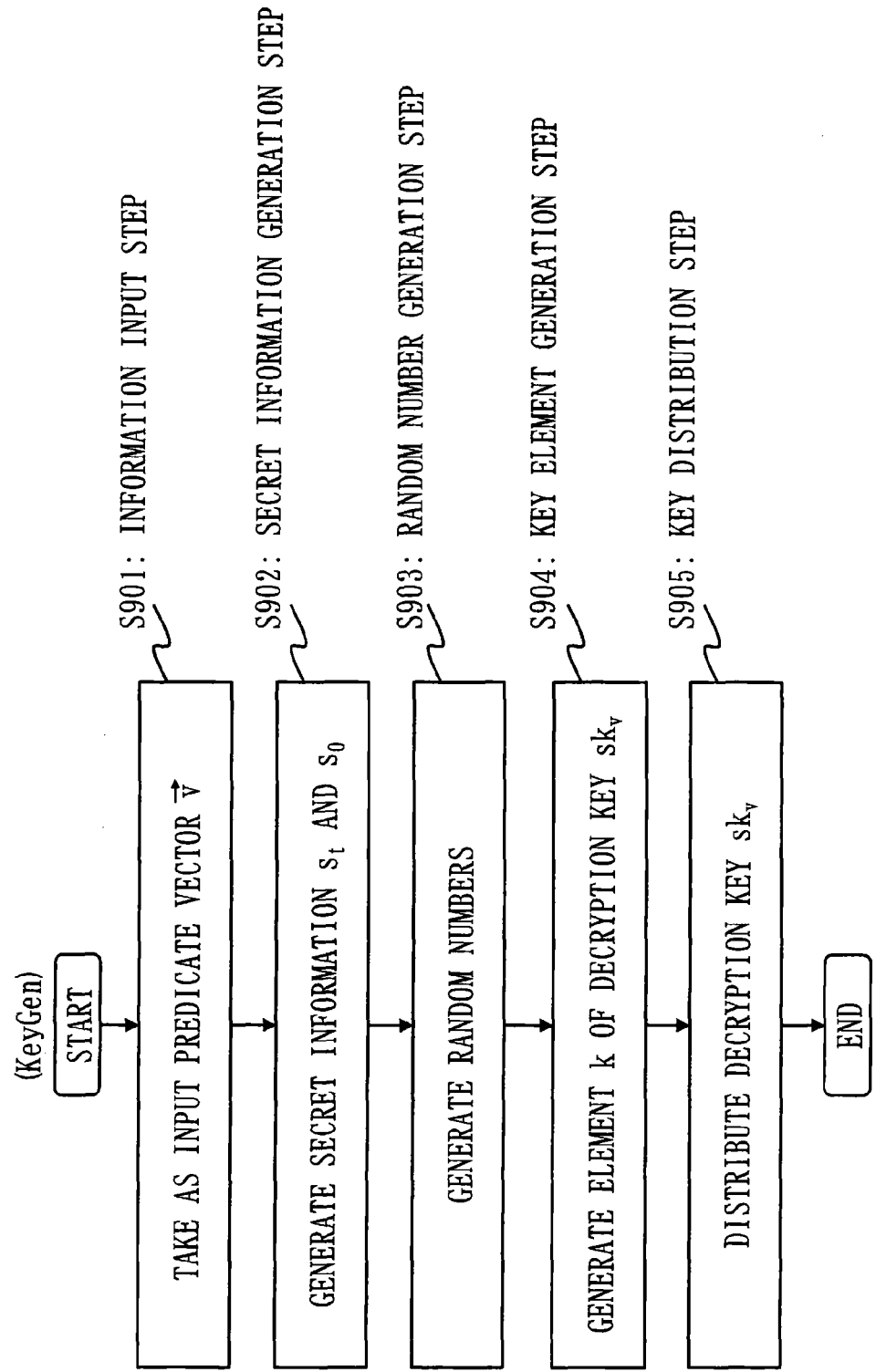
FIG. 13 is a flowchart illustrating the process of a KeyGen algorithm according to Embodiment 3.
Figure 14:
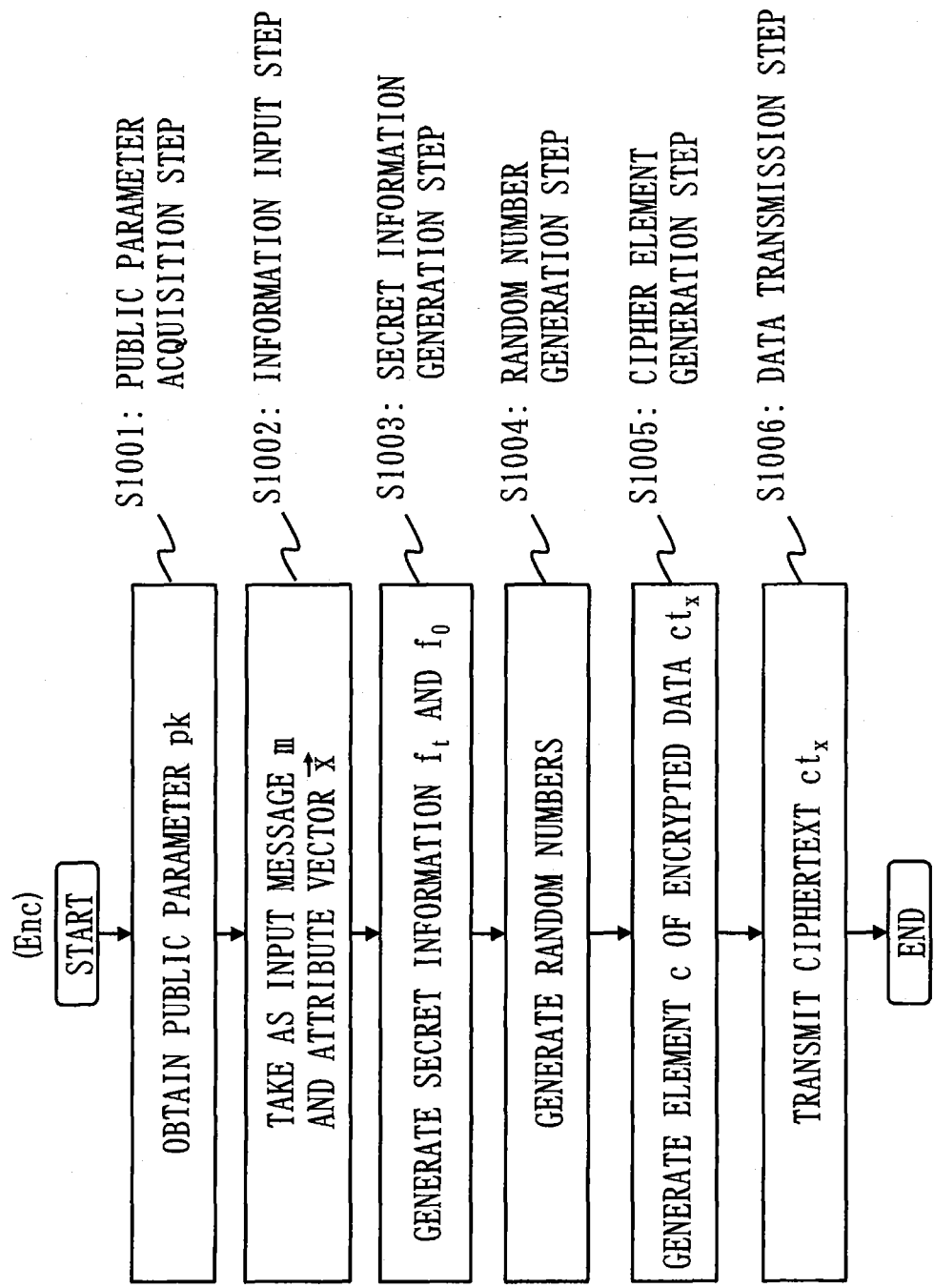
FIG. 14 is a flowchart illustrating the process of an Enc algorithm according to Embodiment 3.
Figure 15:
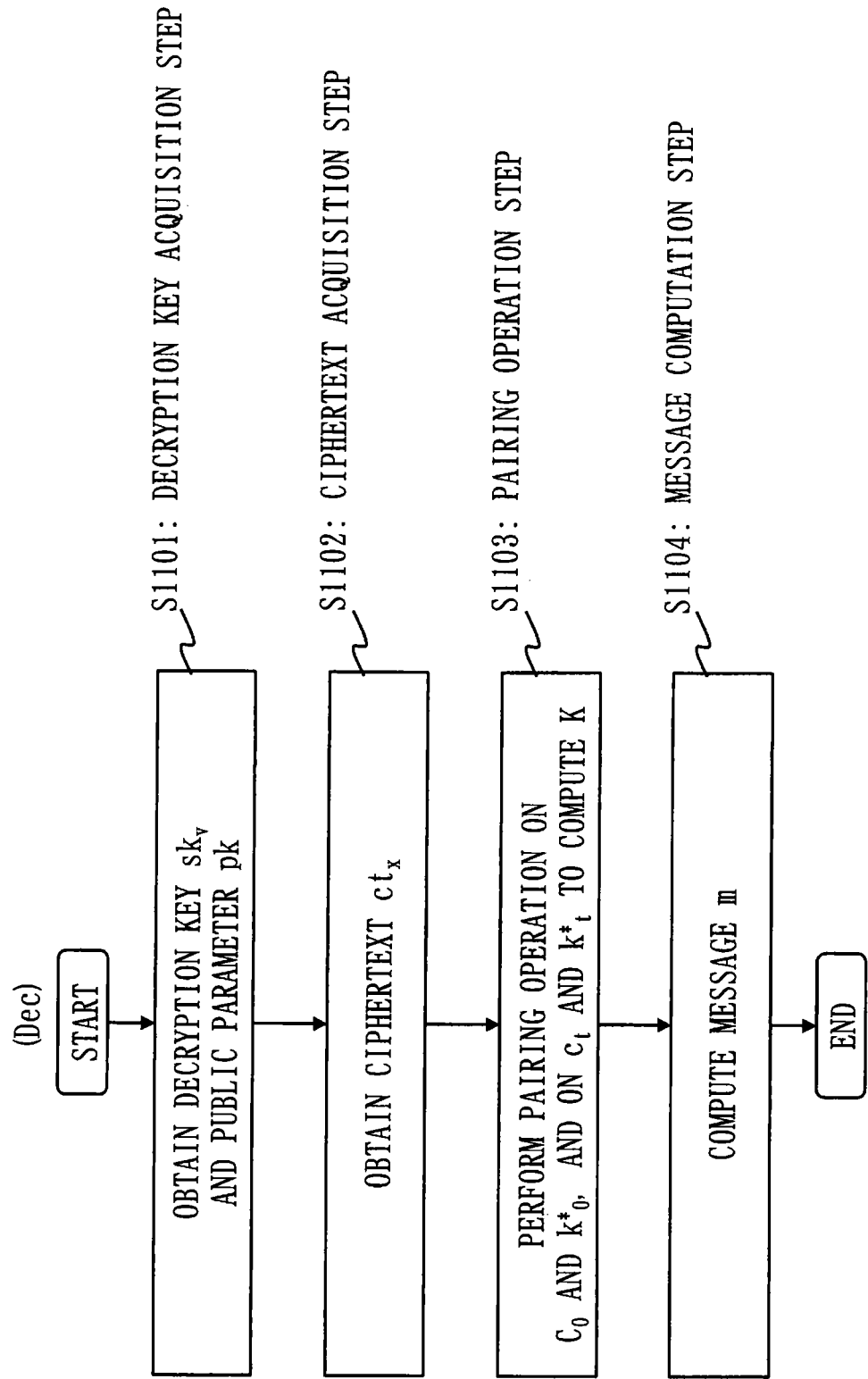
FIG. 15 is a flowchart illustrating the process of a Dec algorithm according to Embodiment 3.

FIG. 12 is a flowchart illustrating the process of a Setup algorithm according to Embodiment 3. FIG. 13 is a flowchart illustrating the process of a KeyGen algorithm according to Embodiment 3. FIG. 14 is a flowchart illustrating the process of an Enc algorithm according to Embodiment 3. FIG. 15 is a flowchart illustrating the process of a Dec algorithm according to Embodiment 3.

With reference to FIG. 12, the Setup algorithm will be described.

The process in S801 is the same as the process in S101 illustrated in FIG. 5, except that $N_0=2+u_0+1+w_0+z_0$ and $N_1=5+u+w+z$.

In brief, in S801, the master key generation unit 110 generates param, the basis $B_0$ and the basis $B^*_0$, and the basis $B_1$ (basis B) and the basis $B^*_1$ (basis $B^*$) by executing the algorithm $\mathcal{G}_{ob}$ indicated in Formula 156.

$$\mathcal{G}_{ob}(1^\lambda): \quad \text{[Formula 156]}$$

$$param_{\mathbb{G}} := (q, \mathbb{G}, \mathbb{G}_T, g, e) \xleftarrow{R} \mathcal{G}_{bpg}(1^\lambda),$$

$$\psi \xleftarrow{U} \mathbb{F}_q^x,$$

$$N_0 := 2 + u_0 + 1 + w_0 + z_0, \ N_1 := 5 + u + w + z,$$

for $t = 0, 1$, $$param_{\mathbb{V}_t} :=$$

$$(q, \mathbb{V}_t, \mathbb{G}_T, \mathbb{A}_t, e) := \mathcal{G}_{dpvs}(1^\lambda, N_t, param_{\mathbb{G}}),$$

$$X_t := (\chi_{t,i,j})_{i,j=1,\ldots,N_t} \xleftarrow{U} GL(N_t, \mathbb{F}_q),$$

$$X_t^* := (\vartheta_{t,i,j})_{i,j=1,\ldots,N_t} := \psi \cdot (X_t^T)^{-1}, \text{ hereafter, } \vec{\chi}_{t,i}$$

and $\vec{\vartheta}_{t,i}$ denote the $i$-th rows of $X_t$ and $X_t^*$ for $i = 1$, $\ldots, N_t$, respectively, $$b_{t,i} := (\vec{\chi}_{t,i})_{\mathbb{A}_t} = \sum_{j=1}^{N_t} \chi_{t,i,j} a_{t,j} \text{ for } i = 1, \ldots, N_t,$$

$$\mathbb{B}_t := (b_{t,1}, \ldots, b_{t,N_t}),$$

$$b_{t,i}^* := (\vec{\vartheta}_{t,i})_{\mathbb{A}_t} = \sum_{j=1}^{N_t} \vartheta_{t,i,j} a_{t,j} \text{ for } i = 1, \ldots, N_t,$$

$$\mathbb{B}_t^* := (b_{t,1}^*, \ldots, b_{t,N_t}^*),$$

$$g_T := e(g, g)^\psi, \ param := (\{param_{\mathbb{V}_t}\}_{t=0,1}, g_T),$$

return $(param, \mathbb{B}_t, \mathbb{B}_t^*)$.

(S802: Public Parameter Generation Step)

Using the processing device, the master key generation unit 110 generates a subbasis $\hat{B}_0$ of the basis $B_0$ and a subbasis $\hat{B}$ of the basis B, as indicated in Formula 157, the bases $B_0$ and B having been generated in S801.

$$\hat{\mathbb{B}}_0 := (b_{0,1}, b_{0,2}, b_{0,2+u_0+1}, b_{0,2+u_0+1+w_0+1}, \ldots, b_{0,2+u_0+1+w_0+z_0}),$$

$$\hat{\mathbb{B}} := (b_1, \ldots, b_5, b_{5+u+w+1}, \ldots, b_{5+u+w+z}) \quad \text{[Formula 157]}$$

The master key generation unit 110 generates a public parameter pk by putting together the generated subbasis $\hat{B}_0$ and subbasis $\hat{B}$, the security parameter $\lambda(1^\lambda)$ inputted in S801, and param generated in S801.

(S803: Master Key Generation Step)

Using the processing device, the master key generation unit 110 generates a subbasis $\hat{B}^*_0$ of the basis $B^*_0$ and a subbasis $\hat{B}^*$ of the basis $B^*$, as indicated in Formula 158, the bases $B^*_0$ and $B^*$ having been generated in S801.

$$\hat{\mathbb{B}}^*_0 := (b^*_{0,1}, b^*_{0,2}, b^*_{0,2+u_0+1}, b^*_{0,2+u_0+1+1}, \ldots, b^*_{0,2+u_0+1+w_0}),$$

$$\hat{\mathbb{B}}^* := (b^*_1, \ldots, b^*_5, b^*_{5+u+1}, \ldots, b^*_{5+u+w}) \quad \text{[Formula 158]}$$

The master key generation unit 110 generates a master key sk which is constituted by the generated subbasis $\hat{B}^*_0$ and subbasis $\hat{B}^*$.

The process in S804 is the same as the process in S104 illustrated in FIG. 5.

In brief, in S801 through S803, the key generation device 100 generates the public parameter pk and the master key sk by executing the Setup algorithm indicated in Formula 159. In S804, the key generation device 100 stores the generated public parameter pk and master key sk in the storage device.

The public parameter is published via the network, for example, and is made available for the encryption device 200 and the decryption device 300.

$$\text{Setup}(1^\lambda): (param, (\mathbb{B}_0, \mathbb{B}_0^*), (\mathbb{B}, \mathbb{B}^*)) \xleftarrow{R} \mathcal{G}_{ob}(1^\lambda), \quad \text{[Formula 159]}$$

$$\hat{\mathbb{B}}_0 := (b_{0,1}, b_{0,2}, b_{0,2+u_0+1},$$

$$b_{0,2+u_0+1+w_0+1}, \ldots, b_{0,2+u_0+1+w_0+z_0}),$$

$$\hat{\mathbb{B}} := (b_1, \ldots, b_5, b_{5+u+w+1}, \ldots, b_{5+u+w+z}),$$

$$\hat{\mathbb{B}}^*_0 := (b^*_{0,1}, b^*_{0,2}, b^*_{0,2+u_0+1}, b^*_{0,2+u_0+1+1}, \ldots, b^*_{0,2+u_0+1+w_0}),$$

$$\hat{\mathbb{B}}^* := (b^*_1, \ldots, b^*_5, b^*_{5+u+1}, \ldots, b^*_{5+u+w}),$$

return $pk := (1^\lambda, param, \hat{\mathbb{B}}_0, \hat{\mathbb{B}}), \ sk := (\hat{\mathbb{B}}^*_0, \hat{\mathbb{B}}^*).$ With reference to FIG. 13, the KeyGen algorithm will be described.

(S901: Information Input Step)

Using the input device, the information input unit 130 takes as input a predicate vector $\vec{v} := (v_1, \ldots, v_n)$. As predicate information $v_t$, attribute information of a user of a decryption key $sk_v$ is set, for example.

(S902: Secret Information Generation Step)

Using the processing device, the decryption key generation unit 140 generates secret information $s_t$ and $s_0$, as indicated in Formula 160.

$$s_t \xleftarrow{U} \mathbb{F}_q \text{ for } t = 1, \ldots, n, \quad \text{[Formula 160]}$$

$$s_0 := \sum_{t=1}^n s_t$$

(S903: Random Number Generation Step)

Using the processing device, the decryption key generation unit 140 generates random numbers, as indicated in Formula 161.

$$\vec{\eta}_0 := (\eta_{0,1}, \ldots, \eta_{0,w_0}) \xleftarrow{U} \mathbb{F}_q^{w_0}, \quad \text{[Formula 161]}$$

$$\delta, \tilde{\delta} \xleftarrow{U} \mathbb{F}_q,$$

$$\mu_t \xleftarrow{U} \mathbb{F}_q \text{ for } t = 1, \ldots, n,$$

$$\vec{\eta}_t := (\eta_{t,1}, \ldots, \eta_{t,w}) \xleftarrow{U} \mathbb{F}_q^w \text{ for } t = 1, \ldots, n$$

(S904: Key Element Generation Step)

Using the processing device, the decryption key generation unit 140 generates an element $k^*_0$ of the decryption key $sk_v$, as indicated in Formula 162.

$$k^*_0 := \left(-s_0, \tilde{\delta}, \overbrace{0^{u_0}}^{u_0}, 1, \overbrace{\vec{\eta}_0}^{w_0}, \overbrace{0^{z_0}}^{z_0}\right)_{\mathbb{B}^*_0} \quad \text{[Formula 162]}$$

Using the processing device, the decryption key generation unit 140 also generates an element $k^*_t$ of the decryption key $sk_v$ for each index t=1, . . . , n, as indicated in Formula 163.

$$k^*_t := \left( \frac{5}{\mu_t(t,-1,), \delta v_t, s_t, \delta 0^u}, \frac{w}{\vec{\eta}_t}, \frac{z}{0^z} \right) \mathbb{B}^*$$ [Formula 163]

(S905: Key Distribution Step)

Using the communication device and via the network, for example, the key distribution unit 150 distributes the decryption key $sk_v$ having, as elements, $k^*_0$ and $k^*_t$ generated in S904 to the decryption device 300 in secrecy. As a matter of course, the decryption key $sk_v$ may be distributed to the decryption device 300 by another method.

In brief, in S901 through S904, the key generation device 100 generates the decryption key $sk_v$ by executing the KeyGen algorithm indicated in Formula 164. In S905, the key generation device 100 distributes the generated decryption key $sk_v$ to the decryption device 300.

$$KeyGen(pk, sk, \vec{v} := (v_1, \ldots, v_n)):$$ [Formula 164]

$$\delta, \tilde{\delta}, s_t \xleftarrow{U} \mathbb{F}_q \text{ for } t = 1, \ldots, n,$$

$$\vec{\eta}_0 := (\eta_{0,1}, \ldots, \eta_{0,w_0}) \xleftarrow{U} \mathbb{F}_q^{w_0},$$

$$s_0 := \sum_{t=1}^{n} s_t,$$

$$k^*_0 := \left( -s_0, \tilde{\delta}, \frac{u_0}{0^{u_0}}, 1, \frac{w_0}{\vec{\eta}_0}, \frac{z_0}{0^{z_0}} \right) \mathbb{B}^*_0,$$

$$\text{for } t = 1, \ldots, n, \mu_t \xleftarrow{U} \mathbb{F}_q,$$

$$\vec{\eta}_t := (\eta_{t,1}, \ldots, \eta_{t,w}) \xleftarrow{U} \mathbb{F}_q^{w},$$

$$k^*_t := \left( \frac{5}{\mu_t(t,-1,), \delta v_t, s_t, \delta 0^u}, \frac{w}{\vec{\eta}_t}, \frac{z}{0^z} \right) \mathbb{B}^*,$$

$$\text{return } sk_v := (k^*_0, \{k^*_t\}_{t=1,\ldots,n}).$$

With reference to FIG. 14, the process of the Enc algorithm will be described.

The process in S1001 is the same as the process in S301 illustrated in FIG. 7.

(S1002: Information Input Step)

Using the input device, the information input unit 220 takes as input a message m to be transmitted to the decryption device 300. Using the input device, the information input unit 220 also takes as input an attribute vector $\vec{x} := (x_1, \ldots, x_{n'})$. In the attribute vector $\vec{x}$, attribute information of a user capable of decryption is set, for example.

(S1003: Secret Information Generation Step)

Using the processing device, the ciphertext generation unit 230 generates secret information $f_t$ and $f_0$, as indicated in Formula 165.

$$f_t \xleftarrow{U} \mathbb{F}_q \text{ for } t = 1, \ldots, n',$$ [Formula 165]

$$f_0 := \sum_{t=1}^{n'} f_t$$

(S1004: Random Number Generation Step)

Using the processing device, the ciphertext generation unit 230 generates random numbers, as indicated in Formula 166.

$$\omega, \tilde{\omega}, \zeta \xleftarrow{U} \mathbb{F}_q,$$ [Formula 166]

$$\vec{\varphi}_0 := (\varphi_{0,1}, \ldots, \varphi_{0,z_0}) \xleftarrow{U} \mathbb{F}_q^{z_0},$$

$$\sigma_t \xleftarrow{U} \mathbb{F}_q \text{ for } t = 1, \ldots, n',$$

$$\vec{\varphi}_t := (\varphi_{t,1}, \ldots, \varphi_{t,z}) \xleftarrow{U} \mathbb{F}_q^{z} \text{ for } t = 1, \ldots, n'$$

(S1005: Cipher Element Generation Step)

Using the processing device, the ciphertext generation unit 230 generates an element $c_0$ of a ciphertext $ct_x$, as indicated in Formula 167.

$$c_0 := \left( \tilde{\omega} - f_0 \frac{u_0}{0^{u_0}}, \zeta, \frac{w_0}{0^{w_0}}, \frac{z_0}{\vec{\varphi}_0} \right) \mathbb{B}_0$$ [Formula 167]

Using the processing device, the ciphertext generation unit 230 also generates an element $c_t$ of the ciphertext $ct_x$ for each index t=1, . . . , n', as indicated in Formula 168.

$$c_t = \left( \frac{5}{\sigma_t(1,t), \omega x_t, \tilde{\omega}, f_t 0^u}, \frac{w}{0^w}, \frac{z}{\vec{\varphi}_t} \right) \mathbb{B}$$ [Formula 168]

Using the processing device, the ciphertext generation unit 230 generates an element $c_T$ of the ciphertext $ct_x$, as indicated in Formula 169.

$$c_T := g_T^\zeta m$$ [Formula 169]

(S1006: Data Transmission Step)

Using the communication device and via the network, for example, the data transmission unit 240 transmits the ciphertext $ct_x$ having, as elements, $c_0$, $c_t$, and $c_T$ generated in S1005 to the decryption device 300. As a matter of course, the ciphertext $ct_x$ may be transmitted to the decryption device 300 by another method.

In brief, in S1001 through S1005, the encryption device 200 generates the ciphertext $ct_x$ by executing the Enc algorithm indicated in Formula 170. In S1006, the encryption device 200 transmits the ciphertext $ct_x$ to the decryption device 300.

$$Enc(pk, m, \vec{x} := (x_1, \ldots, x'_n)):$$ [Formula 170]

$$f_t, \omega, \tilde{\omega}, \zeta \xleftarrow{U} \mathbb{F}_q$$

$$\text{for } t = 1, \ldots, n',$$

$$\vec{\varphi}_0 := (\varphi_{0,1}, \ldots, \varphi_{0,z_0}) \xleftarrow{U} \mathbb{F}_q^{z_0}, f_0 := \sum_{t=1}^{n'} f_t,$$

$$c_0 := \left( \tilde{\omega}, -f_0 \frac{u_0}{0^{u_0}}, \zeta, \frac{w_0}{0^{w_0}}, \frac{z_0}{\vec{\varphi}_0} \right) \mathbb{B}_0,$$

$$\text{for } t = 1, \ldots, n',$$

$$\sigma_t \xleftarrow{U} \mathbb{F}_q, \vec{\varphi}_t := (\varphi_{t,1}, \ldots, \varphi_{t,z}) \xleftarrow{U} \mathbb{F}_q^{z},$$

$$c_t = \left( \frac{5}{\sigma_t(1,t), \omega x_t, \tilde{\omega}, f_t 0^u}, \frac{w}{0^w}, \frac{z}{\vec{\varphi}_t} \right) \mathbb{B},$$

-continued $$c_T := g_T^\zeta m$$

return $ct_x := (c_0, \{c_t\}_{t=1,\ldots,n'}, c_T)$.

With reference to FIG. 15, the process of the Dec algorithm will be described.

The process in S1101 and S1102 is the same as the process in S401 and S402 illustrated in FIG. 8.

(S1103: Pairing Operation Step)

Using the processing device, the pairing operation unit 340 computes Formula 171, and thus generates a session key $K = g_T^\zeta$.

$$K := e(c_0, k_0^*) \Pi_{t=1}^n e(c_t, k_t^*) \quad \text{[Formula 171]}$$

If Formula 172 holds, the key $K = g_T^\zeta$ can be obtained by computing Formula 171, as indicated in Formula 173.

$n = n'$ and $$\vec{v} \cdot \vec{x} = 0 \quad \text{[Formula 172]}$$

$$K := e(c_0, k_0^*) \prod_{t=1}^n e(c_t, k_t^*) \quad \text{[Formula 173]}$$

$$= g_T^{-\tilde{\omega} s_0 - \tilde{\delta} f_0 + \zeta} \cdot \prod_{t=1}^n g_T^{\delta \omega v_t x_t + \tilde{\omega} s_t + \tilde{\delta} f_t}$$

$$= g_T^{-\tilde{\omega} s_0 - \tilde{\delta} f_0 + \zeta} \cdot g_T^{\delta \omega (\sum_{t=1}^n v_t x_t) + \tilde{\omega}(\sum_{t=1}^n s_t) + \tilde{\delta}(\sum_{t=1}^n f_t)}$$

$$= g_T^{-\tilde{\omega} s_0 - \tilde{\delta} f_0 + \zeta + \tilde{\omega} s_0 + \tilde{\delta} f_0}$$

$$= g_T^\zeta$$

That is, if the set $I_{\vec{x}}$ is equal to the set $I_{\vec{v}}$ and if the sum of $v_t x_t$ is 0 for the index t included in the set $I_{\vec{v}}$ (or the set $I_{\vec{x}}$), the key $K = g_T^\zeta$ can be obtained by computing Formula 171.

The process in S1104 is the same as the process in S404 illustrated in FIG. 8.

In brief, in S1101 through S1104, the decryption device 300 executes the Dec algorithm indicated in Formula 174, and thus generates the message m' (=m).

$Dec(pk, sk_v := (k_0^*, \{k_t^*\}_{t=1,\ldots,n}), ct_x :=$
$(c_0, \{c_t\}_{t=1,\ldots,n}, c_T))$:

if $n = n'$ and $\vec{v}_t \vec{x}_t = 0$, $K := e(c_0, k_0^*) \Pi_{t=1}^n e(c_t, k_t^*)$, return $m' := c_T / K$. [Formula 174]

As described above, in the inner-product predicate encryption scheme according to Embodiment 3, the ciphertext $ct_x$ can be decrypted with the decryption key $sk_v$ if the set $I_{\vec{x}}$ is equal to the set $I_{\vec{v}}$ and if the sum of $v_t x_t$ is 0 for the index t included in the set $I_{\vec{v}}$ (the set $I_{\vec{x}}$).

In the above description, the index parts are provided so that the bases which are used for each attribute category are constructed as the common bases (basis B and basis B*). However, in a case where reissuing of the public parameter to add an attribute category at a later stage is permitted, there is no need to provide the index parts if it is arranged that the bases which are used for each attribute category are respectively different.

In this case, the $G_{ob}$ algorithm, the Setup algorithm, the KeyGen algorithm, and the Enc algorithm of the inner-product predicate encryption scheme described above are as indicated in Formula 175 through Formula 178. The Dec algorithm is as indicated in Formula 174, with no change.

$$\mathcal{G}_{ob}(1^\lambda) : param_\mathbb{G} := (q, \mathbb{G}, \mathbb{G}_T, g, e) \xleftarrow{R} \mathcal{G}_{bpg}(1^\lambda), \quad \text{[Formula 175]}$$

$$\psi \xleftarrow{U} \mathbb{F}_q^\times,$$

$$N_0 := 2 + u_0 + 1 + w_0 + z_0,$$

$$N_t := 3 + u_t + w_t + z_t \text{ for } t = 1, \ldots, d,$$

for $t = 0, \ldots, d$, $param_{\mathbb{V}_t} :=$ $$(q, \mathbb{V}_t, \mathbb{G}_T, \mathbb{A}_t, e) := \mathcal{G}_{dpvs}(1^\lambda, N_t, param_\mathbb{G}),$$

$$X_t := (\chi_{t,i,j})_{i,j=1,\ldots,N_t} \xleftarrow{U} GL(N_t, \mathbb{F}_q),$$

$$X_t^* := (\vartheta_{t,i,j})_{i,j=1,\ldots,N_t} := \psi \cdot (X_t^T)^{-1}, \text{ hereafter,}$$

$\vec{\chi}_{t,i}$ and $\vec{\vartheta}_{t,i}$ denote the $i$-th rows of $X_t$ and $X_t^*$ for $i = 1, \ldots, N_t$, respectively, $$b_{t,i} := (\vec{\chi}_{t,i}) \mathbb{A}_t = \sum_{j=1}^{N_t} \chi_{t,i,j} a_{t,j} \text{ for } i = 1, \ldots, N_t,$$

$$\mathbb{B}_t := (b_{t,1}, \ldots, b_{t,N_t}),$$

$$b_{t,i}^* := (\vec{\vartheta}_{t,i}) \mathbb{A}_t = \sum_{j=1}^{N_t} \vartheta_{t,i,j} a_{t,j} \text{ for } i = 1, \ldots, N_t,$$

$$\mathbb{B}_t^* := (b_{t,1}^*, \ldots, b_{t,N_t}^*), g_T := e(g, g)^\psi,$$

$$param := (\{param_{\mathbb{V}_t}\}_{t=0,\ldots,d}, g_T),$$

return $(param, \{\mathbb{B}_t, \mathbb{B}_t^*\}_{t=0,\ldots,d})$.

$$Setup(1^\lambda): (param, \{\mathbb{B}_t, \mathbb{B}_t^*\}_{t=0,\ldots,d}) \xleftarrow{R} \mathcal{G}_{ob}(1^\lambda), \quad \text{[Formula 176]}$$

$$\hat{\mathbb{B}}_0 := (b_{0,1}, b_{0,2}, b_{0,2+u_0+1},$$

$$b_{0,2+u_0+1+w_0+1}, \ldots, b_{0,2+u_0+1+w_0+z_0}),$$

$$\hat{\mathbb{B}}_t := (b_{t,1}, \ldots, b_{t,3}, b_{t,3+u_t+w_t+1}, \ldots, b_{t,3+u_t+w_t+z_t}),$$

$$\hat{\mathbb{B}}_0^* := (b_{0,1}^*, b_{0,2}^*, b_{0,2+u_0+1}^*, b_{0,2+u_0+1+1}^*, \ldots, b_{0,2+u_0+1+w_0}^*),$$

$$\hat{\mathbb{B}}_t^* := (b_{t,1}^*, \ldots, b_{t,3}^*, b_{t,3+u_t+1}^*, \ldots, b_{t,3+u_t+w_t}^*),$$

return $pk := (1^\lambda, param, \hat{\mathbb{B}}_0, \{\hat{\mathbb{B}}_t\}_{t=1,\ldots,d}),$ $$sk := (\hat{\mathbb{B}}_0^*, \{\hat{\mathbb{B}}_t^*\}_{t=1,\ldots,d}).$$

$$KeyGen(pk, sk, \vec{v} := (v_1, \ldots, v_n)): \quad \text{[Formula 177]}$$

$$\delta, \tilde{\delta}, s_t \xleftarrow{U} \mathbb{F}_q \text{ for } t = 1, \ldots, n,$$

$$\vec{\eta}_0 := (\eta_{0,1}, \ldots, \eta_{0,w_0}) \xleftarrow{U} \mathbb{F}_q^{w_0},$$

$$s_0 := \sum_{t=1}^n s_t,$$

$$k_0^* := \left(-s_0, \tilde{\delta}, \overline{0^{u_0}}, 1, \overline{\vec{\eta}_0}, \overline{0^{z_0}}\right) \mathbb{B}_0^*,$$

for $t = 1, \ldots, n,$ $$\mu_t \xleftarrow{U} \mathbb{F}_q,$$

$$\vec{\eta}_t := (\eta_{t,1}, \ldots, \eta_{t,w_t}) \xleftarrow{U} \mathbb{F}_q^{w_t},$$

$$k_t^* := \left(\overline{\delta v_t, s_t, \tilde{\delta}}, \overline{0^{u_t}}, \overline{\vec{\eta}_t}, \overline{0^{z_t}}\right) \mathbb{B}_t^*,$$

return $sk_v := (k_0^*, \{k_t^*\}_{t=1,\ldots,n}).$

-continued $$Enc(pk, m, \vec{x} := (x_1, \ldots, x_n')): \quad \text{[Formula 178]}$$

$$f_t, \omega, \tilde{\omega}, \zeta \xleftarrow{U} \mathbb{F}_q \text{ for } t = 1, \ldots, n',$$

$$\vec{\varphi}_0 := (\varphi_{0,1}, \ldots, \varphi_{0,z_0}) \xleftarrow{U} \mathbb{F}_q^{z_0}, f_0 := \sum_{t=1}^{n'} f_t,$$

$$c_0 := \left(\tilde{\omega}, -f_0 \overbrace{0^{u_0}}^{u_0}, \zeta, \overbrace{0^{w_0}}^{w_0}, \overbrace{\vec{\varphi}_0}^{z_0}\right) \mathbb{B}_0,$$

$$\text{for } t = 1, \ldots, n',$$

$$\sigma_t \xleftarrow{U} \mathbb{F}_q, \vec{\varphi}_t := (\varphi_{t,1}, \ldots, \varphi_{t,z}) \xleftarrow{U} \mathbb{F}_q^z,$$

$$c_t = \left(\overbrace{\omega x_t, \tilde{\omega}, f_t \overbrace{0^{u_t}}^{u_t}, \overbrace{0^{w_t}}^{w_t}, \overbrace{\vec{\varphi}_t}^{z_t}}^{3}\right) \mathbb{B}_t,$$

$$c_T := g_T^\zeta m$$

$$\text{return } ct_x := (c_0, \{c_t\}_{t=1,\ldots,n'}, c_T).$$

That is, a different basis $B_t$ and a different basis $B^*_t$ are used for each index t.

In the above description, it is specified that $u_0$, $w_0$, $z_0$, u, w, and z are each an integer of 0 or more. For example, it may be specified that $u_0=2$, $w_0=2$, $z_0=2$, $u=11$, $w=3$, and $z=3$.

Embodiment 4

A functional encryption scheme and an attribute-based signature scheme each having the inner-product predicate encryption scheme described in one of the above embodiments as a lower structure will be described.

Non-Patent Literature 31 discusses a functional encryption scheme.

In the functional encryption scheme discussed in Non-Patent Literature 31, the inner-product of the attribute vector $x^\rightarrow$ and the predicate vector $v^\rightarrow$ is computed for each index t. Then, if the inner-product of the attribute vector $x^\rightarrow$ and the predicate vector $v^\rightarrow$ is 0 for all given index t, a ciphertext can be decrypted with a decryption key.

The inner-product predicate encryption scheme described in one of the above embodiments is applied to the computation of the inner-product of the attribute vector $x^\rightarrow$ and the predicate vector $v^\rightarrow$ for each index t. With this arrangement, the functional encryption scheme having the inner-product predicate encryption scheme described in one of the above embodiments as a lower structure is constructed.

In the functional encryption scheme discussed in Non-Patent Literature 31, the dimensions of the attribute vector $x^\rightarrow$ and the predicate vector $v^\rightarrow$ are required to be equivalent for each index t. However, in the functional encryption scheme having the inner-product predicate encryption scheme described in one of the above embodiments as a lower structure, the dimensions of the attribute vector $x^\rightarrow$ and the predicate vector $v^\rightarrow$ are not required to be equivalent for each index t.

In the following description, a case will be described where the inner-product predicate encryption scheme described in Embodiment 1 is applied to the key-policy functional encryption scheme (KP-FE scheme) discussed in Non-Patent Literature 31, as an example.

Changes in the KP-FE scheme that occur as a result of applying the inner-product predicate encryption scheme described in Embodiment 1 will be mainly described herein.

In the functional encryption scheme discussed in Non-Patent Literature 31, a variable p(i) is employed to specify for each index t whether to allow decryption if the inner-product of the attribute vector $x^\rightarrow$ and the predicate vector $v^\rightarrow$ is 0 or to allow decryption if the inner-product of the attribute vector $x^\rightarrow$ and the predicate vector $v^\rightarrow$ is other than 0. However, for simplicity of description, a case will be herein described where decryption is allowed if the inner-product of the attribute vector $x^\rightarrow$ and the predicate vector $v^\rightarrow$ is 0 for all given index t.

In Embodiment 1, the index parts are provided so that the bases which are used for each attribute category are constructed as the common bases (basis B and basis B*). However, for simplicity of description, a case will be herein described where the index parts are not provided and the bases which are used for each attribute category are respectively different.

Also note that in Non-Patent Literature 31 and Embodiment 1 there is overlapping use of alphabets t and s of the index t and the secret information s. Thus, the index t in Non-Patent Literature 31 will be herein described as the index $\tau$, and the secret information s in Non-Patent Literature 31 will be described as the secret information $\sigma$.

The KP-FE scheme has four algorithms: a Setup algorithm, a KeyGen algorithm, an Enc algorithm, and a Dec algorithm.

The Setup algorithm will be described.

Using the processing device, the master key generation unit 110 generates a basis $B_{\tau,t}$ and a basis $B^*_{\tau,t}$ for each index $\tau,t$. That is, the master key generation unit 110 generates the basis $B_{\tau,t}$ and the basis $B^*_{\tau,t}$ for each index $\tau,t$, instead of generating the basis $B_t$ and the basis $B^*_t$ for each index t.

In brief, the Setup algorithm is as indicated in Formula 179. The algorithm $G_{ob}$ used in the Setup algorithm is as indicated in Formula 180.

$$\text{Setup}(1^\lambda, \vec{n} := (\Delta; d; n_{1,1}, \ldots, n_{\Delta,d})) \quad \text{[Formula 179]}$$

$$(param_{\vec{n}}, \mathbb{B}_0, \mathbb{B}^*_0 \{\mathbb{B}_{\tau,t}, \mathbb{B}^*_{\tau,t}\}_{\tau=1,\ldots,\Delta;t=1,\ldots,d}) \xleftarrow{R} G_{ob}(1^\lambda, \vec{n})$$

$$\hat{\mathbb{B}}_0 := (b_{0,1}, b_{0,3}, b_{0,5}),$$

$$\hat{\mathbb{B}}_{\tau,t} := (b_{\tau,t,1}, \ldots, b_{\tau,t,n_t}, b_{\tau,t,3n_t+1})$$

$$\text{for } \tau = 1, \ldots, \Delta; t = 1, \ldots, d,$$

$$\hat{\mathbb{B}}^*_0 := (b^*_{0,1}, b^*_{0,3}, b^*_{0,4}),$$

$$\hat{\mathbb{B}}^*_{\tau,t} := (b^*_{\tau,t,1}, \ldots, b^*_{\tau,t,n_t}, b^*_{\tau,t,2n_t+1}, \ldots, b^*_{\tau,t,3n_t})$$

$$\text{for } \tau = 1, \ldots, \Delta; t = 1, \ldots, d,$$

$$pk := (1^\lambda, param_{\vec{n}}, \hat{\mathbb{B}}_0, \{\hat{\mathbb{B}}_{\tau,t}\}_{\tau=1,\ldots,\Delta;t=1,\ldots,d}),$$

$$sk := (\hat{\mathbb{B}}^*_0, \{\hat{\mathbb{B}}^*_{\tau,t}\}_{\tau=1,\ldots,\Delta;t=1,\ldots,d}).$$

return $pk$, $sk$.

-continued $\mathcal{G}_{ob}(1^\lambda, \vec{n}):$ [Formula 180]

$param_\mathbb{G} := (q, \mathbb{G}, \mathbb{G}_T, g, e) \xleftarrow{R} \mathcal{G}_{bpg}(1^\lambda), \psi \xleftarrow{U} \mathbb{F}_q^\times,$ $N_0 := 5, N_{\tau,t} := 2 + 2n_{\tau,t} + 1 \text{ for } \tau = 1,$ $\ldots, \Delta; t = 1, \ldots, d,$ $param_{\mathbb{V}_0} := (q, \mathbb{V}_0, \mathbb{G}_T, \mathbb{A}_0, e) :=$ $\mathcal{G}_{dpvs}(1^\lambda, N_0, param_\mathbb{G}),$ $X_0 := (\chi_{0,i,j})_{i,j} \xleftarrow{U} GL(N_0, \mathbb{F}_q), (\nu_{0,i,j})_{i,j} := \psi \cdot (X_0^T)^{-1},$ $b_{0,i} := (\chi_{0,i,1}, \ldots, \chi_{0,i,N_0})\mathbb{A}_0 = \sum_{j=1}^{N_0} \chi_{0,i,j} a_{0,j},$ $\mathbb{B}_0 := (b_{0,1}, \ldots, b_{0,N_0}),$ $b_{0,i}^* := (\nu_{0,i,1}, \ldots, \nu_{0,i,N_0})\mathbb{A}_0 = \sum_{j=1}^{N_0} \nu_{0,i,j} a_{0,j},$ $\mathbb{B}_0^* := (b_{0,1}^*, \ldots, b_{0,N_0}^*),$ For $\tau = 1, \ldots, \Delta; t = 1, \ldots, d,$ $param_{\mathbb{V}_{\tau,t}} :=$ $(q, \mathbb{V}_{\tau,t}, \mathbb{G}_T, \mathbb{A}_{\tau,t}, e) := \mathcal{G}_{dpvs}(1^\lambda, N_{\tau,t}, param_\mathbb{G}),$ $X_{\tau,t} := (\chi_{\tau,t,i,j})_{i,j} \xleftarrow{U} GL(N_{\tau,t}, F_q), (\nu_{\tau,t,i,j})_{i,j} := \psi \cdot (X_{\tau,t}^T)^{-1},$ $b_{\tau,t,i} := (\chi_{\tau,t,i,1}, \ldots, \chi_{\tau,t,i,N_{\tau,t}})\mathbb{A}_{\tau,t} = \sum_{j=1}^{N_{\tau,t}} \chi_{\tau,t,i,j} a_{\tau,t,j},$ $\mathbb{B}_{\tau,t} := (b_{\tau,t,1}, \ldots, b_{\tau,t,N_{\tau,t}}),$ $b_{\tau,t,i}^* := (\nu_{\tau,t,i,1}, \ldots, \nu_{\tau,t,i,N_{\tau,t}})\mathbb{A}_{\tau,t} = \sum_{j=1}^{N_{\tau,t}} \nu_{\tau,t,i,j} a_{\tau,t,j},$ $\mathbb{B}_{\tau,t}^* := (b_{\tau,t,1}^*, \ldots, b_{\tau,t,N_{\tau,t}}^*), g_T := e(g, g)^\psi,$ $param_{\vec{n}} := (\{param_{\mathbb{V}_{\tau,t}}\}_{\tau=1,\ldots,\Delta;t=0,\ldots,d}, g_T)$ return $(param_{\vec{n}}, \{\mathbb{B}_{\tau,t}, \mathbb{B}_{\tau,t}^*\}_{\tau=1,\ldots,\Delta;t=0,\ldots,d}).$ The KeyGen algorithm will be described.

Using the processing device, the decryption key generation unit 140 generates secret information σ and secret information s, as indicated in Formula 181.

$\vec{f} \xleftarrow{U} \mathbb{F}_q^r,$ [Formula 181]

$\vec{\sigma}^T := (\sigma_1, \ldots, \sigma_L)^T := M \cdot \vec{f}^T,$ $\sigma_0 := \vec{1} \cdot \vec{f}^T,$ $s_{i,t} \xleftarrow{U} \mathbb{F}_q \text{ for } i = 1, \ldots, L; (t, v_{i,t}) \in \vec{v}_i,$ $\sigma_i := \sum_{(t,v_{i,t}) \in \vec{v}_i} s_{i,t} \text{ for } i = 1, \ldots, L$ Using the processing device, the decryption key generation unit 140 generates an element $k_0^*$ of a decryption key $sk_S$ as indicated in Formula 182, and generates an element $k_{i,t}^*$ of the decryption key $sk_S$ for each $i=1, \ldots, L$ (L is an integer of 1 or more) and each index t included in a set $I_{\vec{v_i}}$, as indicated in Formula 183.

$k_0^* := (-\sigma_0, 0, 1, \eta_0, 0)_{\mathbb{B}_0^*}$ [Formula 182]

$k_{i,t}^* := \left(\frac{2}{\delta_i v_{i,t}, s_{i,t}}, \overbrace{0^{n_{\tau,t}}}^{n_{\tau,t}}, \overbrace{\eta_{i,1}, \ldots, \eta_{i,n_{\tau,t}}}^{n_{\tau,t}}, \frac{1}{0,}\right)\mathbb{B}_{\tau,t}^*$ [Formula 183]

In brief, the KeyGen algorithm is as indicated in Formula 184.

$KeyGen(pk, sk, \mathbb{S} := (M, \rho),$ [Formula 184]

$\{\tau, \vec{v}_i := \{(t, v_{i,t}) | t \in I_{\vec{v}_i}\} | i = 1, \ldots, L\})$ $\vec{f} \xleftarrow{U} \mathbb{F}_q^r,$ $\vec{\sigma}^T := (\sigma_1, \ldots, \sigma_L)^T := M \cdot \vec{f}^T,$ $\sigma_0 := \vec{1} \cdot \vec{f}^T,$ $s_{i,t} \xleftarrow{U} \mathbb{F}_q,$ $\sigma_i := \sum_{(t,v_{i,t}) \in \vec{v}_i} s_{i,t}$ for $i = 1, \ldots, L;$ $(t, v_{i,t}) \in \vec{v}_i,$ $\eta_0, \delta_i \xleftarrow{U} \mathbb{F}_q (i = 1, \ldots, L),$ $k_0^* := (-\sigma_0, 0, 1, \eta_0, 0)\mathbb{B}_0^*,$ for $i = 1, \ldots, L$ for $(t, v_{i,t}) \in \vec{v}_i,$ if $\rho(i) = (\tau, \vec{v}_i),$ $\eta_{i,1}, \ldots, \eta_{i,n_{\tau,t}} \xleftarrow{U} \mathbb{F}_q,$ $k_{i,t}^* :=$ $\left(\frac{2}{\delta_i v_{i,t}, s_{i,t}}, \overbrace{0^{n_{\tau,t}}}^{n_{\tau,t}}, \overbrace{\eta_{i,1}, \ldots, \eta_{i,n_{\tau,t}}}^{n_{\tau,t}}, \frac{1}{0,}\right)\mathbb{B}_{\tau,t}^*$ $sk_\mathbb{S} := (\mathbb{S}, k_0^*, \{k_{i,t}^*\}_{i=1,\ldots,L;(t,v_{i,t}) \in \vec{v}_i}).$ return $sk_\mathbb{S}.$ The Enc algorithm will be described.

Using the processing device, the ciphertext generation unit 230 generates an element $c_{\tau,t}$ of the ciphertext $ct_x$ for one or more index τ and each index t included in a set $I_{\vec{xi}}$, as indicated in Formula 185.

$c_{\tau,t} := \left(\frac{2}{\omega_\tau x_{\tau,t}, \omega_\tau}, \overbrace{0^{n_{\tau,t}}}^{n_{\tau,t}}, \overbrace{0^{n_{\tau,t}}}^{n_{\tau,t}}, \frac{1}{\phi_{\tau,t}}\right)\mathbb{B}_{\tau,t}$ [Formula 185]

In brief, the Enc algorithm is as indicated in Formula 186.

$Enc(pk, m, \Gamma := \{(\tau, \vec{x}_\tau := \{(t, x_{\tau,t}) | t \in I_{\vec{x}_\tau}\} | 1 \leq \tau \leq d\})$ [Formula 186]

$\omega_\tau, \phi_0, \phi_{\tau,t},$ $\zeta \xleftarrow{U} \mathbb{F}_q \text{ for } (\tau, \vec{x}_\tau) \in \Gamma; (t, x_{\tau,t}) \in \vec{x}_\tau,$ $c_0 := (\omega_\tau, 0, \zeta, 0, \phi_0)\mathbb{B}_0,$ for $(\tau, \vec{x}_\tau) \in \Gamma; (t, x_{\tau,t}) \in \vec{x}_\tau$ $c_{\tau,t} := \left(\frac{2}{\omega_\tau x_{\tau,t}, \omega_\tau}, \overbrace{0^{n_{\tau,t}}}^{n_{\tau,t}}, \overbrace{0^{n_{\tau,t}}}^{n_{\tau,t}}, \frac{1}{\phi_{\tau,t}}\right)\mathbb{B}_{\tau,t},$ -continued $$c_{d+1} := g_T^\zeta m,$$

$$ct_\Gamma := (\Gamma, c_0, \{c_{\tau,t}\}_{(\tau,\vec{x}_\tau)\in\Gamma;(t,x_{\tau,t})\in\vec{x}_\tau}, c_{d+1}).$$

return $ct_\Gamma$.

The Dec algorithm will be described.

Using the processing device, the pairing operation unit 340 computes Formula 187, and thus generates a session key $K=g_T^\zeta$ and computes a message $m'=c_{d+1}/K$.

$$K := e(c_0, k_0^*) \cdot \prod_{i \in I \wedge \rho(i)=(\tau,\vec{v}_i) \wedge t \in L_{\vec{v}_i}} e(c_{\tau,t}, k_{i,t}^*)^{\alpha_i} \quad \text{[Formula 187]}$$

In brief, the Dec algorithm is as indicated in Formula 188.

$Dec(pk, sk_\mathbb{S}, ct_\Gamma)$ [Formula 188]

If $\mathbb{S} := (M, \rho)$ accepts $\Gamma := \{(\tau, \vec{x}_\tau)\}$, then compute $I$ and $\{\alpha_i\}_{i \in I}$ such that $$\sigma_0 = \sum_{i \in I} \alpha_i \sigma_i,$$

and $$I \subseteq \{i \in \{1, \ldots, L\} \mid [$$
$$p(i) = (\tau, \vec{v}_i) \wedge (\tau, \vec{x}_\tau) \in \Gamma \wedge \vec{v}_i \cdot \vec{x}_\tau = 0]\}.$$

$$K := e(c_0, k_0^*) \cdot \prod_{i \in I \wedge \rho(i)=(\tau,\vec{v}_i) \wedge t \in L_{\vec{v}_i}} e(c_{\tau,t}, k_{i,t}^*)^{\alpha_i},$$

$m' = c_{d+1}/K.$ return $m'$.

In this way, the functional encryption scheme having the inner-product predicate encryption scheme described in one of the above embodiments as a lower structure can be implemented.

In the above description, the functional encryption scheme has been described in which the public parameter is required to be reissued to add an attribute category at a later stage. However, as described in Embodiments 1 to 3, the index parts may be provided so that an attribute category can be added without reissuing the public parameter.

In the functional encryption scheme described above, the basis $B_{\tau,t}$ and the basis $B^*_{\tau,t}$ are employed. Thus, it is necessary to provide the index parts for each of the index $\tau$ and the index $t$.

In this case, the $\mathcal{G}_{ob}$ algorithm, the Setup algorithm, the KeyGen algorithm, and the Enc algorithm of the inner-product predicate encryption scheme described above are as indicated in Formula 189 through Formula 192. The Dec algorithm is as indicated in Formula 188, with no change.

$\mathcal{G}_{ob}(1^\lambda):$ [Formula 189]

$param_\mathbb{G} := (q, \mathbb{G}, \mathbb{G}_T, g, e) \xleftarrow{R} \mathcal{G}_{bpg}(1^\lambda),$ $\psi \xleftarrow{U} \mathbb{F}_q^\times,$ $N_0 := 5, N_1 := 6 + 2n + 1,$ for $t = 0, 1,$ $param_{\mathbb{V}_t} :=$
$\quad (q, \mathbb{V}_t, \mathbb{G}_T, \mathbb{A}_t, e) := \mathcal{G}_{dpvs}(1^\lambda, N_t, param_\mathbb{G}),$ $X_t := (\chi_{t,i,j})_{i,j} \xleftarrow{U} GL(N_t, \mathbb{F}_q),$ $(v_{t,i,j})_{i,j} := \psi \cdot (X_t^T)^{-1},$ $b_{t,i} := (\chi_{t,i,1}, \ldots, \chi_{t,i,N_t})_{\mathbb{A}_t} = \sum_{j=1}^{N_t} \chi_{t,i,j} a_{t,j},$ $\mathbb{B}_t := (b_{t,1}, \ldots, b_{t,N_t}),$ $b_{t,i}^* := (v_{t,i,1}, \ldots, v_{t,i,N_t})_{\mathbb{A}_t} = \sum_{j=1}^{N_t} v_{t,i,j} a_{t,j},$ $\mathbb{B}_t^* := (b_{t,1}^*, \ldots, b_{t,N_t}^*),$ $g_T := e(g, g)^\psi,$ $param := (\{param_{\mathbb{V}_t}\}_{t=0,1}, g_T)$ return($param, \{\mathbb{B}_t, \mathbb{B}_t^*\}_{t=0,1}$).

$Setup(1^\lambda)$ [Formula 190]

$(param, (\mathbb{B}_0, \mathbb{B}_0^*), (\mathbb{B}, \mathbb{B}^*)) \xleftarrow{R} \mathcal{G}_{ob}(1^\lambda),$ $\hat{\mathbb{B}}_0 := (b_{0,1}, b_{0,3}, b_{0,5}),$ $\hat{\mathbb{B}} := (b_1, \ldots, b_6, b_{6+2n+1}),$ $\hat{\mathbb{B}}_0^* := (b_{0,1}^*, b_{0,3}^*, b_{0,4}^*),$ $\hat{\mathbb{B}}^* := (b_1^*, \ldots, b_6^*, b_{6+n+1}^*, \ldots, b_{6+2n}^*),$ return $pk := (1^\lambda, param, \hat{\mathbb{B}}_0, \hat{\mathbb{B}}),$ $sk := (\hat{\mathbb{B}}_0^*, \hat{\mathbb{B}}^*).$ $KeyGen(pk, sk, \mathbb{S} := (M, \rho),$ [Formula 191]
$\{\tau, \vec{v}_i := \{(t, v_{i,t}) \mid t \in I_{\vec{v}_i}\} \mid i = 1, \ldots, L\})$ $\vec{f} \xleftarrow{U} \mathbb{F}_q^r,$ $\vec{\sigma}^T := (\sigma_1, \ldots, \sigma_L)^T := M \cdot \vec{f}^T, \sigma_0 := \vec{1} \cdot \vec{f}^T,$ $s_{i,t} \xleftarrow{U} \mathbb{F}_q,$ $\sigma_i := \sum_{(t,v_{i,t}) \in \vec{v}_i} s_{i,t}$ for
$i = 1, \ldots, L; (t, v_{i,t}) \in \vec{v}_i,$ $\eta_0, \delta_i \xleftarrow{U} \mathbb{F}_q (i = 1, \ldots, L),$ $k_0^* := (-\sigma_0, 0, 1, \eta_0, 0)\mathbb{B}_0^*,$ for $i = 1, \ldots, L$ for $(t, v_{i,t}) \in \vec{v}_i,$ if $\rho(i) = (\tau, \vec{v}_i),$ $\mu_\tau, \mu_t \xleftarrow{U} \mathbb{F}_q,$ $\eta_{i,1}, \ldots, \eta_{i,n} \xleftarrow{U} \mathbb{F}_q,$ $k_{i,t}^* :=$ $\left( \overbrace{\mu_\tau(\tau, -1, ), \mu_t(t, -1, ), \delta_i v_{i,t}, s_{i,t}}^{6}, \overbrace{0^n}^{n}, \overbrace{\eta_{i,1}, \ldots, \eta_{i,n}}^{n}, \overbrace{0,}^{1} \right)\mathbb{B}^*$ $sk_\mathbb{S} := \left( \mathbb{S}, k_0^*, \{k_{i,t}^*\}_{i=1,\ldots,L;(t,v_{i,t}) \in \vec{v}_i} \right).$ return $sk_\mathbb{S}.$ -continued $$Enc(pk, m, \Gamma := \{(\tau, \vec{x}_\tau := \{(t, x_{\tau,t}) | t \in I_{\vec{x}_\tau}\} | 1 \le \tau \le d\})$$ [Formula 192]

$\omega_\tau, \phi_0, \phi_{\tau,t},$ $\zeta \xleftarrow{U} \mathbb{F}_q$ for $(\tau, \vec{x}_\tau) \in \Gamma; (t, x_{\tau,t}) \in \vec{x}_\tau,$ $c_0 := (\omega_t, 0, \zeta, 0, \phi_0)\mathbb{B}_0,$ for $(\tau, \vec{x}_\tau) \in \Gamma; (t, x_{\tau,t}) \in \vec{x}_\tau$ $\sigma_\tau, \sigma_t \xleftarrow{U} \mathbb{F}_q,$ $c_{\tau,t} :=$ $$(\overbrace{\sigma_\tau(1,\tau), \sigma_t(1,t), \omega_\tau x_{\tau,t}, \omega_\tau}^{6}, \overbrace{0^n}^{n}, \overbrace{0^n}^{n}, \overbrace{\phi_{\tau,t}}^{1})\mathbb{B},$$

$c_{d+1} := g_T^\zeta m,$ $ct_\Gamma := (\Gamma, c_0, \{c_{\tau,t}\}_{(\tau,\vec{x}_\tau)\in\Gamma;(t,x_{\tau,t})\in\vec{x}_\tau}, c_{d+1}).$ return $ct_\Gamma.$ In the above description, the case has been described where the inner-product predicate encryption scheme described in Embodiment 1 is applied to the KP-FE scheme discussed in Non-Patent Literature 31, as an example.

However, in a similar manner, the inner-product predicate encryption scheme described in Embodiment 1 can be applied to a ciphertext-policy functional encryption scheme (CP-FE scheme) or a unified-policy functional encryption scheme (UP-FE scheme) discussed in Non-Patent Literature 31. Alternatively, the inner-product predicate encryption scheme described in Embodiment 2 or 3 can be applied to each functional encryption scheme discussed in Non-Patent Literature 31. As a matter of course, the inner-product predicate encryption schemes described in the above embodiments can be applied to other functional encryption schemes, not limited to the functional encryption schemes discussed in Non-Patent Literature 31. In a similar manner, the inner-product predicate encryption schemes described in the above embodiments can be applied to attribute-based signature schemes discussed in Non-Patent Literature 32 and other literature.

In any case, the inner-product predicate encryption schemes described in the above embodiments may be applied to the computation of the inner-product of the attribute vector $\vec{x}$ and the predicate vector $\vec{v}$ for each index t.

Embodiment 5

In the above embodiments, the methods for implementing the processes of the cryptographic primitives in the dual vector spaces have been described. In Embodiment 5, a method for implementing the processes of the cryptographic primitives in dual additive groups will be described.

More specifically, in the above embodiments, the processes of the cryptographic primitives are implemented in the cyclic group of the prime order q.

However, when a ring R is expressed using a composite M as indicated in Formula 193, the processes of the cryptographic primitives described in the above embodiments can also be applied to an additive group having the ring R as a coefficient.

$$\mathbb{R} := \mathbb{Z}/M\mathbb{Z}$$ [Formula 193]

where $\mathbb{Z}$: integer, and

M: composite number.

By changing $\mathbb{F}_q$ to R in the algorithms described in the above embodiments, the processes of the cryptographic primitives in dual additive groups can be implemented.

A hardware configuration of the cryptographic processing system 10 (the key generation device 100, the encryption device 200, the decryption device 300) in the embodiments will now be described.

Figure 16:
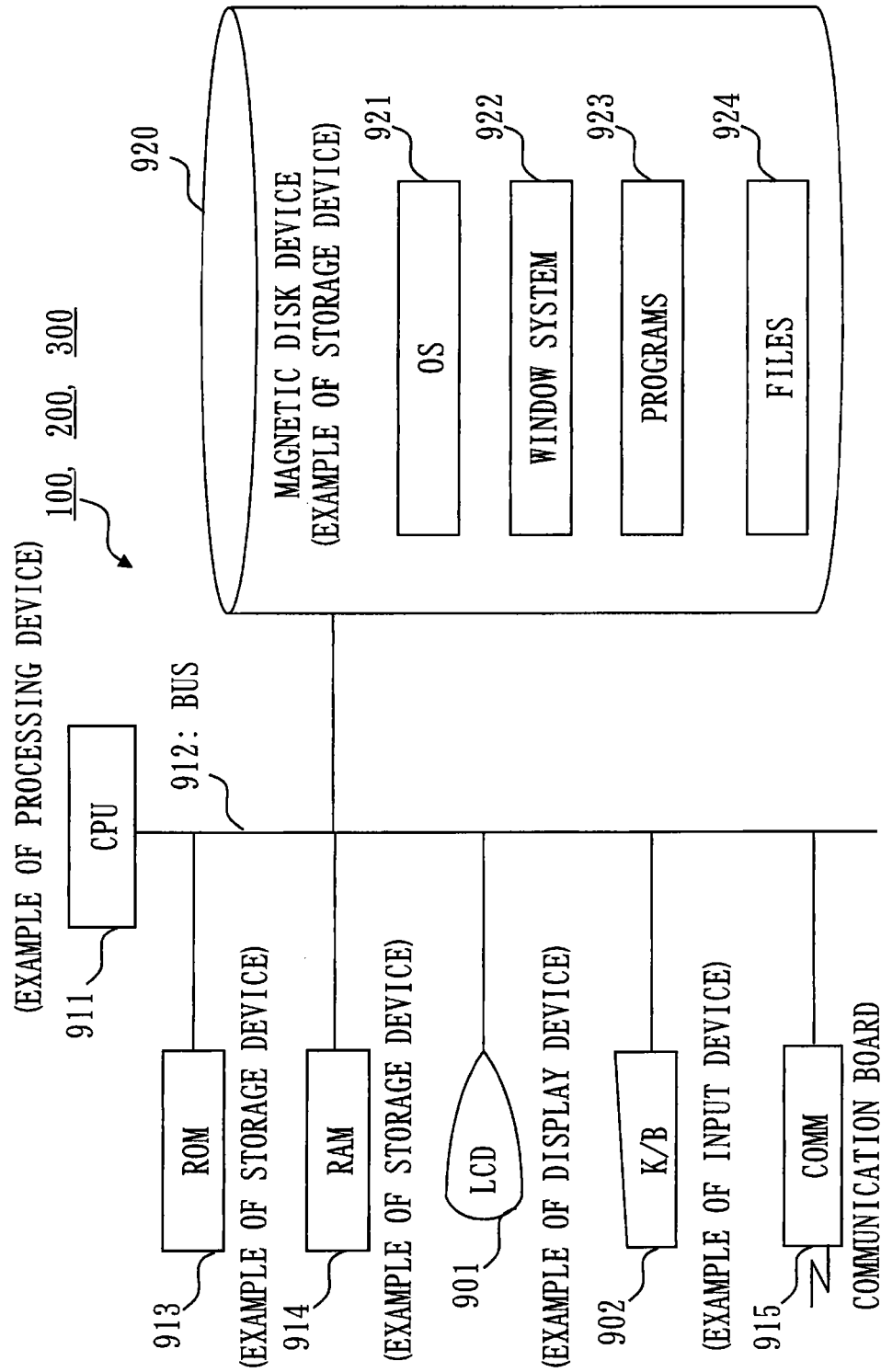
FIG. 16 is a diagram illustrating an example of a hardware configuration of the key generation device 100, the encryption device 200, and the decryption device 300.

FIG. 16 is a diagram illustrating an example of the hardware configuration of the key generation device 100, the encryption device 200, and the decryption device 300.

As illustrated in FIG. 16, each of the key generation device 100, the encryption device 200, and the decryption device 300 has the CPU 911 (also referred to as a Central Processing Unit, central processing device, processing device, arithmetic device, microprocessor, microcomputer, or processor) that executes programs. The CPU 911 is connected via a bus 912 to the ROM 913, the RAM 914, the LCD 901 (Liquid Crystal Display), the keyboard 902 (K/B), the communication board 915, and the magnetic disk device 920, and controls these hardware devices. In place of the magnetic disk device 920 (fixed disk device), a storage device such as an optical disk device or memory card read/write device may be employed. The magnetic disk device 920 is connected via a predetermined fixed disk interface.

The ROM 913 and the magnetic disk device 920 are examples of a nonvolatile memory. The RAM 914 is an example of a volatile memory. The ROM 913, the RAM 914, and the magnetic disk device 920 are examples of the storage device (memory). The keyboard 902 and the communication board 915 are examples of the input device. The communication board 915 is an example of the communication device. The LCD 901 is an example of a display device.

The magnetic disk device 920, the ROM 913, or the like stores an operating system 921 (OS), a window system 922, programs 923, and files 924. The programs 923 are executed by the CPU 911, the operating system 921, and the window system 922.

The programs 923 store software and programs that execute the functions described in the above description as the master key generation unit 110, the master key storage unit 120, the information input unit 130, the decryption key generation unit 140, the key distribution unit 150, the public parameter acquisition unit 210, the information input unit 220, the ciphertext generation unit 230, the data transmission unit 240, the decryption key acquisition unit 310, the decryption key storage unit 320, the ciphertext acquisition unit 330, the pairing operation unit 340, the message computation unit 350, and the like. The programs 923 store other programs as well. The programs are read and executed by the CPU 911.

The files 924 store information, data, signal values, variable values, and parameters such as the public parameter pk, the master secret key sk, the decryption key $sk_v$, the ciphertext $ct_x$, the predicate vector v, the attribute vector x, and the message m in the above description, as the items of a "file" and "database". The "file" and "database" are stored in a recording medium such as a disk or memory. The information, data, signal values, variable values, and parameters stored in the recording medium such as the disk or memory are read out to the main memory or cache memory by the CPU 911 through a read/write circuit, and used for operations of the CPU 911 such as extraction, search, look-up, comparison, calculation, computation, processing, output, printing, and display. The information, data, signal values, variable values, and parameters are temporarily stored in the main memory, cache memory, or buffer memory during the operations of the CPU 911 including extraction, search, look-up, comparison, calculation, computation, processing, output, printing, and display.

The arrows in the flowcharts in the above description mainly indicate input/output of data and signals. The data and signal values are stored in the memory of the RAM 914, the recording medium such as an optical disk, or in an IC chip. The data and signals are transmitted online via a transmission medium such as the bus 912, signal lines, or cables, or via electric waves.

What is described as a "unit" in the above description may be a "circuit", "device", "equipment", "means", or "function", and may also be a "step", "procedure", or "process". What is described as a "device" may be a "circuit", "equipment", "means", or "function", and may also be a "step", "procedure", or "process". What is described as a "process" may be a "step". In other words, what is described as a "unit" may be realized by firmware stored in the ROM 913. Alternatively, what is described as a "unit" may be implemented solely by software, or solely by hardware such as an element, a device, a substrate, or a wiring line, or by a combination of software and firmware, or by a combination including firmware. The firmware and software are stored as programs in the recording medium such as the ROM 913. The programs are read by the CPU 911 and are executed by the CPU 911. That is, each program causes the computer or the like to function as each "unit" described above. Alternatively, each program causes the computer or the like to execute a procedure or a method of each "unit" described above.

REFERENCE SIGNS LIST

100: key generation device, 110: master key generation unit, 120: master key storage unit, 130: information input unit, 140: decryption key generation unit, 150: key distribution unit, 200: encryption device, 210: public parameter acquisition unit, 220: information input unit, 230: ciphertext generation unit, 240: data transmission unit, 300: decryption device, 310: decryption key acquisition unit, 320: decryption key storage unit, 330: ciphertext acquisition unit, 340: pairing operation unit, 350: message computation unit

The invention claimed is:

1. A cryptographic system comprising:
an encryption device; and
a decryption device,
wherein the encryption device includes a first processor programmed to perform functions of a ciphertext generation unit that generates a ciphertext having an element $c_0$ in which a value $\omega^\sim$ is set as a coefficient of a basis vector $b_{0,r}$ and an element $c_t$ in which attribute information $x_t$ is set as a coefficient of a basis vector $b_p$ and the value $\omega^\sim$ is set as a coefficient of a basis vector $b_q$, for each index t included in a set $I_{x\to}$, and
wherein the decryption device includes
a memory configured as a decryption key storage unit that stores a decryption key having an element $k_0$ and an element $k_t$ which are generated using a value $s_t$ and a value $s_0$ which is a sum of the value $s_t$ for each index t included in a set $I_{v\to}$, the element $k_0$ being an element in which a value $-s_0$ is set as a coefficient of a basis vector $b^*_{0,r}$ corresponding to the basis vector $b_{0,r}$, the element $k_t$ being an element in which predicate information $v_t$ is set as a coefficient of a basis vector $b^*_p$ corresponding to the basis vector $b_p$ and the value $s_t$ is set as a coefficient of a basis vector $b^*_q$ corresponding to the basis vector $b_q$, for each index t included in the set $I_{v\to}$, and a second processor programmed to perform functions of a decryption unit that decrypts the ciphertext generated by the ciphertext generation unit with the decryption key stored by the decryption key storage unit, the decryption unit decrypting the ciphertext by computing a product of pairing operations between corresponding pairs of the basis vectors on the element $c_0$ and the element $k_0$ and on the element $c_t$ and the element $k_t$ for each index t included in the set $I_{v\to}$.

2. The cryptographic system according to claim 1,
wherein the ciphertext generation unit further generates an element $c_t$ in which information J which is assigned in advance to the index t is set as a coefficient of a basis vector $b_{index}$, and
wherein the decryption key storage unit further generates an element $k_t$ in which information J' having an inner-product of 0 with the information J which is assigned in advance to the index t is set as a coefficient of a basis vector $b^*_{index}$ corresponding to the basis vector $b_{index}$.

3. The cryptographic system according to claim 2,
wherein the ciphertext generation unit generates the element $c_0$ and the element $c_t$ as indicated in Formula 1,
wherein the decryption key storage unit stores the element $k_0$ and the element $k_t$ as indicated in Formula 2, and
wherein the decryption unit performs computation as indicated in Formula 3, $$c_0 := \left(\tilde{\omega}, \frac{u_0}{0^{u_0}}, \zeta, \frac{w_0}{0^{w_0}}, \frac{z_0}{\vec{\varphi}_0}\right)_{\mathbb{B}_0} \theta, \qquad [\text{Formula 1}]$$

$$c_t = \left(\frac{4}{\sigma_t(1, t), \omega x_t, \tilde{\omega}}, \frac{u}{0^u}, \frac{w}{0^w}, \frac{z}{\vec{\varphi}_t}\right)_{\mathbb{B}}$$

where $\zeta, \sigma_t, \omega, \tilde{\omega}, \vec{\varphi}_0 := (\varphi_{0,1}, \ldots, \varphi_{0,z_0}), \vec{\varphi}_t := (\varphi_{t,1}, \ldots, \varphi_{t,z})$ are random numbers, and $u_0, w_0, z_0, u, w, z$ are each an integer of 0 or more, $$k^*_0 := \left(-s_0, \frac{u_0}{0^{u_0}}, 1, \frac{w_0}{\vec{\eta}_0}, \frac{z_0}{0^{z_0}}\right)_{\mathbb{B}^*_0}, \qquad [\text{Formula 2}]$$

$$k^*_t := \left(\frac{4}{\mu_t(t, -1,), \delta v_t, s_t}, \frac{u}{0^u}, \frac{w}{\vec{\eta}_t}, \frac{z}{0^z}\right)_{\mathbb{B}^*}$$

where $\delta, \mu_t, \vec{\eta}_0 := (\eta_{0,1}, \ldots, \eta_{0,w_0}), \vec{\eta}_t := (\eta_{t,1}, \ldots, \eta_{t,w})$ are random numbers, and $u_0, w_0, z_0, u, w, z$ are each an integer of 0 or more, $$K := e(c_0, k^*_0) \prod_{t \in I_v} e(c_t, k^*_t). \qquad [\text{Formula 3}]$$

4. A cryptographic system that realizes a process of a cryptographic primitive by determining for each index $\tau$ whether an inner-product is 0 between an attribute vector $x_\tau^{\to}$ having, as an element, attribute information $x_{\tau,t}$ for each index t included in a set $I_{\tau,x\to}$, and a predicate vector $v_\tau^{\to}$ having, as an element, attribute information $v_{\tau,t}$ for each index t included in a set $I_{\tau,v\to}$, the cryptographic system comprising:

a transmitter; and
a receiver,
wherein the transmitter includes a first processor programmed to perform functions of a transmission information generation unit that generates, for each index $\tau$, transmission information having an element $c_{\tau,t}$ in which attribute information $x_{\tau,t}$ is set as a coefficient of a basis vector $b_p$ for each index t included in the set $I_{\tau,\vec{x}}$ and a value $\omega\tilde{\ }_\tau$ is set as a coefficient of a basis vector $b_q$, and
wherein the receiver includes
a memory configured as a reception information storage unit that stores, for each index $\tau$, reception information having an element $k_{\tau,t}$ in which attribute information $v_{\tau,t}$ is set as a coefficient of a basis vector $b^*_p$ corresponding to the basis vector $b_p$ and a value $s_{\tau,t}$ is set as a coefficient of a basis vector $b^*_q$ corresponding to the basis vector $b_q$, for each index t included in the set $I_{\tau,\vec{v}}$, and
a second processor programmed to perform functions of a pairing operation unit that computes, for each index $\tau$, a product of pairing operations between corresponding pairs of the basis vectors on the element $c_{\tau,t}$ and the element $k_{\tau,t}$ for each index t included in the set $I_{\tau,\vec{v}}$.

5. A cryptographic system comprising:
an encryption devices; and
a decryption device,
wherein the encryption device includes a first processor programmed to perform functions of a ciphertext generation unit that generates a ciphertext having an element $c_0$ and an element $c_t$ which are generated using a value $f_t$ and a value $f_0$ which is a sum of the value $f_t$ for each index t included in a set $I_{\vec{x}}$, the element $c_0$ being an element in which a value $-f_0$ is set as a coefficient of a basis vector $b_{0,r}$, the element $c_t$ being an element in which attribute information $x_t$ is set as a coefficient of a basis vector $b_p$ and the value $f_t$ is set as a coefficient of a basis vector $b_q$, for each index t included in the set $I_{\vec{x}}$, and
wherein the decryption device includes
a memory configured as a decryption key storage unit that stores a decryption key having an element $k_0$ in which a value $\delta\tilde{\ }$ is set as a coefficient of a basis vector $b^*_{0,r}$ corresponding to the basis vector $b_{0,r}$, and an element $k_t$ in which predicate information $v_t$ is set as a coefficient of a basis vector $b^*_p$ corresponding to the basis vector $b_p$ and the value $\delta\tilde{\ }$ is set as a coefficient of a basis vector $b^*_q$ corresponding to the basis vector $b_q$ for each index t included in a set $I_{\vec{v}}$, and
a second processor programmed to perform functions of a decryption unit that decrypts the ciphertext generated by the ciphertext generation unit with the decryption key stored by the decryption key storage unit, the decryption unit decrypting the ciphertext by computing a product of pairing operations between corresponding pairs of the basis vectors on the element $c_0$ and the element $k_0$ and the element $c_t$ and the element $k_t$ for each index t included in the set $I_{\vec{x}}$.

6. The cryptographic system according to claim 5,
wherein the ciphertext generation unit further generates an element $c_t$ in which information J which is assigned in advance to the index t is set as a coefficient of a basis vector $b_{index}$, and
wherein the decryption key storage unit further generates an element $k_t$ in which information J' having an inner-product of 0 with the information J which is assigned in advance to the index t is set as a coefficient of a basis vector $b^*_{index}$ corresponding to the basis vector $b_{index}$.

7. The cryptographic system according to claim 6,
wherein the ciphertext generation unit generates the element $c_0$ and the element $c_t$ as indicated in Formula 4,
wherein the decryption key storage unit stores the element $k_0$ and the element $k_t$ as indicated in Formula 5, and
wherein the decryption unit performs computation as indicated in Formula 6, $$c_0 := \left(-f_0, \ \frac{u_0}{0^{u_0}}, \zeta, \ \frac{w_0}{0^{w_0}}, \ \frac{z_0}{\vec{\varphi}_0}\right) \mathbb{B}_0 \theta,$$

$$c_t = \left(\frac{4}{\sigma_t(1,t), \omega x_t, f_t}, \ \frac{u}{0^u}, \ \frac{w}{0^w}, \ \frac{z}{\vec{\varphi}_t}\right) \mathbb{B}_0$$

[Formula 4]

where $\zeta, \sigma_t, \omega, \vec{\varphi}_0 := (\varphi_{0,1}, \ldots, \varphi_{0,z_0}), \vec{\varphi}_t := (\varphi_{t,1}, \ldots, \varphi_{t,z})$ are random numbers, and $u_0, w_0, z_0, u, w, z$ are each an integer of 0 or more, $$k_0^* := \left(\tilde{\delta}, \ \frac{u_0}{0^{u_0}}, 1, \ \frac{w_0}{\vec{\eta}_0}, \ \frac{z_0}{0^{z_0}}\right) \mathbb{B}_0^*,$$

$$k_t^* := \left(\frac{4}{\mu_t(t,-1,), \ \delta v_t, \ \tilde{\delta}}, \ \frac{u}{0^u}, \ \frac{w}{\vec{\eta}_t}, \ \frac{z}{0^z}\right) \mathbb{B}^*$$

[Formula 5]

where $\delta, \tilde{\delta}, \mu_t, \vec{\eta}_0 := (\eta_{0,1}, \ldots, \eta_{0,w_0}), \vec{\eta}_t := (\eta_{t,1}, \ldots, \eta_{t,w})$ are random numbers, and $u_0, w_0, z_0, u, w, z$ are each an integer of 0 or more, $$K := e(c_0, k_0^*) \prod_{t \in I_{\vec{x}}} e(c_t, k_t^*).$$

[Formula 6]

8. A cryptographic system that realizes a process of a cryptographic primitive by determining for each index $\tau$ whether an inner-product is 0 between an attribute vector $\vec{x}_\tau$ having, as an element, attribute information $x_{\tau,t}$ for each index t included in a set $I_{\tau,\vec{x}}$, and a predicate vector $\vec{v}_\tau$ having, as an element, attribute information $v_{\tau,t}$ for each index t included in a set $I_{\tau,\vec{v}}$, the cryptographic system comprising:
a transmitter; and
a receiver,
wherein the transmitter includes a first processor programmed to perform functions of a transmission information generation unit that generates, for each index $\tau$, transmission information having an element $c_{\tau,t}$ in which attribute information $x_{\tau,t}$ is set as a coefficient of a basis vector $b_p$ and a value $f_{\tau,t}$ is set as a coefficient of a basis vector $b_q$, for each index t included in the set $I_{\tau,\vec{x}}$, and
wherein the receiver includes
a memory configured as a reception information storage unit that stores, for each index $\tau$, reception information having an element $k_{\tau,t}$ in which attribute information $v_{\tau,t}$ is set as a coefficient of a basis vector $b^*_p$ corresponding to the basis vector $b_p$ and a value $\delta\tilde{\ }_\tau$ is set as a coefficient of a basis vector $b^*_q$ corresponding to the basis vector $b_q$ for each index t included in the set $I_{\tau,\vec{v}}$, and a second processor programmed to perform functions of a pairing operation unit that computes, for each index τ, a product of pairing operations between corresponding pairs of the basis vectors on the element $c_{\tau,t}$ and the element $k_{\tau,t}$ for each index t included in the set $I_{\tau,\vec{x}}$.

9. A cryptographic system comprising:
an encryption device; and
a decryption device,
wherein the encryption device includes a first processor programmed to perform functions of a ciphertext generation unit that generates a ciphertext having an element $c_0$ and an element $c_t$ which are generated using a value $f_t$ and a value $f_0$ which is a sum of the value $f_t$ for each index t of t=1, . . . , n (n being an integer of 1 or more), the element $c_0$ being an element in which a value $\tilde{\omega}$ is set as a coefficient of a basis vector $b_{0,r}$ $-f_0$ is set as a coefficient of a basis vector $b_{0,r'}$, the element $c_t$ being an element in which attribute information $x_t$ is set as a coefficient of a basis vector $b_p$ for each index t included in a set $I_x$, the value $\tilde{\omega}$ is set as a coefficient of a basis vector $b_q$, and the value $f_t$ is set as a coefficient of a basis vector $b_{q'}$, and
wherein the decryption device includes
a memory configured as a decryption key storage unit that stores a decryption key having an element $k_0$ and an element $k_t$ which are generated using a value $s_t$ and a value $s_0$ which is a sum of the value $s_t$ for each index t, the element $k_0$ being an element in which a value $-s_0$ is set as a coefficient of a basis vector $b^*_{0,r}$ corresponding to the basis vector $b_{0,r}$, and a value $\tilde{\delta}$ is set as a coefficient of a basis vector $b^*_{0,r'}$ corresponding to the basis vector $b_{0,r'}$, the element $k_t$ being an element in which predicate information $v_t$ is set as a coefficient of a basis vector $b^*_p$ corresponding to the basis vector $b_p$, the value $s_t$ is set as a coefficient of a basis vector $b^*_q$ corresponding to the basis vector $b_q$, and the value $\tilde{\delta}$ is set as a coefficient of a basis vector $b^*_{q'}$ corresponding to the basis vector $b_{q'}$, and
a second processor programmed to perform functions of a decryption unit that decrypts the ciphertext generated by the ciphertext generation unit with the decryption key stored by the decryption key storage unit, the decryption unit decrypting the ciphertext by computing a product of pairing operations between corresponding pairs of the basis vectors on the element $c_0$ and the element $k_0$ and on the element $c_t$ and the element $k_t$ for each index t.

10. The cryptographic system according to claim 9,
wherein the ciphertext generation unit further generates an element $c_t$ in which information J which is assigned in advance to the index t is set as a coefficient of a basis vector $b_{index}$, and
wherein the decryption key storage unit further generates an element $k_t$ in which information J' having an inner-product of 0 with the information J which is assigned in advance to the index t is set as a coefficient of a basis vector $b^*_{index}$ corresponding to the basis vector $b_{index}$.

11. The cryptographic system according to claim 10,
wherein the ciphertext generation unit generates the element $c_0$ and the element $c_t$ as indicated in Formula 7,
wherein the decryption key storage unit stores the element $k_0$ and the element $k_t$ as indicated in Formula 8, and
wherein the decryption unit performs computation as indicated in Formula 9, $$c_0 := \left(\tilde{\omega}, -f_0, \overbrace{0^{u_0}}^{u_0}, \zeta, \overbrace{0^{w_0}}^{w_0}, \vec{\varphi}_0\right) \mathbb{B}_0 \theta, \quad \text{[Formula 7]}$$

$$c_t := \left(\overbrace{\sigma_t(1, t), \omega x_t, \tilde{\omega}, f_t}^{5}, \overbrace{0^u}^{u}, \overbrace{0^w}^{w}, \vec{\varphi}_t\right) \mathbb{B}$$

where $\zeta, \sigma_t, \omega, \tilde{\omega}, \vec{\varphi}_0 := (\varphi_{0,1}, \ldots, \varphi_{0,z_0}), \vec{\varphi}_t := (\varphi_{t,1}, \ldots, \varphi_{t,z})$ are random numbers, and $u_0, w_0, z_0, u, w, z$ are each an integer of 0 or more, $$k_0^* := \left(-s_0, \tilde{\delta}, \overbrace{0^{u_0}}^{u_0}, 1, \overbrace{\vec{\eta}_0}^{w_0}, \overbrace{0^{z_0}}^{z_0}\right) \mathbb{B}_0^*, \quad \text{[Formula 8]}$$

$$k_t^* := \left(\overbrace{\mu_t(t, -1,), \delta v_t, s_t, \tilde{\delta}}^{5}, \overbrace{0^u}^{u}, \overbrace{\vec{\eta}_t}^{w}, \overbrace{0^z}^{z}\right) \mathbb{B}^*$$

where $\delta, \tilde{\delta}, \mu_t, \vec{\eta}_0 := (\eta_{0,1}, \ldots, \eta_{0,w_0}), \vec{\eta}_t := (\eta_{t,1}, \ldots, \eta_{t,w})$ are random numbers, and $u_0, w_0, z_0, u, w, z$ are each an integer of 0 or more, $$K := e(c_0, k_0^*) \Pi_{t=1}^n e(c_t, k_t^*). \quad \text{[Formula 9]}$$

12. A cryptographic system that realizes a process of a cryptographic primitive by determining for each index τ whether an inner-product is 0 between an attribute vector $\vec{x}_\tau$ having, as an element, attribute information $x_{\tau,t}$ for each index t of t=1, . . . , n (n being an integer of 1 or more), and a predicate vector $\vec{v}_\tau$ having, as an element, attribute information $v_{\tau,t}$ for each index t, the cryptographic system comprising:
a transmitter; and
a receiver,
wherein the transmitter includes a first processor programmed to perform functions of a transmission information generation unit that generates, for each index τ, transmission information having an element $c_{\tau,t}$ in which attribute information $x_{\tau,t}$ is set as a coefficient of a basis vector $b_p$, a value $\omega^\sim_\tau$ is set as a coefficient of a basis vector $b_q$, and a value $f_t$ is set as a coefficient of a basis vector $b_{q'}$, for each index t included in a set $I_{\tau,\vec{x}}$, and
wherein the receiver includes
a memory configured as a reception information storage unit that stores, for each index τ, reception information having an element $k_{\tau,t}$ in which attribute information $v_{\tau,t}$ is set as a coefficient of a basis vector $b^*_p$ corresponding to the basis vector $b_p$, a value $s_{\tau,t}$ is set as a coefficient of a basis vector $b^*_q$ corresponding to the basis vector $b_q$, and a value $\omega^\sim$ is set as a coefficient of a basis vector $b^*_{q'}$ corresponding to the basis vector $b_{q'}$, for each index t included in a set $I_{\tau,\vec{v}}$, and
a second processor programmed to perform functions of a pairing operation unit that computes a product of pairing operations between corresponding pairs of the basis vectors on the element $c_{\tau,t}$ and the element $k_{\tau,t}$ for each index τ and each index t.

* * * * *